FIG. II

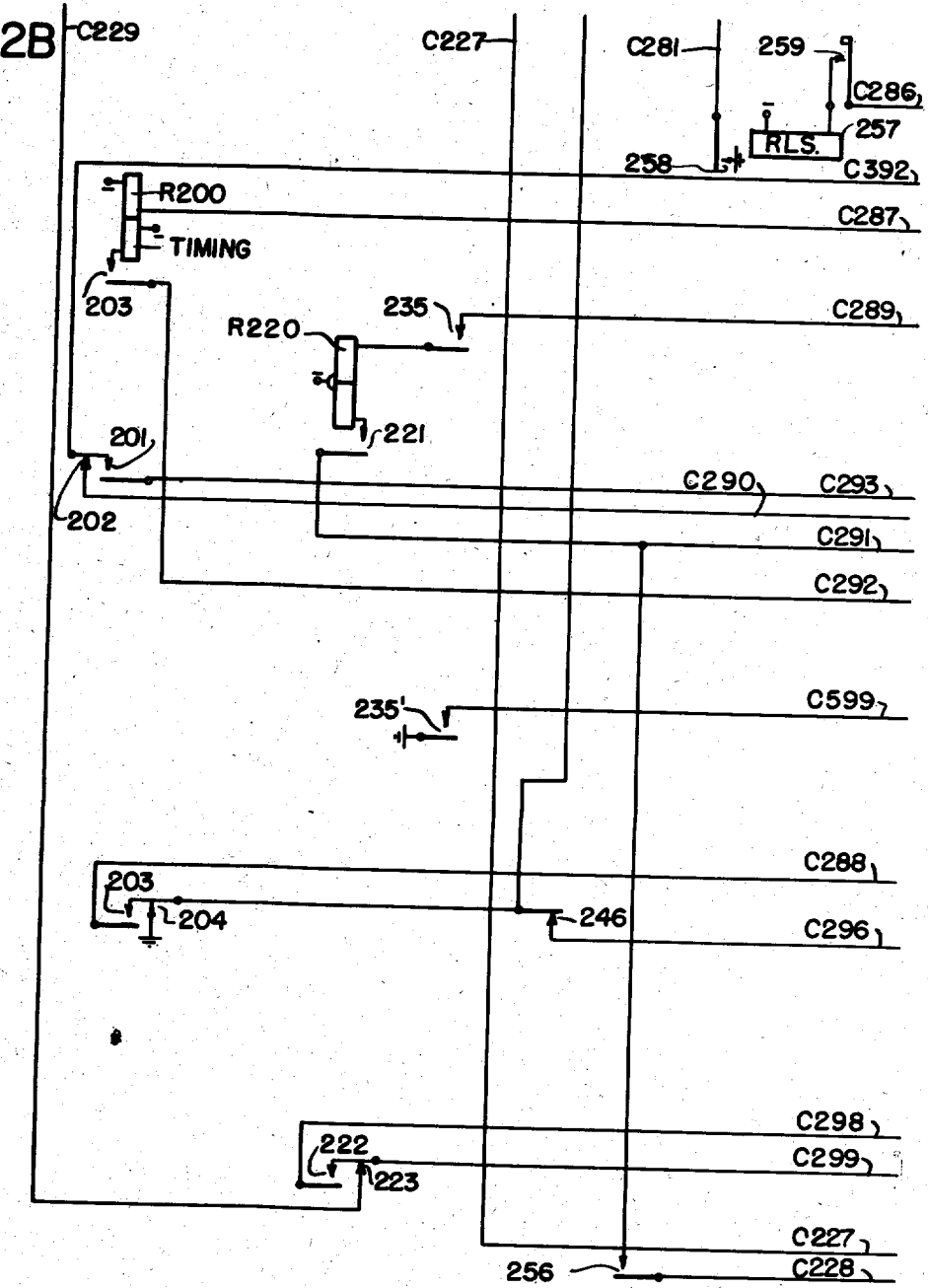

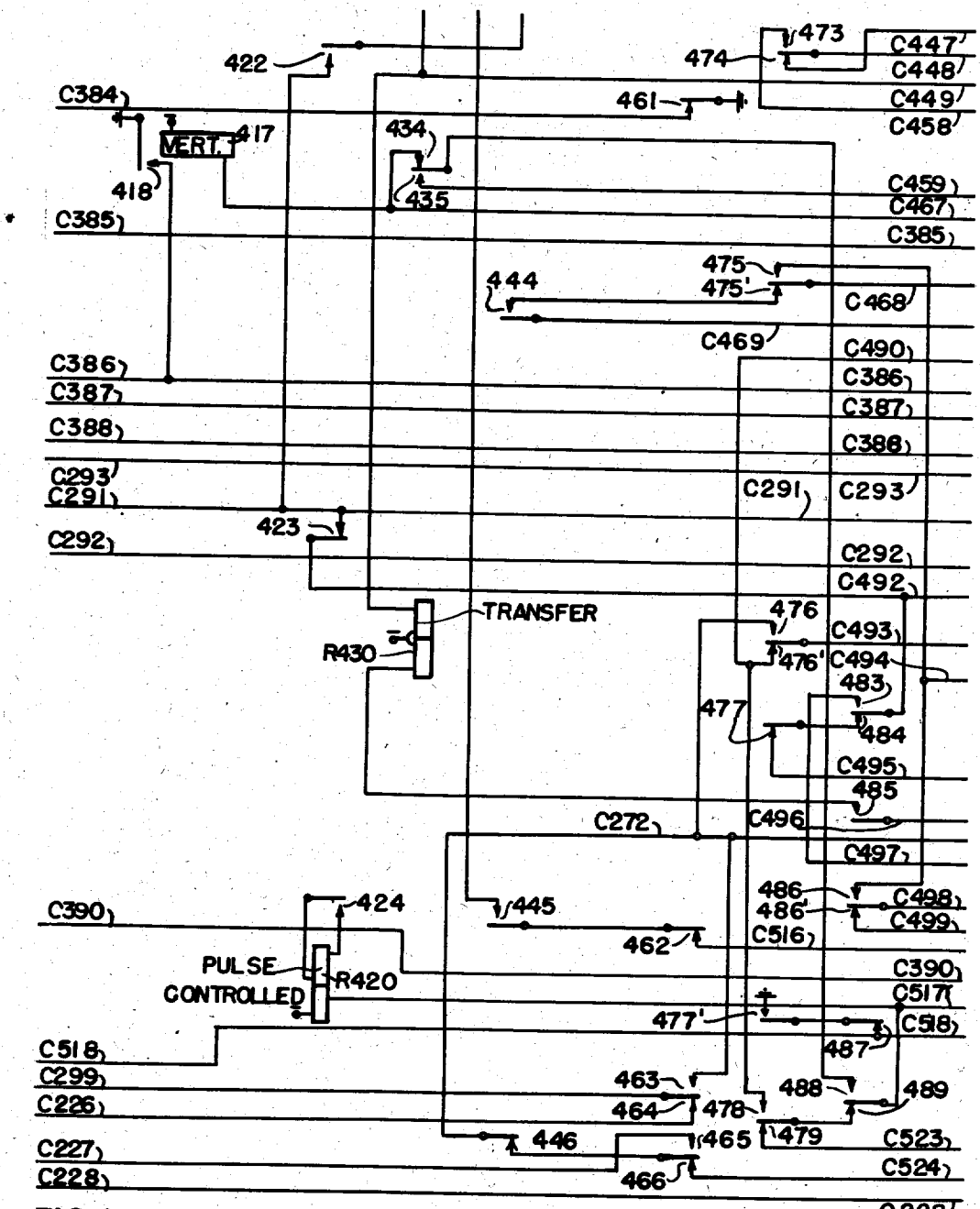

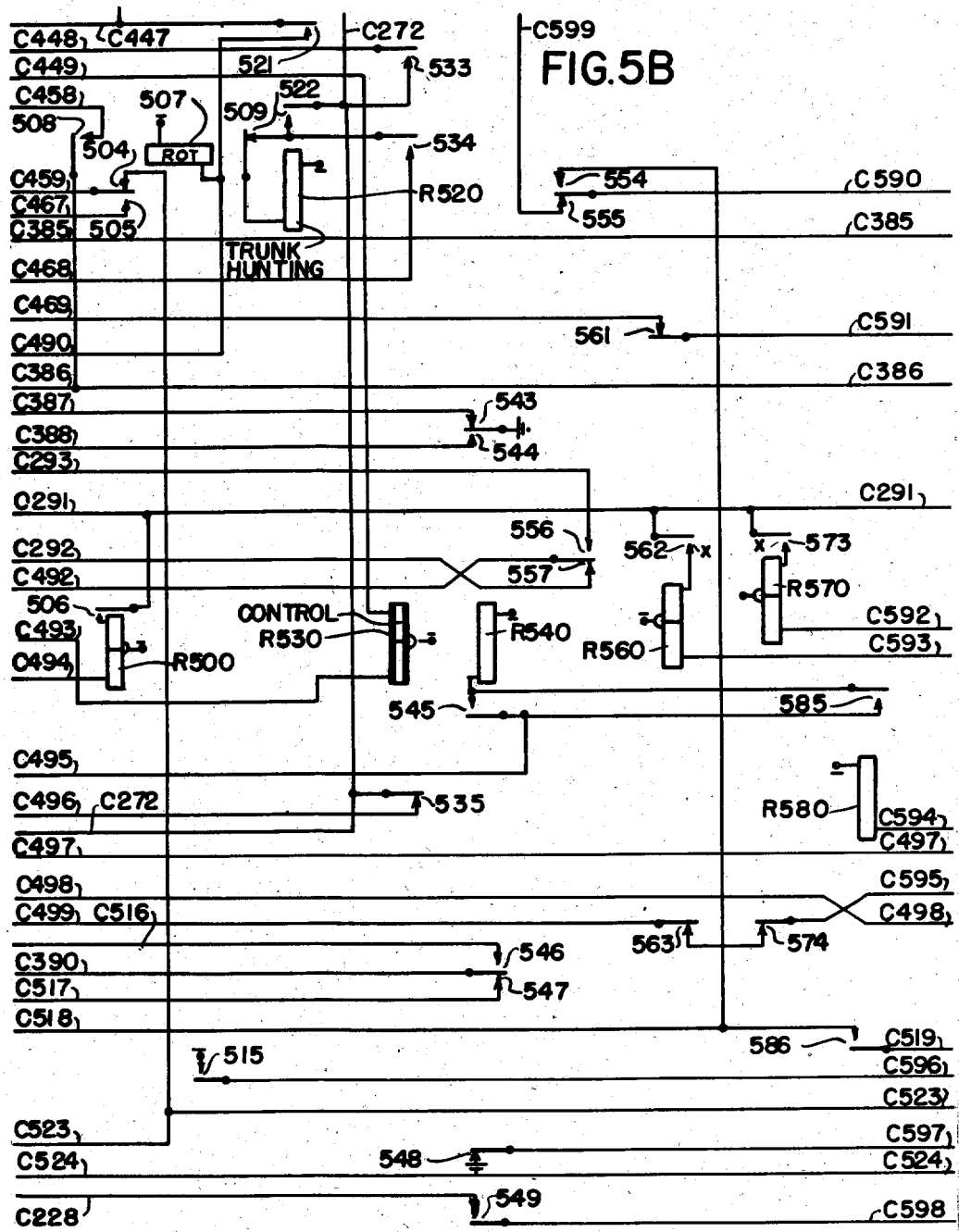

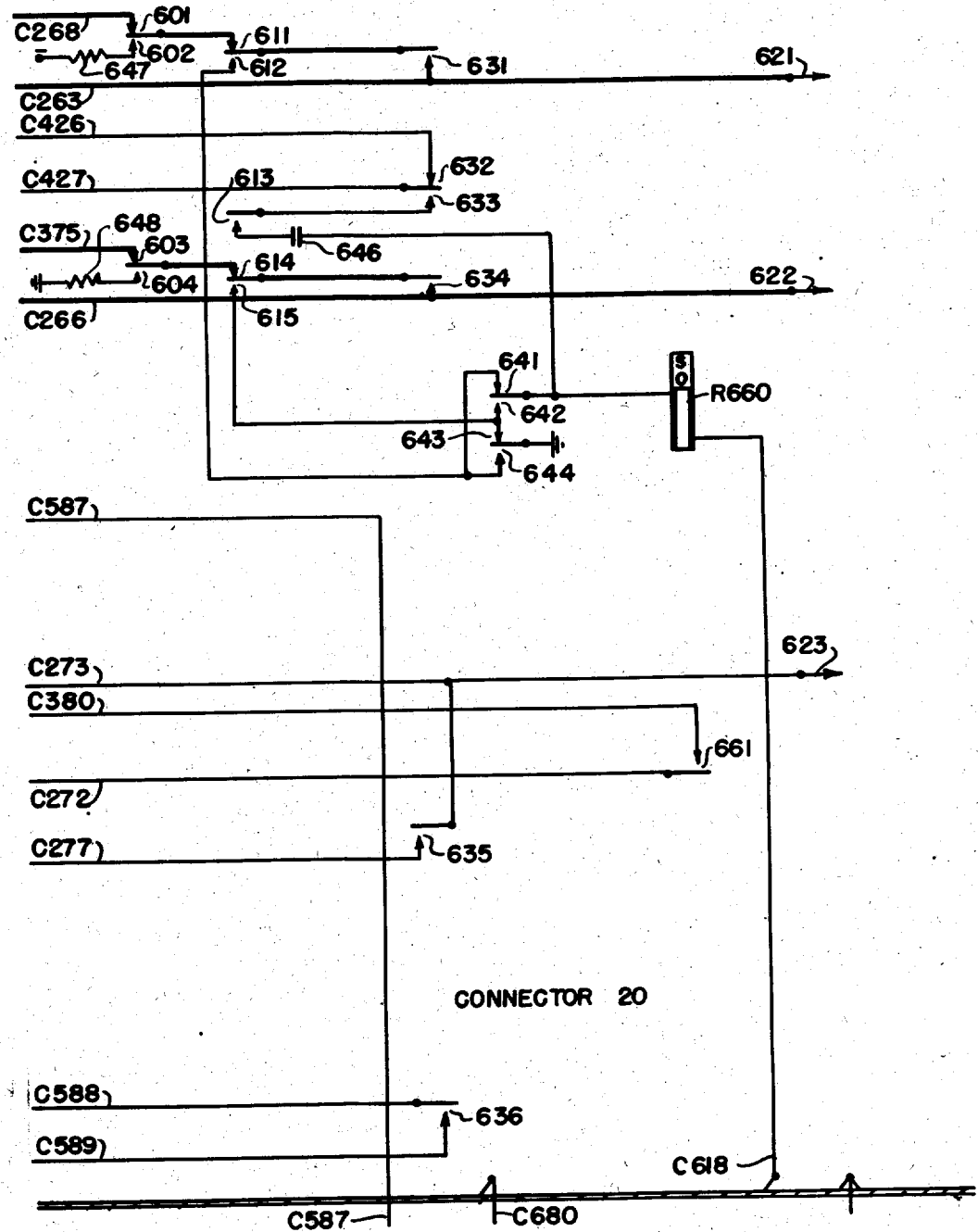

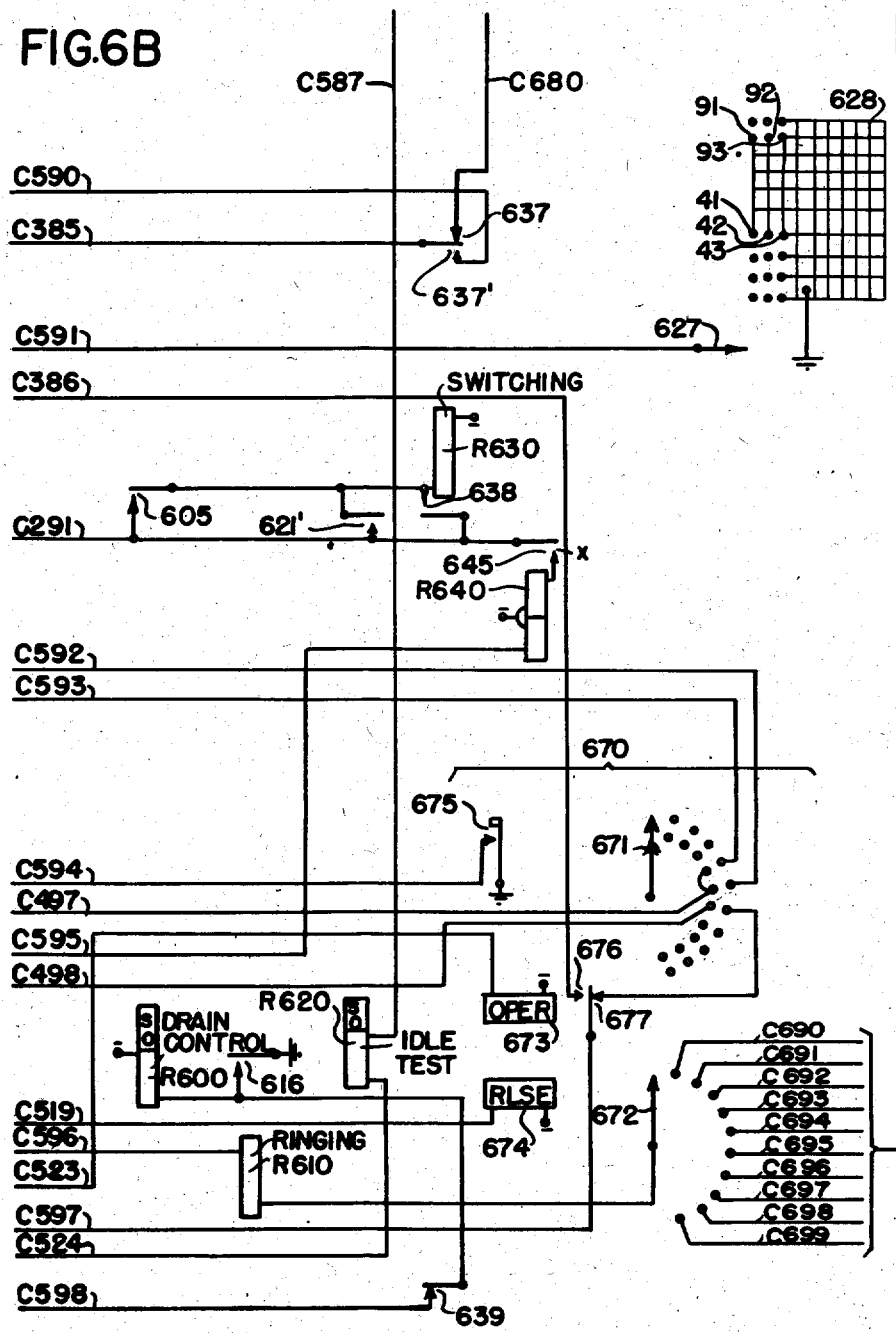

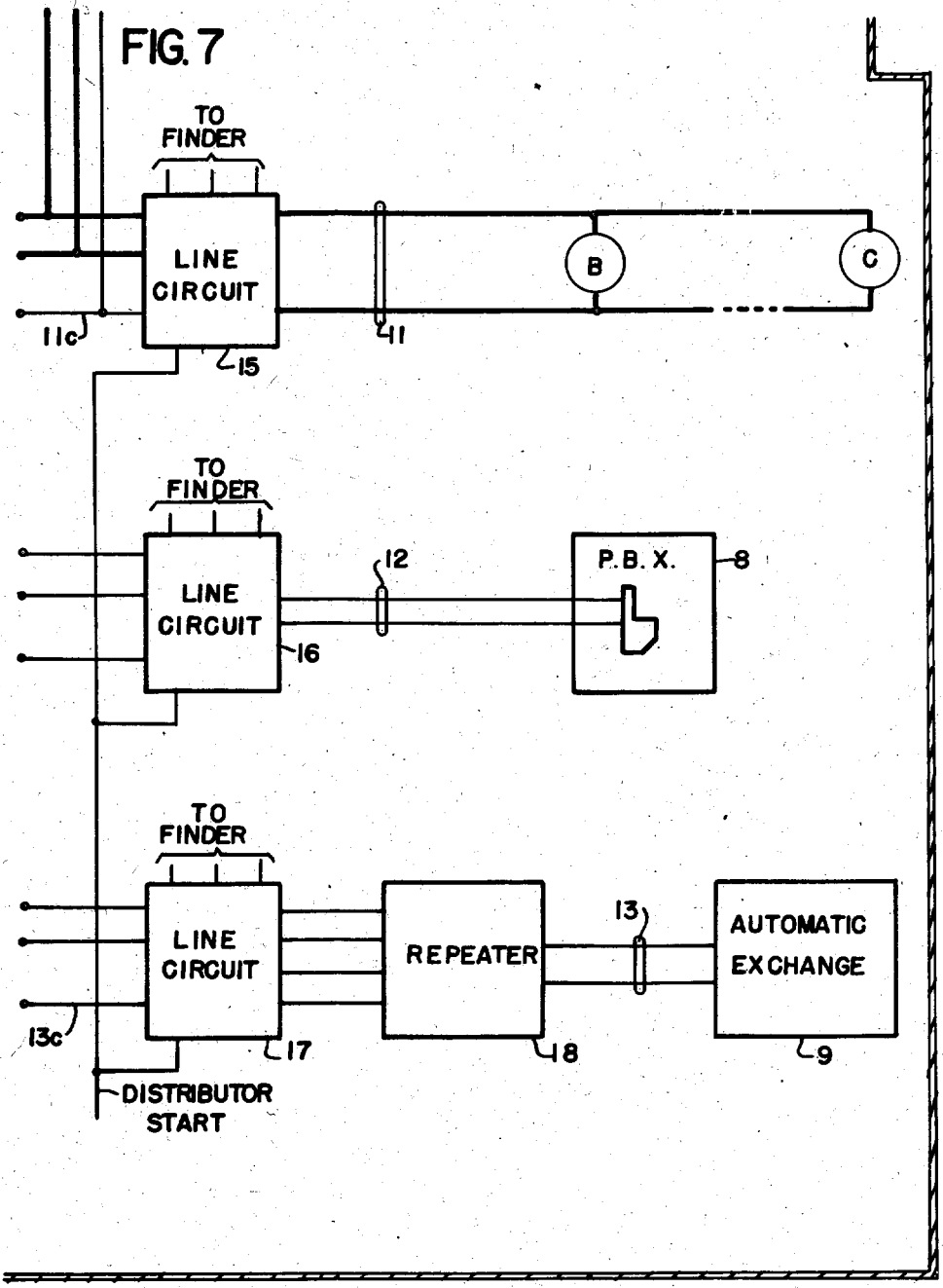

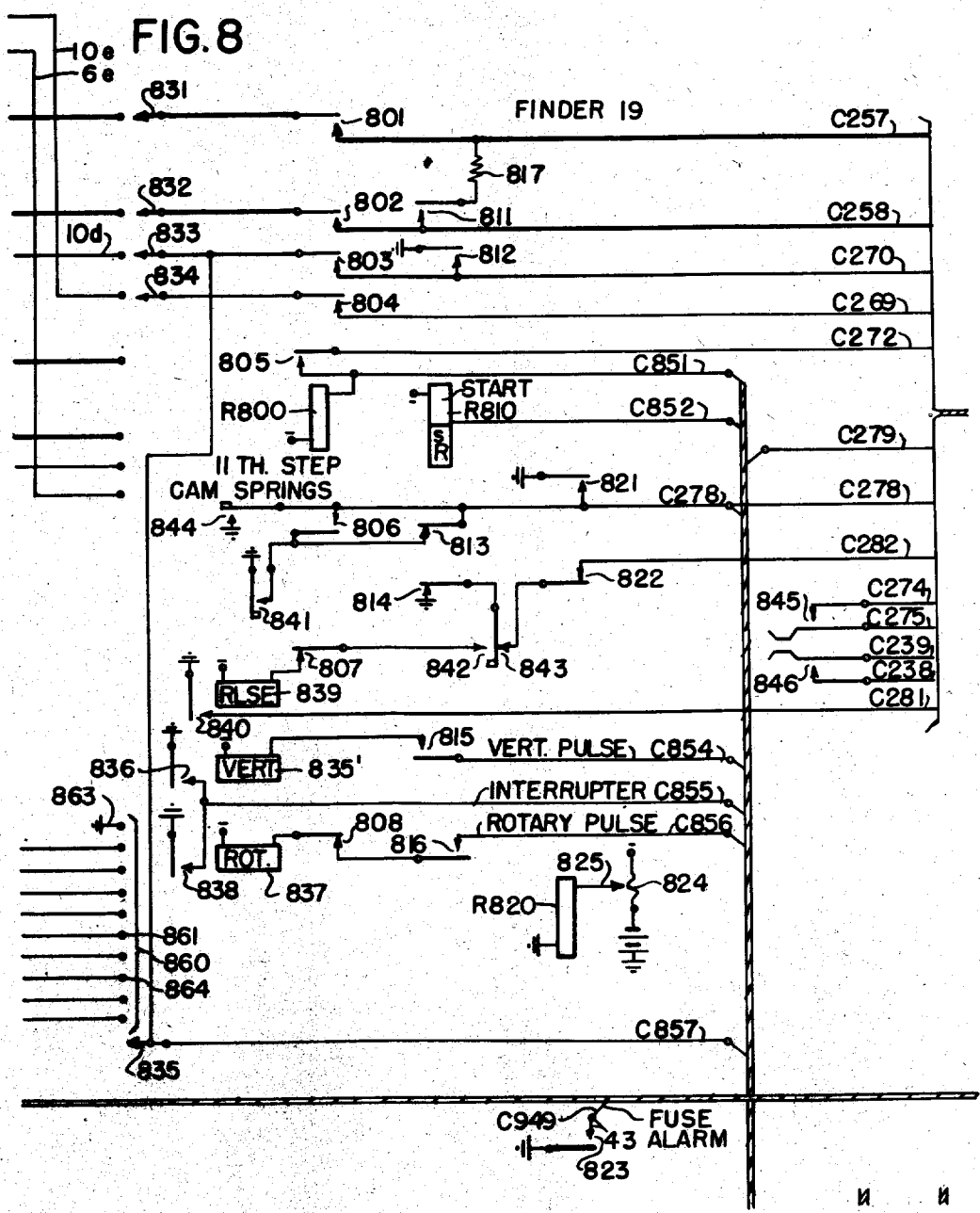

May 8, 1945. P. BAKKER 2,375,514
TELEPHONE SYSTEM
Original Filed Oct. 9, 1941   19 Sheets—Sheet 18

INVENTOR.
PIER BAKKER
BY Davis, Lindsey, Smith & Shonts
ATTORNEYS

May 8, 1945. P. BAKKER 2,375,514
TELEPHONE SYSTEM
Original Filed Oct. 9, 1941 19 Sheets-Sheet 19

INVENTOR.
PIER BAKKER
BY Davis, Lindsey, Smith & Shouts
ATTORNEYS

Patented May 8, 1945

2,375,514

UNITED STATES PATENT OFFICE 2,375,514

TELEPHONE SYSTEM

Pier Bakker, Chicago, Ill., assignor to Automatic Electric Laboratories, Inc., a corporation of Delaware Original application October 9, 1941, Serial No. 414,258. Divided and this application November 12, 1942, Serial No. 465,325

25 Claims. (Cl. 179—18)

The present invention relates to telephone systems and has for one of its objects the provision of improved automatic switching apparatus of the character utilized in interconnecting the various lines of a relatively small exchange and in rendering the various services required of such an exchange. This application is a division of copending application Serial No. 414,258, filed October 9, 1941.

It is an object of the present invention to provide in a system of the character described, improved facilities for providing different classes of service to subscribers who pay at different rates for the seervices received.

According to another object of the invention, an improved and exceedingly simple arrangement is provided for imposing, on a per line basis, two or more different restrictions on the service rendered certain of the lines of the system.

In accordance with still another object of the invention the restrictions which are imposed on any particular line are all effected by equipment which is common to a plurality of the lines over a single control path which is individual to the line.

Figure 15:
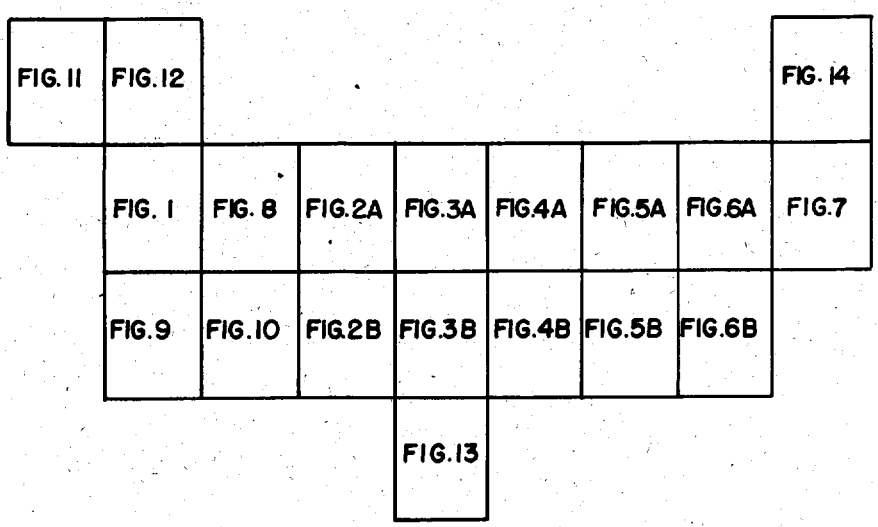

The invention, both as to its organization and method of operation, together with further objects and advantages thereof, will best be understood by reference to the specification taken in connection with the accompanying drawings, in which Figs. 1, 2A, 2B, 3A, 3B, 4A, 4B, 5A, 5B, 6A, 6B, and 7 to 14, inclusive, when combined in the manner shown in Fig. 15 illustrate an automatic telephone system having embodied therein the features of the invention briefly referred to above.

Referring now more particularly to the drawings, the telephone lines, automatic switching apparatus and power supply and supervisory signaling equipment there illustrated may comprise, for example, a small unattended automatic exchange designed to serve a suburban area of limited population, which is geographically adjacent several large cities or towns each served by a central exchange. Inter-office trunks are used to provide communication facilities between the small community exchange and the offices provided in the adjacent larger cities. For example, the automatic switching equipment of the community exchange is illustrated as having access to the automatic exchange 9 over a group of trunks which includes the trunk 13. Similar groups of trunks are provided which extend between the community exchange and each of the other central offices. In order to provide the restricted service facilities, referred to above, two groups of trunks may be utilized to connect the illustrated community exchange with one of the distant central offices in which is provided toll switchboard facilities. The single illustrated inter-office trunk 13 is shown as terminating in the community exchange in a repeater 18 which is accessible to the links of the exchange through a line circuit 17.

The subscriber lines terminating at the community exchange may comprise single party or private lines, full metallic multiparty lines arranged for bridged ringing, full metallic lines arranged for divided ringing, and ground return lines. The illustrated line 10 is shown as being of the single party type and is arranged to serve only the substation A, which may be either a private substation or a paystation. This line terminates in the community exchange in a line circuit 14 which is of the form disclosed and claimed in Patent No. 2,199,534, granted May 7, 1940, Pier Bakker, and includes a mechanically interlocked line relay R100 and cut-off relay R110. A second subscriber line 6 of the ground return type is illustrated as terminating in the community exchange in a line circuit 7 and may be arranged to serve any desired number of substations in addition to the illustrated substation D. A third line 11 is illustrated in Fig. 7 of the drawings as being of the multiparty type arranged to serve the two substations B and C. This line terminates in the community exchange in a line circuit 15. The lines extending to the line terminals of the links in the community exchange may also include one or more groups of branch exchange trunks. One such trunk 12 is illustrated as terminating in the community exchange in the line circuit 16 and as extending to the switchboard of a private branch exchange 8. This line circuit, the line circuit 7, the line circuit 15, the line circuit 17, and the line circuits terminating the other lines extending to the community exchange, are each identical with the line circuit 14 described above. Thus, the line circuit 7 is illustrated as comprising a mechanically interlocked line relay R150 and cut-off relay R160. It is noted, however, that the character of the wiring used in the different line circuits may differ slightly depending upon the types of lines which are respectively terminated thereby.

The automatic switching equipment provided in the exchange for setting up connections between the various lines terminating thereat comprises a plurality of finder-connector links each having a capacity of one hundred lines. One such link is illustrated in Figs. 1, 2, 3, 4, 5, 6 and 8 of the drawings as comprising a finder 19 and a connector 20. For the purpose of assigning these links to the use of calling lines in a definite order there is provided a distributor 21 the details of which are illustrated in Figs. 9 and 10 of the drawings.

As shown in Fig. 8 of the drawings, the finder 19 is of the well-known Strowger type employing a Strowger switching mechanism having its contact field divided into ten levels of bank contacts which have the wipers 831, 832, 833 and 834 associated therewith. A vertical test contact set 860, which is adapted to be traversed by the wiper 835 only during vertical movement of the wiper carriage structure, is also provided in the switch. The mechanism further comprises the usual vertical and rotary magnets 835' and 837 which are respectively operative in conjunction with their associated ratchet and pawl mechanisms, not shown, to impart vertical and rotary movement to the wipers 831 to 835, inclusive. The mechanism is also equipped with a release magnet 839 which, when energized, permits the wipers 831 to 835, inclusive, to be returned to rotary and vertical normal; off-normal springs 841, 842 and 843; a set of cam springs 844 which are actuated when the wipers 831 to 835, inclusive, are rotated to the eleventh rotary off-normal positions thereof; and two sets of off-normal springs 845 and 846 which are respectively operated when the wipers 831 to 835, inclusive, are vertically positioned opposite predetermined levels of the associated contact field. In addition to the Strowger switching mechanism, just described, the finder 19 comprises a slow-to-release start relay R810, a switch-through relay R800 and a fuse stud relay R820. The latter relay is associated with a fuse stud 825 which is disposed adjacent the fuse link 824 through which current is supplied to all of the magnets and relays of the finder 19 and the connector 20 from the exchange battery or current supply system of the exchange. The arrangement of this fuse and its associated stud 825 is such that when the fuse is disrupted, a circuit is completed through the stud 825 for energizing the relay R820.

Figure 9:
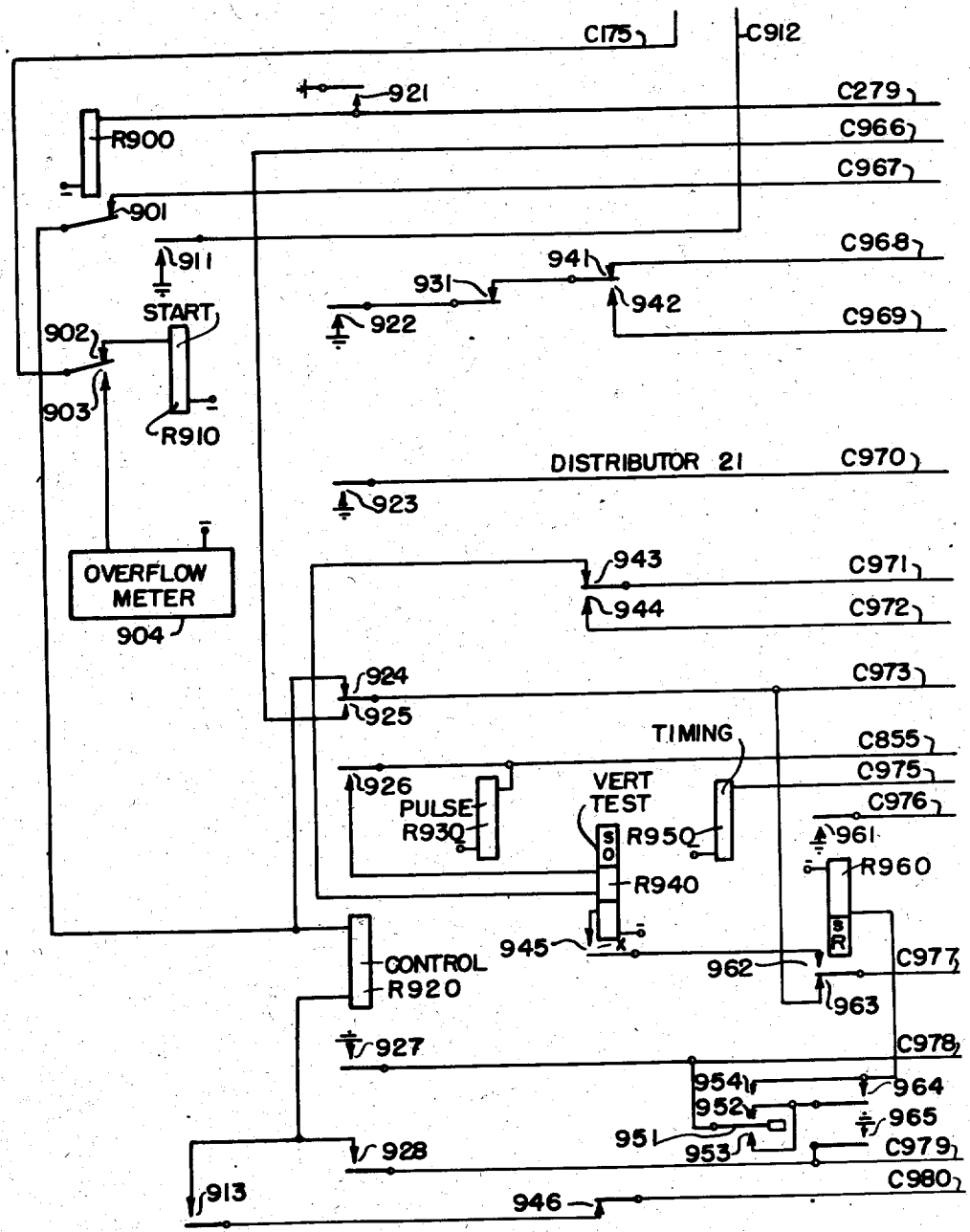
Figure 10:
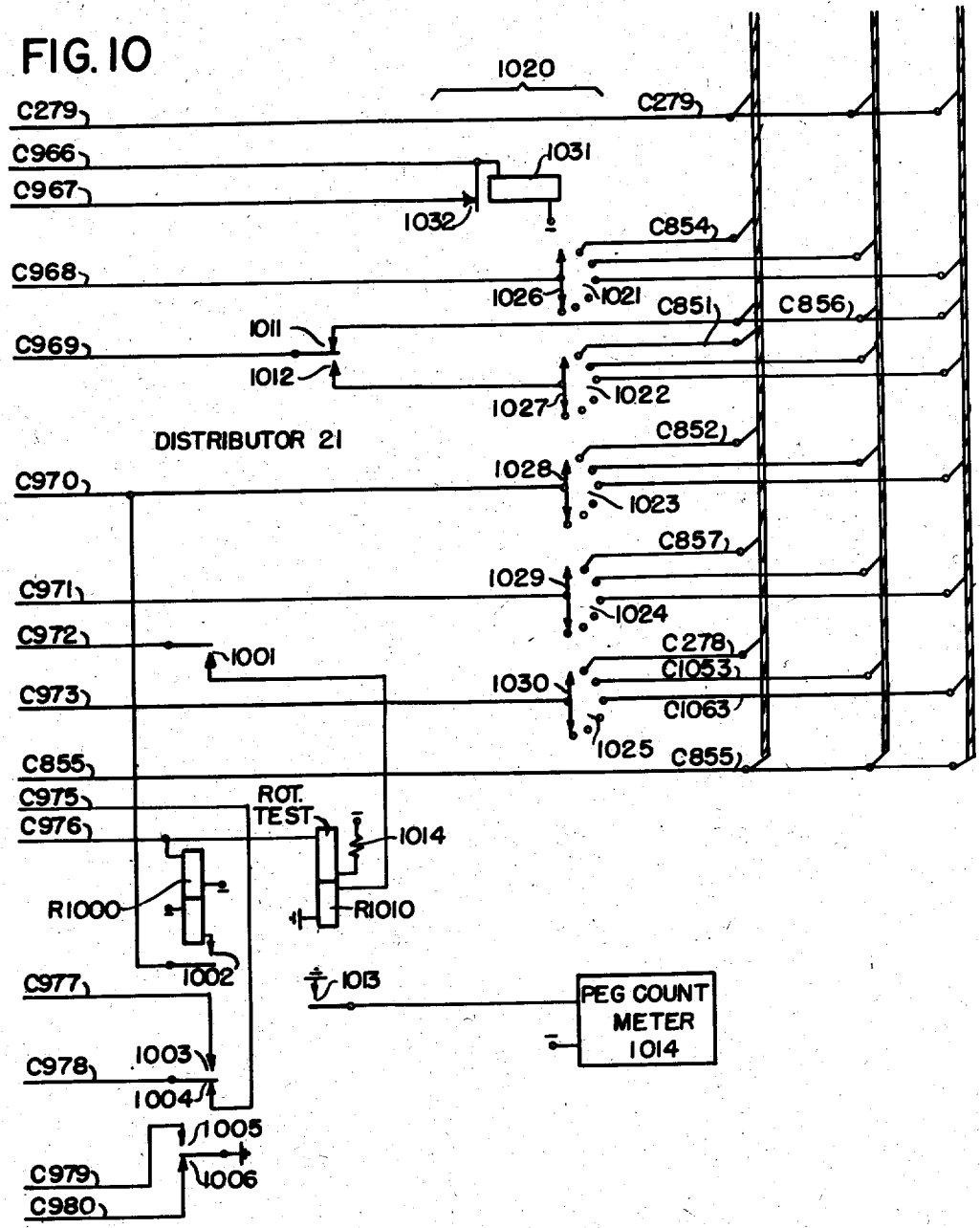
Figure 11:
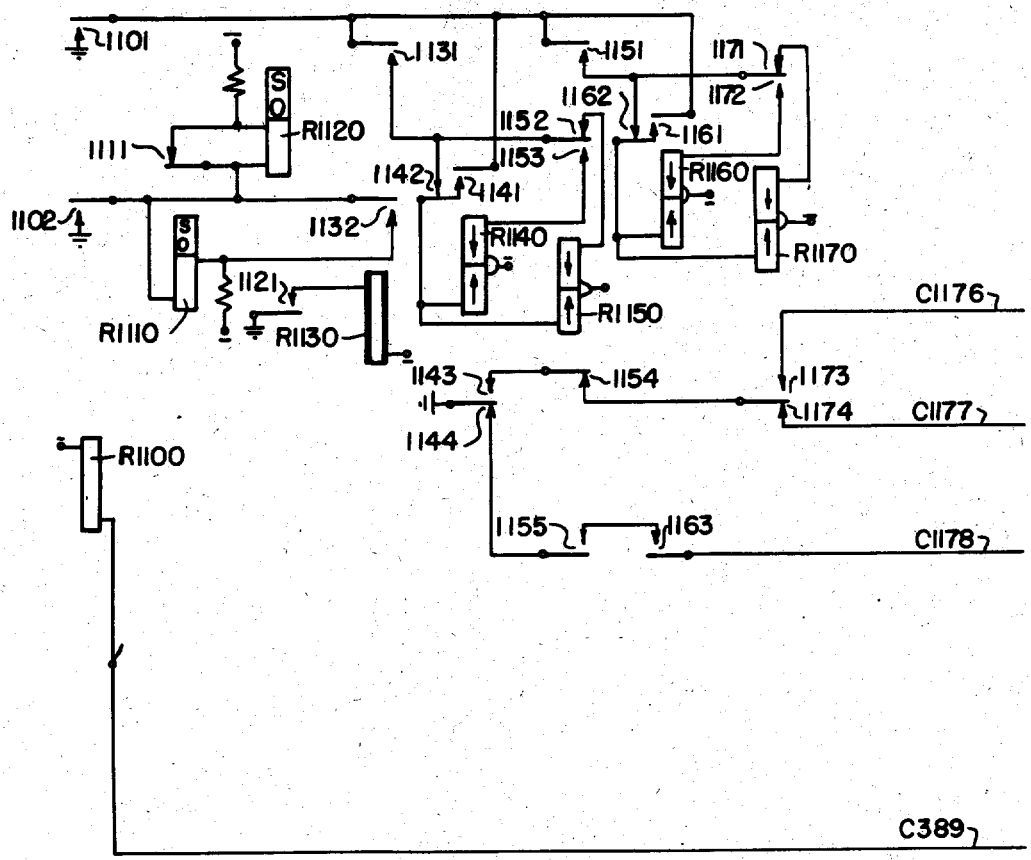
Figure 12:
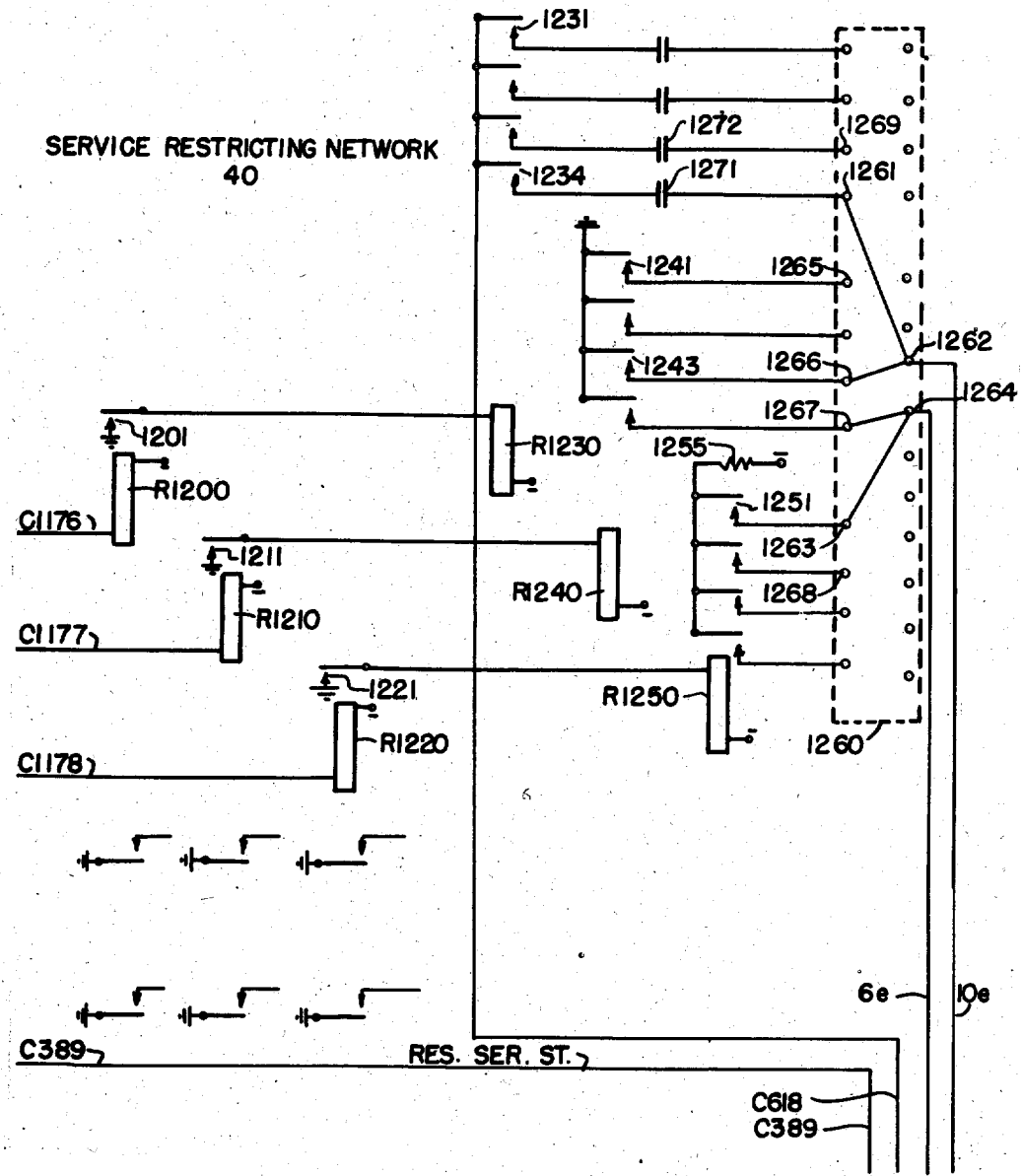

The distributor 21 is of the preselecting type and is shown in Figs. 9 and 10 of the drawings as comprising a link selecting switch 1020, an overflow meter 904, a peg count meter 1014, and a set of control relays. The switch 1020 is of the well-known rotary type. In brief, this switch comprises five sets of contacts 1021 to 1025, inclusive, each having ten points, wipers 1026 to 1030, inclusive, individually associated with the contact sets, and a motor magnet 1031 for driving the enumerated wipers over the contacts of their associated contact sets. The control relays of the distributor include an all-links-busy relay R900, a start relay R910, a control relay R920, a pulsing relay R930, a slow-to-operate vertical test relay R940, a timing relay R950, a slow-to-release control relay R960, a rotary test relay R1010 and a control relay R1000.

The connector 20 is illustrated in Figs. 2, 3, 4, 5 and 6 of the drawings as being of the well-known Strowger type, having its contact field divided into ten levels of bank contacts. The four lowermost levels of this field are utilized to terminate the different groups of inter-office trunks extending to the community exchange, while the ninth and tenth levels are utilized to terminate the branch exchange trunks. As will be explained more fully hereinafter, these levels may also be entirely or partially utilized for the termination of subscriber lines. The fifth to eighth levels, inclusive, of the contact field are used for subscriber line termination exclusively.

Referring now more particularly to the connector 20, the Strowger switching mechanism thereof comprises four wipers 621, 622, 623 and 627, and the usual vertical and rotary magnets 417 and 507 which are respectively operative in conjunction with their associated ratchet and pawl mechanisms, not shown, to impart vertical and rotary movement to the enumerated wipers. This mechanism is also equipped with a release magnet 257 which, when energized, permits the wipers 621, 622, 623 and 627 to be returned to rotary and vertical normal, and four sets of vertical off-normal springs 224, 225, 259 and 425 which perform various circuit control operations described with particularity hereinafter. The switching mechanism further comprises a P. B. X arc 628 which is mounted upon the vertically extending frame rods of the mechanism opposite the inner side of the contact bank and is connected to ground. This arc, which is in the form of a curved metallic plate, is provided with ten sets of horizontally aligned openings which are vertically disposed one above the other at positions which correspond to the ten vertical off-normal positions of the wiper carriage structure. These openings are adapted to receive the contact pins 41, 42, 43, 91, 92, 93, etc. which may be removed and inserted at will and are arranged to be traversed by the wiper 627. This wiper is mounted upon the wiper carriage structure and moves with the wipers 621, 622 and 623. In order to provide the above-mentioned facilities for restricting the trunk service rendered to certain of the subscribers served by the community exchange the Strowger switching mechanism is also equipped with two sets of normal post springs 217, 218 and 219, and 205, 206, which are respectively operated when the wipers of the mechanism are vertically positioned opposite the contact levels in which are terminated three different groups of restricted inter-office trunks.

Figure 1:
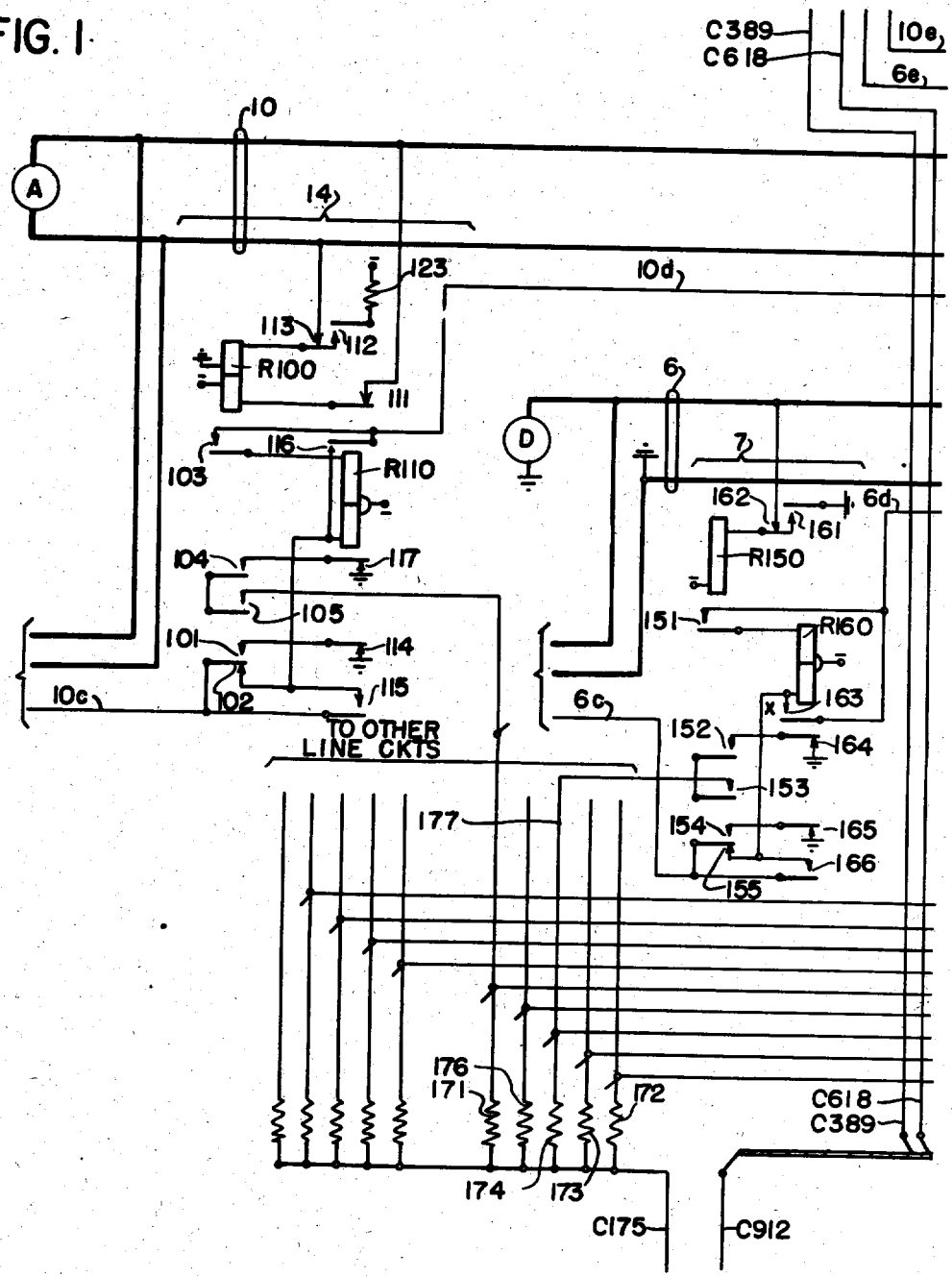
Figure 2A:
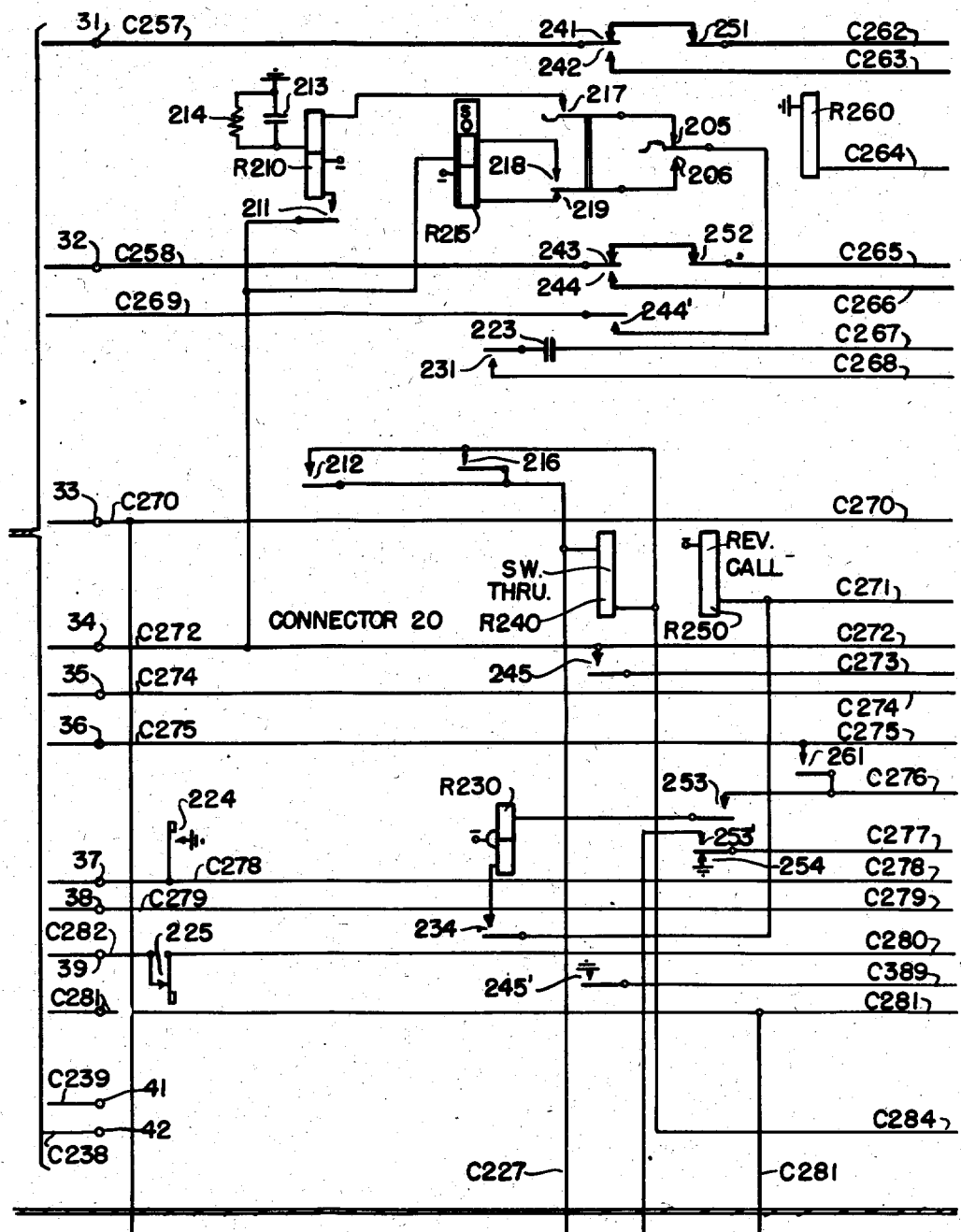
Figure 3A:
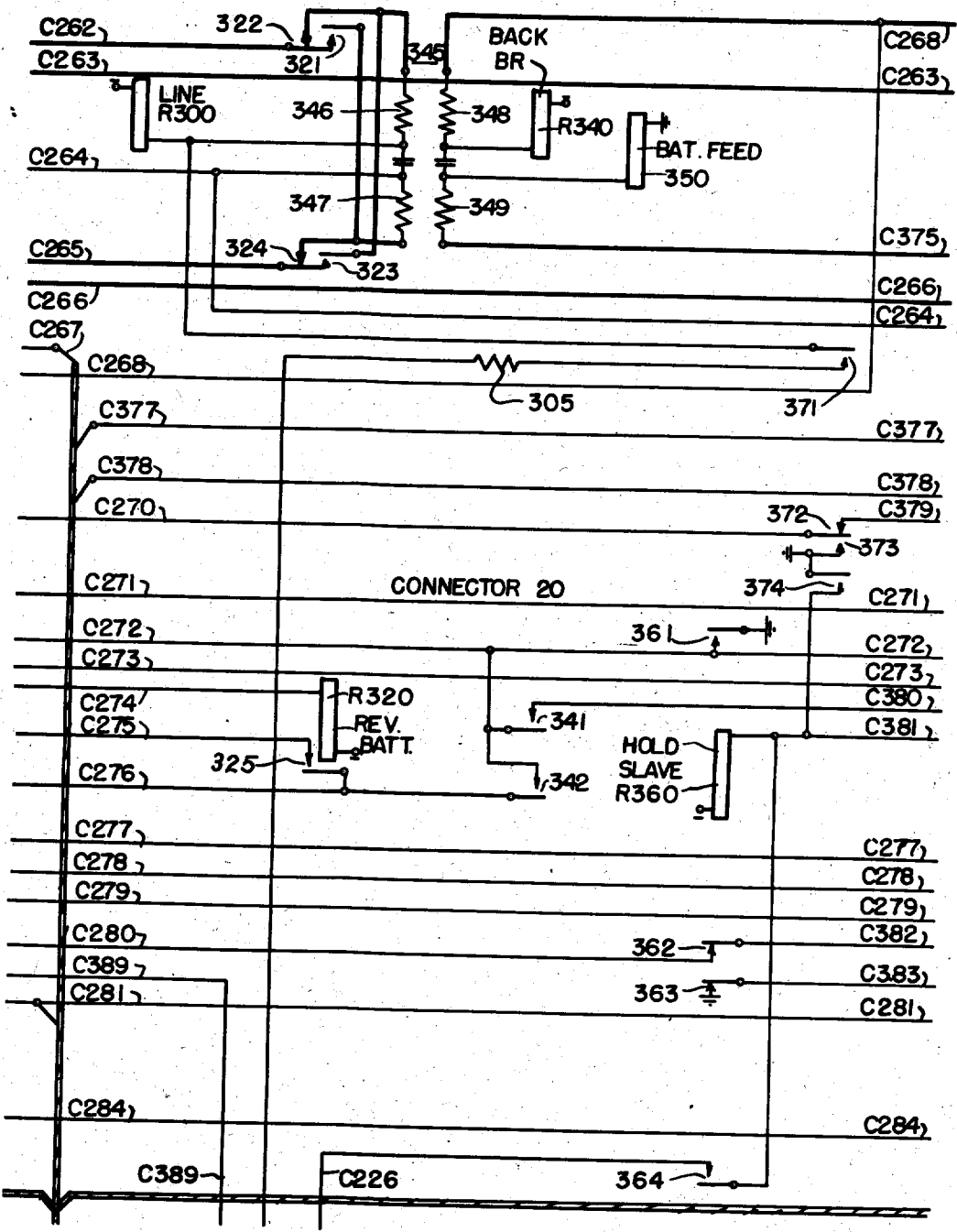
Figure 3B:
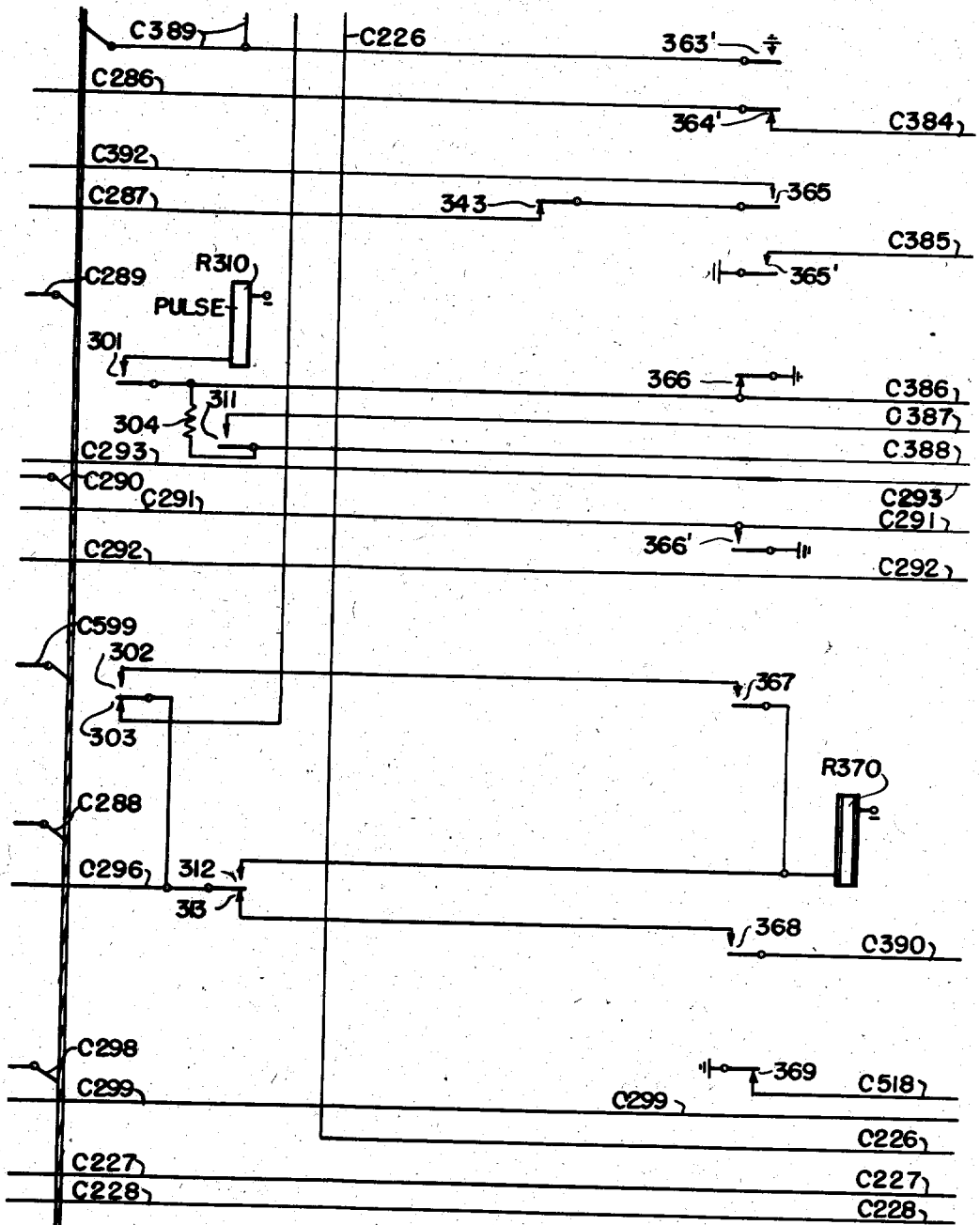
Figure 4A:
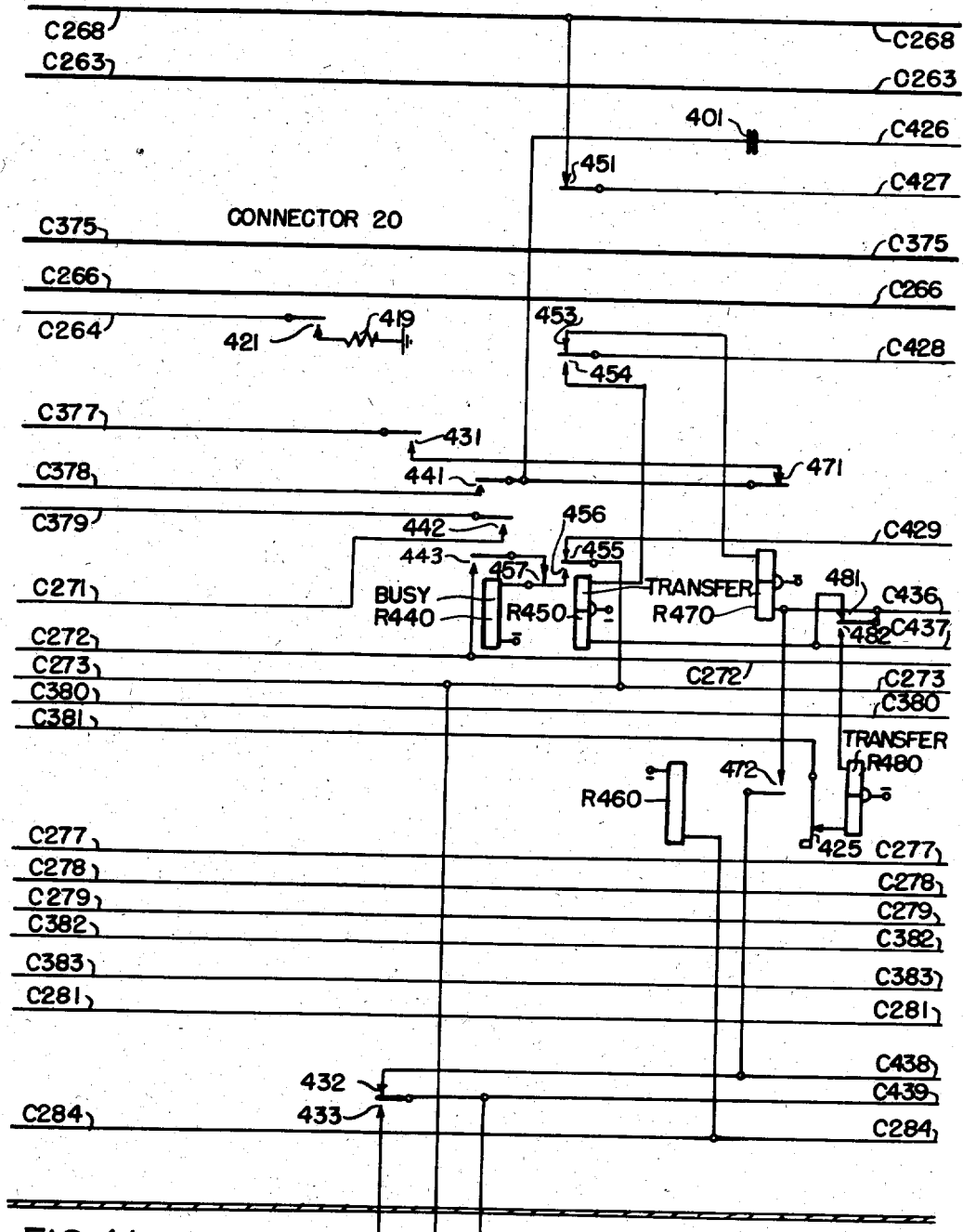
Figure 5A:
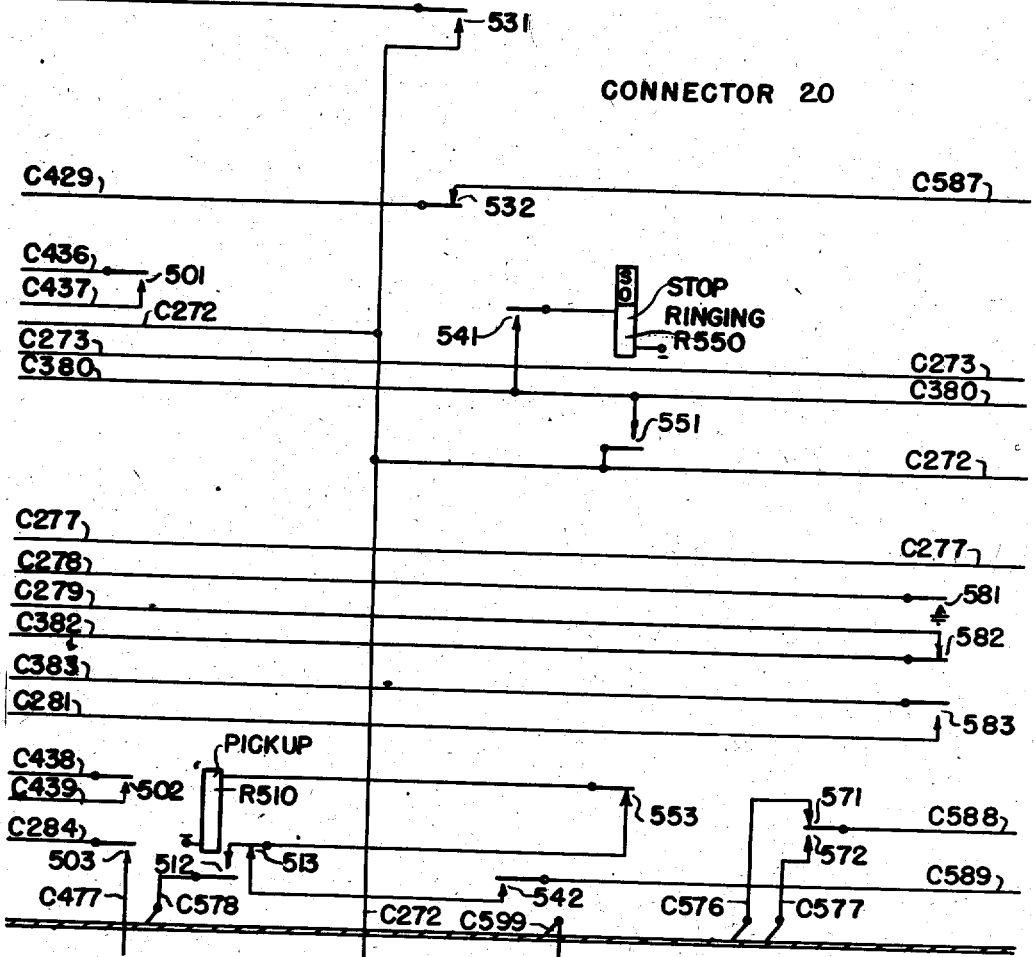

The equipment for controlling the vertical, rotary and release magnets of the Strowger switching mechanism embodied in the connector 20, and for performing the auxiliary control operations required incident to the setting up of the various types of connections, includes a pair of line relays R260 and R300 which are arranged to be energized in series over the two link talking conductors C251 and C250, a slow-acting hold relay R370, a hold slave relay R360, a pulsing relay R310, a battery reversing relay R320, a back-bridge relay R340, a battery feed coil 350, a switch-through relay R240, a reverting call relay R250, three timing relays R200, R220 and R230, and a pair of restricted service relays R210 and R215. Additional relays embodied in the connector 20 are shown in Figs. 4A and 4B of the drawings as including an impulse-controlled relay R420, a busy test relay R440, a trunk call relay R460, and four transfer relays R430, R450, R470 and R480. The relay equipment illustrated in Figs. 5A and 5B of the drawings comprises a first digit pulse transfer relay R500, a ring pickup relay R510, a trunk hunting relay R520, a slow-acting control relay R530, a control relay R540, a stop ringing relay R550, a pair of ringing control relays R560 and R570, and a control relay R580. Additional relays embodied in the connector 20 are illustrated in Figs. 6A and 6B of the drawings as including a slow-to-operate drain relay R600, a ringing relay R610, a slow-to-operate idle test relay R620, a line switching relay R630, a ring transfer relay R640, and a slow-acting ring cut-off relay R660.

The control equipment of the connector 20 also includes a minor switch 670 which functions in a novel manner to perform a variety of circuit control operations, all of which are described with particularity hereinafter. This switch, which is of the front stepping type, is provided with an eleven point contact field having three sets of contacts, the first two of which are arranged to be traversed by the wiper 671 and the last of which is arranged to be traversed by the wiper 672. These wipers are operated away from the illustrated normal positions thereof under the control of an operating magnet 673, and are spring-biased to return to normal when the release magnet 674 is energized. The operating mechanism of this switch also includes a set of off-normal springs 675 which is arranged to control the relay R580.

Figure 14:
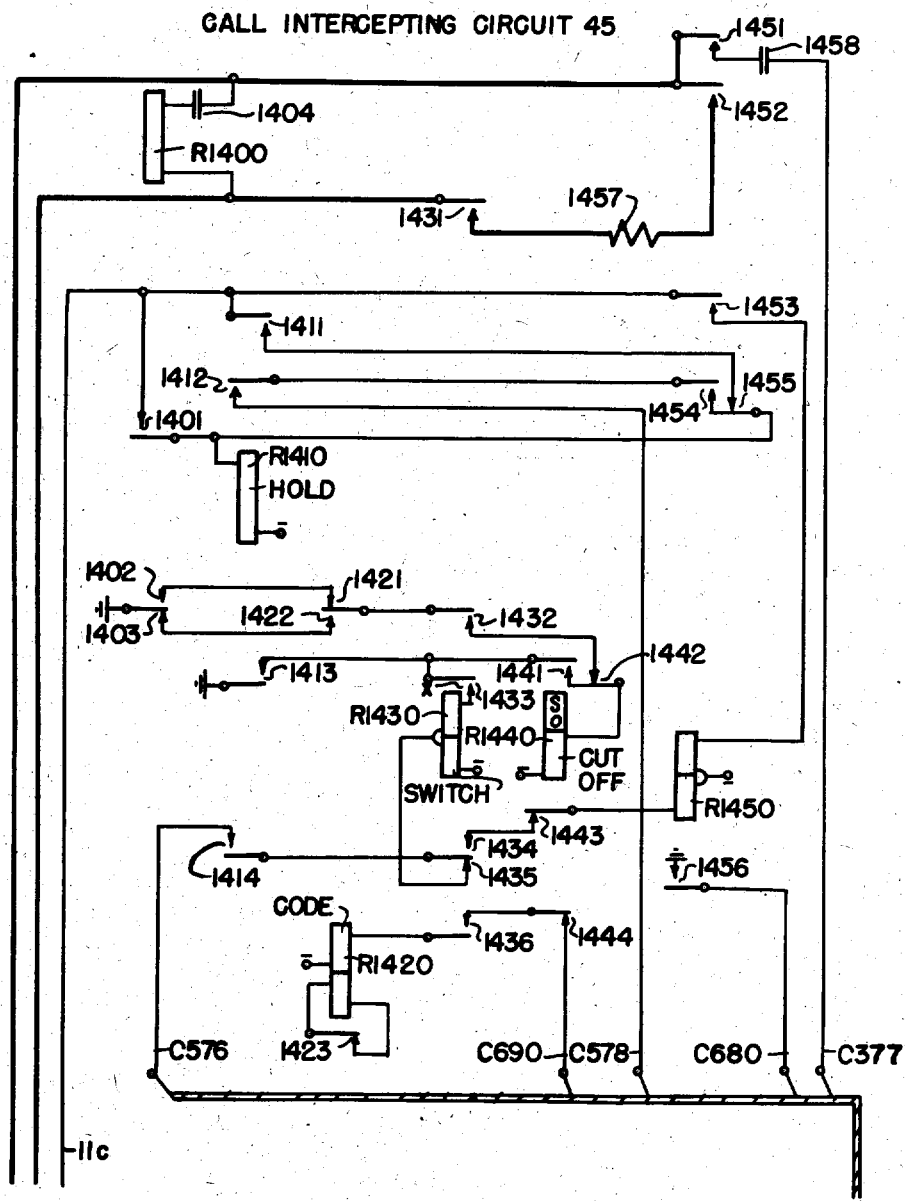

For the purpose of transmitting a distinctive call intercepting signal to calling subscribers who initiate calls intended for substations which are out of service or have been disconnected, one or more call intercepting circuits of the character shown in Fig. 14 of the drawings may be provided in the community exchange. This circuit, indicated generally at 45, is individual to the illustrated multiparty line 11 and is arranged to intercept calls to a substation which has been disconnected from this line. In brief, this circuit comprises an alternating current relay R1400 which responds to ringing current transmitted over the conductors of the line 11, a hold relay R1410, a slow-to-operate code relay R1420, a switching relay R1430, a slow-to-release cut-off relay R1440, and an intercepting relay R1450.

The service restricting facilities provided in the community exchange include a network 40 which is common to all of the finder-connector links and all of the lines upon which service restrictions are to be imposed. The function of this network is to produce at spaced intervals control pulses of three different types, i. e., ground pulses, negative battery pulses, and ringing current pulses, which respectively represent three different restrictions. In brief, this network comprises a start relay R1100, three connect relays R1200, R1210 and R1220, three pulsing relays R1230, R1240 and R1250, three slow-to-operate timing relays R1110, R1120 and R1130, and four sequence relays R1140, R1150, R1160 and R1170. The four last-mentioned relays are of the well known differentially wound type. If the number of lines upon which service restrictions are to be imposed is unusually large, the three connect relays R1200, R1210 and R1220 may be connected to control additional pulsing relays, not shown. In this regard it is noted that cross connections between the contacts of the pulsing relays and the line terminals of the lines upon which restrictions are to be imposed are made at a terminal frame 1260. On the left side of this frame, pulsing terminals are provided which connect with the contacts of the pulsing relays. On the right side of this frame terminals are provided which may be connected to the line terminals of the line switching equipment. An adequate number of terminals are provided on the frame 1260 and an adequate number of pulsing relays are provided to permit the restricting circuit of each line requiring a service restriction to be independently controlled.

Figure 13:
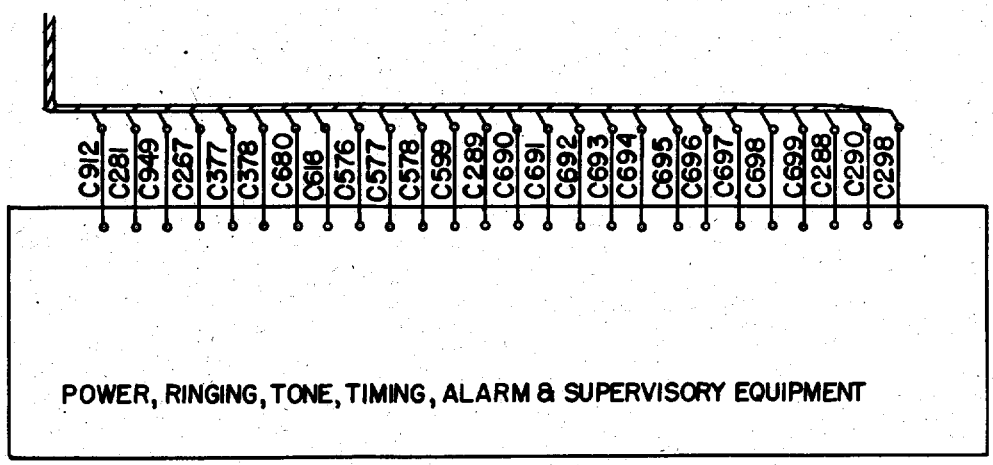

The power supply and supervisory signaling equipment provided in the exchange is only schematically illustrated in Fig. 13 of the drawings. This equipment is identical with that disclosed in copending application Serial No. 414,252, Clarence E. Lomax and Pier Bakker, filed October 9, 1941. In brief, this equipment includes the usual dial and busy tone generators, ringing current generating equipment, an exchange battery, and a current supply and battery charging system. This equipment further includes a set of alarm sending relays and supervisory signaling equipment which is arranged in a novel manner to produce supervisory signals indicative of a large number of faults which may occur in the system. For the purpose of providing the various ringing codes and timed ground and battery pulses required for the control of the finder-connector links and the battery charging equipment, and the additional purposes of producing interrupted signal voltages and the supervisory signals of different character, a single motor-driven, cam-operated interrupter of improved construction and arrangement is also included in the common equipment schematically shown in Fig. 13 of the drawings. The mode of operation of this equipment, in so far as it relates to the operation of the line switching equipment shown in the remaining figures of the drawings, will be clearly apparent from the following portion of the specification. It is pointed out, however, that corresponding reference characters are used in Fig. 13 of the drawings and in the above-referred to copending application to identify the same circuit conductors, in order that the mode of connecting the power and supervisory equipment of this copending application to the illustrated switching equipment will be readily understood.

DIRECTORY NUMBERING ARRANGEMENT

In order to facilitate an understanding of the following detailed description of the operation of the system, it is in order to first consider the directory numbering scheme which is utilized in designating the various lines terminated in the bank contacts of the several connectors. In this regard it may be arbitrarily assumed that each interoffice trunk group and each P. B. X trunk group includes four trunks. Based on this assumption, the following directory numbers may be assigned to the lines of different types, it being noted that the indefinite character "X" may be any number from 1 to 9 or 0:

Single digit 7—inter-office trunks terminated in the first contact levels of the connectors.
Single digit 8—inter-office trunks terminated in the second contact levels of the connectors.
Single digit 9—inter-office trunks terminated in the third contact levels of the connectors.
Single digit 0—inter-office trunks terminated in the fourth contact levels of the connectors.
191X, 291X or 391X—private branch exchange trunks terminated in the ninth contact levels of the connectors and arranged for selection through an automatic trunk hunting operation.
101X, 201X or 301X—private branch exchange trunks terminated in the tenth contact levels of the connectors and arranged for selection through an automatic trunk hunting operation.

105X, 205X, 305X, 405X or 505X to 100X, 200X, 300X, 400X or 500X—subscriber lines terminated in the tenth contact levels of the connectors.
195X, 295X, 395X, 495X or 595X to 190X, 290X, 390X, 490X or 590X—subscriber lines terminated in the ninth contact levels of the connectors.
115X, 215X, 315X, 415X or 515X to 110X, 210X, 310X, 410X or 510X—subscriber lines terminated in the first contact levels of the connectors.
125X, 225X, 325X, 425X or 525X to 120X, 220X, 320X, 420X or 520X—subscriber lines terminated in the second contact levels of the connectors.
135X, 235X, 335X, 435X or 535X to 130X, 230X, 330X, 430X or 530X—subscriber lines terminated in the third contact levels of the connectors.
145X, 245X, 345X, 445X or 545X to 140X, 240X, 340X, 440X or 540X—subscriber lines terminated in the fourth contact levels of the connectors.
151X, 251X, 351X, 451X or 551X to 180X, 280X, 380X, 480X or 580X—subscriber lines terminated in the fifth, sixth, seventh and eighth contact levels of the connectors.

From the above outline of the directory numbering scheme it will be noted that directory numbers differing only in the first digit thereof may be utilized to designate the same subscriber line. The purpose of this arrangement is to utilize the first digit as a vehicle for partially setting the ringing circuits which are used in signaling over a line of the multiparty type. More specifically, the first digits "1," "2" and "3" all designate bridged ringing, and one group of ten ringing codes. These first digits also indicate to the connector that P. B. X trunk hunting is required when P. B. X directory numbers are dialed. The first digit "4," when dialed into a connector, causes the P. B. X trunk hunting facilities to be disabled and indicates to the connector that a ringing code included in the first group of ten codes is to be utilized in ringing over the negative side of a line to be selected. The first digit "5," when dialed into a connector, indicates that a code in the second group of ten codes is to be utilized in ringing over the negative side of a line to be selected.

The second digit of any directory number dialed into one of the connectors is, in all cases, utilized to effect vertical movement of the Strowger switch wipers of the connector. Similarly, the third digit of any directory number dialed into one of the connectors is utilized to effect rotary operation of the Strowger switch wipers of the connector. The fourth digit is used to effect code selection and to indicate the side of the line over which ringing current is to be transmitted during the ringing operation. More specifically, a fourth digit of from one to five impulses, when dialed into a connector following a first digit of from one to three impulses, serves to effect the selection of the corresponding code in the first group of codes and to select the negative side of the selected line for ringing current transmission. On the other hand, when a fourth digit of from six to ten impulses is dialed into a connector following a first digit of from one to three impulses, the correspondingly numbered codes of the first group are in each case selected and the positive side of the selected line is selected for ringing current transmission.

LOCAL CALLS

Referring now more particularly to the operation of the illustrated finder-connector link to set up a connection between two subscriber lines terminating in the bank contacts thereof, a call originating at the substation A and intended for the substation B may be considered by way of example. When the handset provided at the calling substation A is removed from its supporting hook or cradle, a loop circuit is completed by way of the line 10 and the contacts 111 and 113 over which the two windings of the line relay R100 are energized in series. In operating, this relay closes its contacts 101 to impress ground potential upon the private conductor 10c of the line 10, whereby this line is marked as busy in the bank contacts of the various connectors. At its contacts 102, the relay R100 opens a point in one of the operating circuits for the cut-off relay R110. At its contacts 103, the relay R100 completes an obvious path for impressing negative battery potential upon the test conductor 10d, whereby the rotary position of the line 10 is marked in the bank contacts of the various finders. At its contacts 104 and 105, the relay R100 completes a path including the contacts 117 for impressing ground potential upon the fifth contact 861 of the vertical test contact set 860, thereby to mark the vertical position of the line 10 in the bank contacts of the finder. At its contacts 104 and 105, the relay R100 also completes a circuit for energizing the distributor start relay R910, this circuit extending from ground by way of the contacts 117, 104 and 105, the start lead 121, the resistor 171, C175, the contacts 902 and the winding of R910 to battery.

In operating, the relay R910 closes its contacts 911 to connect the delayed alarm conductor C912 to ground. At its contacts 913, the relay R910 completes the operating circuit for the control relay R920, this circuit extending from ground by way of the contacts 1006, C980, the contacts 940 and 913, the winding of R920, the contacts 961, C967, the contacts 1032 and the winding of the magnet 1031 to battery. The winding of the control relay R920 is of high resistance as compared with that of the magnet 1031 and, accordingly, this magnet does not operate when energized in the circuit just traced. The current traversing this circuit is, however, of sufficient magnitude to cause the operation of the control relay R920. In operating, this relay closes its contacts 921 to complete an obvious multiple circuit for energizing the all-links-busy relay R900. At its contacts 924, the relay R920 opens a point in one of the operating circuits for the magnet 1031. At its contacts 925, the relay R920 prepares an alternative operating circuit for this magnet. At its contacts 926, the relay R920 prepares an operating circuit for the test relay R940 and a locking circuit for the pulsing relay R930. At its contacts 927, the relay R920 completes a circuit for energizing the winding of the timing relay R950, this circuit extending from ground by way of the contacts 927, C978, the contacts 1004, C975 and the winding of R950 to battery. At its contacts 928, the relay R920 prepares a locking circuit for itself. At its contacts 922, the relay R920 prepares the operating circuit for the vertical magnet 838' of the Strowger switching mechanism embodied in the finder 19. At its contacts 923, the relay R920 completes the prepared operating circuit for the finder start relay R810, this circuit extending from ground by way of the contacts 923, C970, the wiper 1028 and its engaged first contact, C852, and the winding of R810 to battery.

The timing relay R950, upon operating, moves its armature 951 and its contacts 952 and 954 into engagement to complete an obvious circuit through the contacts 927 for energizing the slow-to-operate relay R960. The relay R960 now operates and locks to ground over a path including its contacts 964, the contact 952, the armature 951 and the contacts 927. At its contacts 965, the relay R960 completes the prepared locking circuit for the control relay R920, this circuit extending from ground by way of the contacts 965 and 928, the winding of R920, the contacts 901, C967, the contacts 1032, and the winding of the magnet 1031 to battery. At its contacts 962, the relay R960 prepares a locking circuit for the test relay R940. At its contacts 963, the relay R960 opens a point in one of the available operating circuits for the magnet 1031. At its contacts 961, the relay R960 completes a circuit, including the conductor C976, for energizing the upper winding of the relay R1000 in parallel with the upper winding of the relay R1010. It will be noted that the portion of this circuit which includes the upper winding of the relay R1010 also serially includes the current limiting resistor 1014. The current traversing this portion of the circuit is insufficient to cause the operation of the relay R1010, but serves to render this relay exceedingly fast to operate when its lower winding is subsequently energized.

The relay R1000, upon operating, locks to ground over a path including its contacts 1002, C970 and the contacts 923. At its contacts 1003, the relay R1000 further prepares the locking circuit for the test relay R940. At its contacts 1001, the relay R1000 prepares a circuit for energizing the lower winding of the rotary test relay R1010. At its contacts 1005, the relay R1000 completes a multiple locking circuit for the control relay R920, this circuit extending from ground by way of the contacts 1005, C979, the contacts 928, the winding of R920, the contacts 901, C967, the contacts 1032, and the winding of the magnet 1031 to battery. At its contacts 1006, the relay R1000 opens the previously traced operating circuit for the relay R920. At its contacts 1004, the relay R1000 opens the above-traced circuit for energizing the winding of the timing relay R950. When this winding is thus deenergized, the weighted armature 951 is released and starts to vibrate through its neutral position between two extreme positions, wherein the contacts 952 and 953 are respectively engaged thereby. Each time the armature 951 engages one of its two associated contacts 952 and 953, the locking circuit for the relay R960 is completed. Due to its slow-to-release characteristic this relay remains in its operated position until such time as the amplitude of vibration of the armature 951 is decreased sufficiently to prevent the engagement thereof with either of the two contacts 952 and 953. Thus a timing interval is measured through operation of the timing relay R950. During this interval the two relays R960 and R1000 are held operated so that the operation of the finder 19 to seize the calling line 10 may proceed.

Selecting the calling line

When the finder start relay R810 is energized in the above-traced circuit, operation of the finder 19 to search for the calling line 10 is initiated. In operating, this relay closes its contacts 811 to bridge the resistor 817 across the link talking conductors C257 and C258 and thus cause the energization and operation of the line relays R260 and R300, in the manner explained hereinafter. When the connector portion of the link is thus seized, certain of the relays embodied therein function in the manner fully explained below, to connect the hold conductor C272 and the control conductor C270 to ground. At its contacts 812, the relay R810 connects the control conductor C270 to ground and prepares one of the operating circuits for the cut-off relay R110. At its contacts 813, the relay R810 opens a point in one of the available paths for impressing ground potential upon the guard conductor C278 individual to the illustrated link. At its contacts 814, the relay R810 opens the all-trunks-busy circuit individual to the illustrated link and constituting one of the branch circuits over which the all-links-busy relay R900 is energized. At its contacts 814, the relay R810 also opens a point in the operating circuit for the release magnet 839. At its contacts 816, the relay R810 prepares the operating circuit for the rotary magnet 837. At its contacts 815, the relay R810 completes the prepared operating circuit for the vertical magnet 835', this circuit extending from ground by way of the contacts 922, 831 and 941, C968, the wiper 1006 and its engaged first contact, C854, the contacts 815 and the winding of the magnet 835' to battery. When energized in this circuit the magnet 835' elevates the wipers 831 to 835, inclusive, to a position opposite the first level of contacts in the associated contact field, and closes its contacts 836 to complete the prepared operating circuit for the pulsing relay R930. This circuit extends from ground by way of the interrupter lead C855 and the winding of R930 to battery. Incident to the vertical off-normal movement of the wipers 831 to 835, inclusive, the off-normal springs 841 are closed to prepare a path for impressing ground potential upon the guard conductor C278; the off-normal springs 843 are disengaged to open another point in the all-links-busy circuit individual to the illustrated link; and the off-normal springs 842 are engaged to prepare the operating circuit for the release magnet 839. In operating, the relay R930 opens its contacts 931 to deenergize the magnet 835'. In releasing, this magnet opens its contacts 836 to deenergize the pulsing relay R930. The relay R930, upon restoring, recloses its contacts 931 to again energize the vertical magnet 835'. In reoperating, the vertical magnet elevates the wipers 831 to 835, inclusive, a second step wherein they are positioned opposite the second level of contacts in the associated contact field, and closes its contacts 836 to again energize the pulsing relay R930. The inter-action between the vertical magnet 835' and the pulsing relay R930 continues until the wipers 831 to 835, inclusive, are elevated to a position opposite the marked fifth level of contacts in the associated contact field. More specifically, when the wiper 835 engages the marked contact 861, a circuit is immediately completed for energizing the upper winding of the vertical test relay R940 in series with the winding of the pulsing relay R930, this circuit extending from ground by way of the contacts 117, 104 and 105, the start lead 121, the contact 861, the wiper 835, the test lead C857, the wiper 1029 and its engaged first contact, C971, the contacts 943, the upper winding of R940, the contacts 926 and the winding of R930 to battery. The current traversing this circuit is sufficient to maintain the pulsing relay R930 in its operated position, whereby further operation of the vertical magnet 835' is prevented, and to cause the operation of the vertical test relay R940.

It will be noted that during the vertical movement of the finder wipers, a circuit including two of the resistors 171, 172, 173, 174, etc., is repeatedly completed for energizing the relay R930 and the upper winding of R940 in series. This circuit is initially completed incident to the first vertical step of the finder wipers and extends from ground by way of the contacts 117, 104 and 105, the start lead 121, the resistors 171 and 172 in series, the wiper 835 and the engaged first contact of the contact set 860, C957, the wiper 1029, C971, the contacts 943, the upper winding of R940, the contacts 826 and the winding of R930 to battery. It is altered successively to include the resistors 173, 174 and 176 in series with the resistor 171, incident to the second, third and fourth vertical steps of the finder wipers. The current traversing this circuit is, however, insufficient to cause the operation of the vertical test relay R940 or to prevent the release of the pulsing relay R930.

The vertical test relay R940, upon operating, first locks up in a circuit which includes its lower winding, its preliminary make contacts 945, the contacts 902, C977, the contacts 1003, C973, and the contacts 927. After this locking circuit is completed the relay R940 opens its contacts 941 to interrupt the above-traced operating circuit for the vertical magnet 835', and closes its contacts 942 to prepare the operating circuit for the rotary magnet 837. At its contacts 943, the relay R940 interrupts the above-traced circuit for energizing its own upper winding in series with the winding of the pulsing relay R930, whereby the latter relay is deenergized. At its contacts 944, the relay R940 further prepares the operating circuit for the rotary test relay R1010.

The pulsing relay R930, upon restoring, closes its contacts 931 to complete the prepared operating circuit for the rotary magnet 837, this circuit extending from ground by way of the contacts 922, 931 and 942, C969, the contacts 1011, C956, the contacts 816 and 868, and the winding of the magnet 837 to battery. When energized in this circuit the magnet 837 operates to rotate the wipers 831 to 834, inclusive, into engagement with the contacts forming the first contact set of the selected fifth level, and to rotate the wiper 835 out of engagement with the contact 861. Upon operating, the magnet 837 also closes its contacts 838 to complete the previously traced operating circuit for the pulsing relay R930. The relay R930 now operates and opens its contacts 931 to deenergize the rotary magnet 837. This magnet, in restoring, opens its contacts 838 to deenergize the pulsing relay R930. The inter-related operation of the magnet 837 and the pulsing relay R930 continues until the wipers 831 to 835, inclusive, are rotated to engage the contacts at which the conductors of the calling line 10 are terminated, or until all of the contact sets of the selected level have been tested and the wipers are rotated to the eleventh rotary off-normal positions thereof. In this regard it will be understood that the enumerated wipers are rotated one step each time the rotary magnet 837 is energized.

In the present case the rotary movement of the wipers 831 to 835, inclusive, is arrested when the test wiper 832 is operated to engage the test contact terminating the conductor 10d. At this time the above-mentioned circuit for energizing the lower winding of the rotary test relay R1010 is completed, this circuit extending from ground by way of the lower winding of R1010, the contacts 1001, C972, the contacts 944, C971, the wiper 1029 and its engaged first contact, C957, the wiper 832 and the engaged test contact individual to the line 10, the test conductor 10d, the contacts 103 and the upper winding of R110 to battery. When energized in this circuit the relay R1010 immediately operates and opens its contacts 1011 to interrupt the above-traced operating circuit for the rotary magnet 837, whereby rotary movement of the wipers 831 to 835, inclusive, is arrested. At its contacts 1013, the relay R1010 completes an obvious circuit for energizing the operating magnet of the peg count meter 1014, whereby the call is registered by this meter in the usual manner. At its contacts 1012, the relay R1010 prepares the operating circuit for the switch-through relay R800. Shortly following the operation of the rotary test relay R1010 to perform the functions described above, the pulsing relay R930 restores and closes its contacts 931 to complete the prepared operating circuit for the switch-through relay R800, this circuit extending from ground by way of the contacts 922, 931 and 942, C969, the contacts 1012, the wiper 1027 and its engaged first contact, C951 and the winding of R800 to battery.

In operating, the relay R800 locks to the grounded hold conductor C272 over a path including its contacts 805, it being noted above that the conductors C272 and C270 are connected to ground in the connector portion of the link before the calling line 10 is seized and in response to the operation of the line relay R309. At its contacts 801 and 802, the relay R800 extends the calling loop circuit to the connector portion of the link in an obvious manner. At its contacts 804, the relay R800 connects the EC wiper 834 to the EC conductor C268 to prepare a point in the common portion of the operating circuits for the restricted service relays R210 and R215. At its contacts 806, the relay R800 connects the guard conductor C218 to ground through the off-normal springs 841. At its contacts 807, the relay R800 opens a point in the operating circuit for the release magnet 839. At its contacts 808, the relay R800 opens another point in the operating circuit for the rotary magnet 837. At its contacts 803, the relay R800 completes a path including the control conductor C270 for impressing ground potential directly upon the test conductor 10d, and in so doing closes an obvious multiple circuit for energizing the upper winding of the cut-off relay R110. At its contacts 803, the relay R800 also completes a path for short-circuiting the lower winding of the relay R1010, this path extending from the grounded control conductor C270 by way of the contacts 803, C957, the wiper 1029, C971, the contacts 944, C972, the contacts 1001, and the lower winding of R1010 back to ground. The completion of this path serves to render the relay R1010 slow to release.

When the test wiper 832 is connected to ground through the contacts 803, a circuit including this wiper, the conductor 10d and the contacts 103 is completed for directly energizing the upper winding of the cut-off relay R110. In operating, this relay first locks up in a circuit including its lower winding, its preliminary make contacts 116, and the grounded test conductor 10d. After this locking circuit is completed the relay R110 opens its contacts 117 to disconnect the start conductor 121 from ground. At its contacts 114, 115 and 116, the relay R110 disconnects the private conductor 10c of the line 10 from ground in the line circuit 14, and connects this conductor to the grounded conductor 10d. At its contacts 112, the relay R110 completes an obvious circuit for energizing the upper winding of the line relay R100 in series with the resistor 123. At its contacts 111 and 113, the relay R110 disconnects the windings of the line relay R100 from the conductors of the line 10.

As explained in the previously cited Patent No. 2,199,534, Bakker, incident to the operation of the cut-off relay R110 the mechanical interlock between the armature of this relay and the armature of the line relay R100 functions to release the contact springs 103 and 105. At the contact springs 103, the initially completed circuit for energizing the upper winding of the cut-off relay R110 is broken. At the contact springs 105 another point is opened in the path over which the distributor start lead 121 was initially connected to ground.

Selecting an idle link

As indicated above, the distributor start lead 121 is disconnected from ground incident to the operation of the cut-off relay R110. If no other calling lines are awaiting the assignment of a link at the time this operation occurs, the start relay R910 of the distributor is deenergized and restores. On the other hand, if a second call is awaiting the assignment of a link, this relay is held energized over the distributor start lead extending to the line circuit associated with the other calling line and does not restore. Regardless of the position of the relay R910, however, a second link is selected in the distributor 21 immediately the switch-through relay R800 operates to connect the guard conductor C278 to ground. When ground potential is impressed upon this guard conductor, a circuit is completed for energizing the motor magnet 1031 of the switch 1020, this circuit extending from the grounded conductor C278 by way of the wiper 1030, C973, the contacts 925, C966, and the winding of the magnet 1031 to battery. When ground potential is impressed upon the guard conductor C278 a path is also completed for short-circuiting the control relay R920, this path extending from the grounded conductor C278 by way of the wiper 1030, C973, the contacts 925, C966, the contacts 932, C967, the contacts 901, the winding of R920, the contacts 928, C979 and the contacts 1005 back to ground. A branch of this path also extends to ground through the contacts 965. This short-circuiting path as well as the operating circuit for the control relay R920 is opened at the contacts 1032 incident to the operation of the magnet 1031. When thus deenergized the relay R920 restores and opens its contacts 925 to deenergize the magnet 1031. At its contacts 921, the relay R920 opens the multiple circuit for energizing the all-links-busy relay R900. At its contacts 922, the relay R920 opens a point in the previously traced circuits for energizing the two magnets 835' and 837 and the relay R800. At its contacts 923, the relay R920 opens the established locking circuit for the relay R1000 and the operating circuit for the relay R810. At its contacts 924, the relay R920 prepares or completes an alternative operating circuit for the magnet 1031, in the manner explained below. At its contacts 926, the relay R920 opens a point in the previously traced operating and locking circuits for the relays R930 and R940. At its contacts 927, the relay R920 opens the operating and locking circuits for the relays R940, R950 and R960. At its contacts 928, the relay R920 opens another point in its own locking circuit. In the present case the release of the relays R940, R950, R960, R1000 and R1010 is without effect.

The start relay R910, upon restoring, opens its contacts 811 to interrupt the path over which the resistor 817 is bridged across the talking conductors C257 and C258 of the link. At its contacts 812, the relay R810 disconnects the control conductor C270 from ground in the finder 19. At its contacts 813, the relay R810 completes an obvious multiple path for impressing ground potential upon the guard conductor C278. At its contacts 814, the relay R810 prepares the operating circuit for the release magnet 839. At its contacts 815, the relay R810 opens another point in the operating circuit for the vertical magnet 835'. At its contacts 816, the relay R810 opens another point in the operating circuit for the rotary magnet 837.

When the magnet 1031 is deenergized in the manner just explained, it functions to advance the wipers 1026 to 1030, inclusive, one step, whereby the common conductors extending from the distributor to the next available link are operatively associated with the control equipment of the distributor, in lieu of the control conductors which extend to the illustrated link. If the link thus selected is occupied with a call the guard conductor C1053 individual thereto is marked with ground potential, so that the above-mentioned alternative operating circuit for the magnet 1031 is completed. This circuit extends from the grounded conductor C1053 by way of the wiper 1030, C973, the contacts 924 and 901, C967, the contacts 1032 and the winding of the magnet 1031 to battery. In operating, the magnet 1031 opens its contacts 1032 to interrupt the circuit just traced, and then releases to advance the wipers 1026 to 1030, inclusive, another step wherein they engage the contacts terminating the control conductors extending to another of the links. If this link is also busy the guard conductor C1053 thereof is marked with ground potential so that the magnet 1031 is again energized. It will be understood from the above explanation that the magnet 1031 operates buzzer fashion to drive the wipers 1026 to 1030, inclusive, over the contacts of their associated contact sets until an idle one of the links is found. It will also be understood that an idle link is identified by the absence of ground potential upon the guard conductor thereof. Thus when the illustrated link is idle, the guard conductor C278, individual thereto, is disconnected from ground. Accordingly, when an idle link is found no further circuit is available for energizing the magnet 1031, and the operation of the switch 1020 is arrested. Thus an idle link is preselected for use.

In the event the start relay R910 occupies its restored position at the time the link hunting operation of the distributor switch 1020 occurs in the manner just explained, the control relay R920 is not energized incident to the selection of the idle link. On the other hand, if the start relay R910 occupies its operated position during the link hunting operation of the distributor switch 1020, the control relay R920 is energized over its above-traced operating circuit immediately the idle link is found. In reoperating, this relay initiates the operation of the finder portion of the selected link to seize the calling line in the exact manner explained above.

All-links-busy

As indicated above, the all-links-busy path or circuit individual to the illustrated link, and comprising the conductors C279 and C282, is opened in the finder 19 incident to the operation of the start relay R910. This circuit, when completed, extends from ground by way of the contacts 814, the off-normal springs 843, the contacts 822, C282, the off-normal springs 225, C280, the contacts 362, C382, the contacts 582, C279, and the winding of R900 to battery. Similar circuits individual to the other links are connected in parallel with the circuit individual to the illustrated link, and the all-links-busy relay R900 is held energized so long as any one of these circuits is completed. When, however, all of these circuits are opened to indicate that all of the links are occupied with calls, the all-links-busy relay R900 is deenergized and restores. In releasing this relay opens its contacts 901 to interrupt the above-traced operating circuit for the control relay R920 and the circuit for repeatedly energizing the magnet 1031 during the link hunting operation of the distributor switch 1020. Thus useless operation of the switch 1020 to search for an idle link is prevented. At its contacts 902, the relay R900 opens a point in the operating circuit for the start relay R910. At its contacts 903, the relay R900 prepares a circuit for energizing the operating magnet of the overflow meter 904. If a call is initiated on the line 10, for example, at a time when all of the links are busy, the call is registered through operation of the meter 904. In this case the relay R100, upon operating in response to the initiation of the call, completes a circuit for energizing the operating magnet of the indicated meter, this circuit extending from ground by way of the contacts 117, 104 and 105, the start lead 121, the resistor 171, C175, the contacts 903 and the winding of the meter operating magnet to battery. This circuit is obviously opened at the contacts 104 and 105 if the call is abandoned before a link is assigned to the calling line, or at the contacts 903 if a link becomes available for use before the call is abandoned. In this regard it will be understood that immediately one of the links such, for example, as the illustrated link, becomes idle, the all-links-busy circuit individual thereto is recompleted to cause the reoperation of the relay R900. This relay, upon reoperating, opens its contacts 903 to deenergize the operating magnet of the meter 904, if operated, and closes its contacts 902 to energize the start relay R910 if a call is awaiting the assignment of a link. At its contacts 901, the relay R900 recompletes the previously traced test circuit over which the operating magnet 1031 of the distributor switch 1020 is repeatedly energized until the idle link is found. After the idle link is located, operation of the switch 1020 is arrested and the control relay R920 is operated, providing a calling line is awaiting the assignment of a link. In this case the relay R920, upon operating, closes its contacts 921 to complete a multiple circuit for energizing the relay R900 and initiates the operation of the finder portion of the selected link to seize the calling line in the manner described above. The purpose of providing a locking circuit for the relay R900 which is controlled by the relay R920, is to prevent the premature release of the relay R900 before the calling line is seized when only one link is available for use. In this regard it will be understood that if none of the other links are released before the only available idle link functions to seize the calling line to which it is assigned, the distributor 21 again assumes its all-busy setting incident to the release of the control relay R920.

Finder failure

In the event the finder 19 fails to seize the calling line 10 within the time interval measured by the operation of the timing relay R950, a second finder-connector link is automatically assigned to the use of the calling line and operation of the finder portion of the second assigned link to search for the calling line is initiated. In this regard it will be recalled that the timing relay R950 is deenergized to initiate its timing operation substantially coincident with the operation of the control relay R920. If the apparatus utilized in handling the call is operating in its normal manner, the calling line will be seized and the control relay R920 deenergized before the timing operation of the relay R950 is completed. In such case the distributor operates in the manner explained above. If, however, the finder 19 fails to seize the calling line, the relay R950, upon concluding its timing operation, opens the circuit for energizing the slow-to-release relay R960. The latter relay now restores and opens its contacts 961 to deenergize the respective upper windings of the two relays R1000 and R1010. At its contacts 962, the relay R960 opens the locking circuit for the vertical test relay R940, causing the latter relay to restore, if operated. At its contacts 964, the relay R960 opens another point in its own locking circuit. At its contacts 965, the relay R960 opens one of the multiple locking circuits for the control relay R920. At its contacts 963, the relay R960 completes an alternative circuit for energizing the operating magnet 1031 of the distributor switch 1020, this circuit extending from ground by way of the contacts 927, C078, the contacts 1003, C077, the contacts 963 and 925, C066, and the winding of the magnet 1031 to battery. When thus energized the magnet 1031 opens its contacts 1032 to deenergize the control relay R920. The relay R920 now restores and opens its contacts 925 to deenergize the magnet 1031. At its contacts 923, the relay R920 opens the above-traced operating circuit for the start relay R910. The latter relay, in releasing, initiates the release of the illustrated link in the manner explained below. At its contacts 923, the relay R920 also opens the locking circuit for the relay R1000, causing the latter relay to restore. Following the release of the relay R1000 all of the distributor relays with the exception of the start relay R910 and the all-links-busy relay R900 are released. When the magnet 1031 is deenergized incident to the release of the relay R920, it advances the wipers 1025 to 1030, inclusive, out of engagement with the contacts individual to the illustrated link and into engagement with the contacts individual to the next available link. Thus a link testing operation on the part of the distributor switch 1020 is initiated. When an idle link is found the searching operation of the distributor switch 1020 is arrested and the control relay R920 is again energized. In reoperating, this relay initiates the operation of the finder portion of the newly selected link to search for the calling line 10 in a manner which will be clearly apparent from the above explanation. Incident to the reoperation of the relay R820, the relays R950, R960 and R1000 are also reoperated to initiate a second timing operation. If the newly assigned link also fails to find the calling line 10, a second link reassignment occurs so that a third link is appropriated for use in an attempt to seize the calling line. This substitution of links continues until a link is found which is successful in seizing the calling line.

Under certain circumstances a finder, although in proper working order, may fail to find a calling line for which it is searching. This type of finder failure may be due to an abnormal condition in the equipment, but is most frequently occasioned by the abandonment of the call on the line for which the finder is searching before the searching operation is well under way. In this regard it will be noted that the control relay R920 is locked in its operated position following the operation of the start relay R910. Accordingly, the searching operation of the finder 19, for example, will continue even though the call is abandoned on the calling line to cause the sequential release of the line relay R100, for example, and the start relay R910.

Assuming that the marking potentials are removed from the test contact 861 and the test conductor 10d during the operation of the finder 19 to seize the line 10, in the manner explained above, the vertical movement of the wipers 831 to 835, inclusive, is continued until these wipers are positioned opposite the tenth level of contacts in the associated contact field. At this time a circuit including the permanently grounded test contact 863 is completed for energizing the vertical test relay R940. This relay, in operating, transfers the pulsing circuit from the vertical magnet 835' to the rotary magnet 837 so that the wipers 831 to 835, inclusive, are rotated across the contacts forming the tenth level of the contact field. In the event a call awaiting link assignment is present on any one of the lines terminated in this level, this line will be seized during the rotary movement of the finder switch wipers. On the other hand, if none of the lines terminated in this level have calls awaiting link assignment present thereon, the rotary movement of the finder switch wipers will continue until these wipers are rotated to the eleventh off-normal positions thereof. Incident to the eleventh step of the rotary stepping mechanism, the cam springs 844 are closed to connect the guard conductor C278 to ground. When ground potential is impressed upon this conductor, operation of the distributor 21 is initiated to select another link. During the operation of the distributor to perform this function, the control relay R920 is deenergized and restores. In the event the failure of the finder 19 to seize the calling line is due to the abandonment of the call, the start relay R910 is deenergized and, accordingly, operation of the distributor 21 is arrested after a new link has been selected thereby. In the event the failure of the finder 19 to find the calling line 10 is due to an abnormal condition in the finder or the line circuit 14, the relay R910 is held in its operated position during and following the operation of the distributer 21 to select another link. Accordingly, after the link selection is completed, operation of the finder portion thereof to search for the calling line 10 is initiated.

Incident to the operation of the distributor switch 1020 to select another link, and more particularly when the control relay R920 restores to disconnect the start conductor C852 from ground, the start relay R910 is deenergized and restores. Incident to the release of this relay the resistor 817 is disconnected from across the link line conductors C257 and C258 to cause the release of the operated relays in the connector portion of the link, in the manner pointed out hereinafter. In restoring, the start relay R910 also closes its contacts 814 to complete a circuit through the off-normal springs 842 and the contacts 807 for energizing the release magnet 839. When this magnet is energized the wiper carriage structure of the Strowger switching mechanism in the finder 19 is restored to normal in the usual manner. Thus, the illustrated link is fully released.

From the above explanation it will be apparent that when several calls are received concurrently and the finder 19 is assigned to search for one of the calling lines, the wipers of this finder will first be operated to a position opposite the lowest level of contacts in which a call is waiting, and will then be rotated over the contacts of the selected level until they engage the contacts terminating the first line of the group upon which a call is present. It will also be apparent that after the line having the lowest number assignment in the finder bank contacts is seized in this manner, a second finder will immediately be started in search of the calling line having the next higher number assignment. This arrangement permits a certain amount of call stealing, which may be obviated by using slip multiples between the banks of the several finders. For example, a line having a low number assignment in the bank contacts of one of the finders may be terminated at a different set of contacts having a higher number assignment in the second finder. If such an arrangement is used, corresponding changes must be made in the wiring of the start conductors to the vertical test contacts 860 in the various finders. A slip multiple arrangement of this character is desirable since it tends to equalize the wear on the various finders and to average out the selection times for all of the lines.

*Fuse alarm*

As previously indicated, the link fuse stud relay R820 is normally deenergized. This relay is only energized when the fuse 824, through which current is supplied to all of the relays and magnets of the links, is disrupted. In the event this fuse is blown an obvious circuit is closed through the fuse stud 825 for energizing the relay R820. In operating this relay opens its contacts 822 to interrupt the all-links-busy circuit individual to the illustrated link and thus open one of the parallel circuits for energizing the all-links-busy relay R980 of the distributor. At its contacts 821, the relay R820 connects the guard conductor C278 directly to ground, so that the illustrated link is marked as busy in the distributor switch 1020 until the fuse 824 is replaced. At its contacts 823, the relay R820 connects the fuse alarm conductor C949 to ground. When this conductor is grounded the alarm sending relays forming a part of the equipment schematically illustrated in Fig. 13, function to transmit an alarm to a distant office in the manner explained in the above referred to co-pending application Serial No. 414,252, filed October 9, 1941, Lomax and Bakker. Also, the supervisory signaling circuits forming a part of this equipment are set to transmit a supervisory signal which indicates by the character thereof that the illustrated link is out of order. Obviously if the fault responsible for the blown fuse 824 is corrected and this fuse is replaced, the relay R820 is deenergized and restores to again render the illustrated link operative and to free the link for selection by the distributor switch 1020.

Call initiated on the line 6 of the ground return type

The manner in which lines of the ground return type may be seized by the finder 19, for example, and the response of the distributor 21 to a call initiated at a line of this character, are exactly the same as described above with reference to the call originating at the substation A. The operation of a line circuit terminating a line of this character is, however, slightly different. Thus if a call is initiated at the substation D served by the line 6, the line relay R150 is energized over a circuit which extends from ground through the switch springs of the hook or cradle switch provided at the substation D, by way of the negative side of the line 6, the contacts 162 and the winding of R150 to battery. In operating, this relay closes its contacts 151 to mark the test conductor 6d with negative battery potential, and closes its contacts 154 to impress ground potential upon the private conductor 6c of the line 6. At its contacts 152 and 153, the relay R150 connects the distributor start lead 177 to ground and impresses ground potential upon the test contact 864 of the vertical contact set 860. When the distributor start lead 177 is connected to ground, operation of the finder 19, for example, to search for the calling line 6 is initiated. Assuming that this line is seized in the manner previously explained, the cut-off relay R160 of the line circuit 7 is energized over the test lead 6d when ground potential is impressed upon the test wiper 833 in response to the operation of the switch-through relay R800. In operating, the relay R160 first locks to the grounded test conductor 6d through its preliminary make contacts 163, and then opens its contacts 164 to disconnect the distributor lead 177 from ground. At its contacts 163, 165 and 166, the relay R160 disconnects the private conductor 6c from ground in the line circuit 7, and connects this conductor to the grounded test conductor 6d. At its contacts 161, the relay R160 completes an obvious locking circuit for the relay R150. After this circuit is completed the relay R160 opens its contacts 162 to disconnect the winding of the line relay R150 from the negative side of the line 6. Incident to the operation of the cut-off relay R160 the mechanical interlock between the armature of this relay and the armature of the line relay R150 is operated to release the contact springs 151 and 153. At the contact springs 151 the above-traced circuit for energizing the upper winding of the relay R160 is opened. At the contact springs 153 another point is opened in the path over which the distributor start lead 177 was initially connected to ground.

Seizing the connector

When the calling loop circuit is extended to the connector through the finder 19 from the calling line 10 in the manner explained above, it includes the conductors C251, C258, C282, and C285, the repeating coil windings 346 and 347, the contacts 241, 243, 251, 252, 322 and 324, and the windings of the two relays R260 and R300 in series. When energized in this circuit the relay R260 closes its contacts 261 to prepare the operating circuit for the battery reversing relay R320. In this regard it will be noted that if the calling line 10 is of the ground return type, such that the positive line terminal thereof is connected to ground, the relay R260 will be short-circuited incident to the extension of the call to the connector 20 and, accordingly, will not operate to prepare the operating circuit for the battery reversing relay R320. It will be understood, therefore, that in no case can the control equipment of the connector function to reverse the battery connections to a calling line of the ground return type.

The line relay R300, upon operating, opens its contacts 303 to interrupt an incomplete priming circuit for itself. At its contacts 302, the relay R300 prepares a locking circuit for the slow-acting hold relay R370. At its contacts 301, the relay R300 completes a circuit through the contacts 366 for energizing the pulsing relay R310.

The relay R310, upon operating, locks to ground over a path including the contacts 301, the resistor 304, the contacts 311, C387 and the contacts 543. At its contacts 313, the relay R310 opens a point in the available but incomplete circuits for transmitting impulses to the relay R420 and the three magnets 673, 417 and 507. At its contacts 312, the relay R310 completes the operating circuit for the hold relay R370, this circuit extending from ground by way of the contacts 204 and 246, C296, the contacts 312 and the winding of R370 to battery.

The relay R370, upon operating, closes its contacts 371 to prepare the above-mentioned priming circuit for the line relay R300. At its contacts 373, the relay R370 connects the control conductor C270 to ground. At its contacts 374, the relay R370 completes an obvious circuit for energizing the hold slave relay R360. At its contacts 374, the relay R370 also completes a circuit for energizing the transfer relay R480, this circuit extending from ground by way of the contacts 374, C381, the off-normal springs 425 and the lower winding of R480 to battery.

The hold slave relay R360, upon operating, closes its contacts 361 to connect the release conductor C272 to ground and thus prepare several operating and locking circuits which are described with particularity hereinafter. When ground potential is impressed upon this conductor a locking circuit is prepared for the operated switch-through relay R800 of the finder 19 in the manner explained above. At its contacts 362, the relay R360 opens a point in the circuit individual to the illustrated finder-connector link over which the all-links-busy relay R900 is controlled. At its contacts 363, the relay R360 interrupts an incomplete path over which ground potential may be impressed upon the release alarm conductor C281. At its contacts 363', the relay R360 completes an obvious path for impressing ground potential upon the start lead C389, thereby to initiate or sustain the operation of the service restricting network 40 in the manner explained hereinafter. At its contacts 364, the relay R360 prepares a locking circuit for itself. At its contacts 364', the relay R360 opens a point in the operating circuit for the release magnet 257. At its contacts 365, the relay R360 prepares the operating circuit for the timing relay R260. At its contacts 365', the relay R360 completes a path including the conductor C365 and the contacts 637 for impressing ground potential upon the tone start conductor C380, thereby to initiate the operation of the dial and busy tone generators included in the apparatus schematically shown in Fig. 13 of the drawings. At its contacts 366, the relay R360 opens the initially completed operating circuit for the pulsing relay R310. At its contacts 366', the relay R360 completes an obvious path for impressing ground potential upon the hold conductor C291, thereby to prepare certain operating and locking circuits described with particularity hereinafter. At its contacts 367, the relay R360 completes the above-mentioned locking circuit for the hold relay R370, this circuit extending from ground by way of the contacts 204 and 246, C296, the contacts 362 and 367, and the winding of R370 to battery. At its contacts 368, the relay R360 prepares the common portion of the above-mentioned circuits for transmitting current pulses to the relay R420 and the three magnets 673, 507 and 417. At its contacts 369, the relay R360 opens a point in one branch of the operating circuit for the release magnet 674 of the minor switch 670.

The transfer relay R480, upon operating, closes its contacts 482 to prepare a locking circuit for itself. At its contacts 481, the relay R480 opens a point in the operating circuit for the transfer relay R450. At its contacts 483, the relay R480 prepares a path for impressing ground potential upon the wiper 671 of the minor switch 670. At its contacts 484, the relay R480 opens a point in the operating circuit for the relay R540. At its contacts 485, the relay R480 completes a circuit for energizing the transfer relay R430, this circuit extending by way of the grounded release conductor C272, the contacts 535, C496, the contacts 485 and the lower winding of R430 to battery. At its contacts 486, the relay R480 prepares the operating circuits for the pulse transfer relay R500 and the trunk hunting relay R520. At its contacts 486', the relay R480 opens a point in the operating circuit for the ring transfer relay R540. At its contacts 487, the relay R480 opens a point in one of the operating circuits for the release magnet 674. At its contacts 488, the relay R480 further prepares the circuit for transmitting current pulses to the operating magnet 673 of the minor switch 670. At its contacts 489, the relay R480 opens other incomplete circuits over which current pulses may be transmitted to the rotary magnet 507 and the operating magnet 673.

The transfer relay R430, upon operating, closes its contacts 433 to prepare a circuit for energizing its own upper winding in parallel with the upper winding of the relay R530. At its contacts 434, the relay R430 opens one of the circuits over which impulses may be transmitted to the vertical magnet 417. At its contacts 435, the relay R430 further prepares one of the circuits for transmitting impulses to the operating magnet 673 of the minor switch 670. At its contacts 431, the relay R430 completes a circuit for transmitting the usual dial tone signal over the established loop circuit to the calling substation A. This signaling circuit may partially be traced as extending from the high potential side of the dial tone generator by way of dial tone conductor C371, the contacts 431 and 471, the condenser 401, C426, the contacts 632, C427, and the contacts 451 to the negative link line conductor C268. From this point the dial tone signal current is transmitted through the repeating coil 345 and over the calling end of the connection to energize the receiver of the handset provided at the calling substation A. Following the operation of the transfer relay R430, the connector 20 is conditioned to respond to the impulses of the first digit dialed at the calling substation.

Dialing the first digit

Assuming that the directory number designating the desired substation B is "3453," the first digit dialed at the calling substation A will necessarily comprise three impulses. During the open circuit period of each impulse the two relays R260 and R300 both restore. These relays obviously reoperate at the end of each open circuit period and remain operated at the end of each digit. The response of the relay R260, if any, is of no effect. The line relay R300, upon restoring at the beginning of the first impulse, opens its contacts 301 to interrupt the locking circuit for the pulsing relay R310. At its contacts 302, the relay R300 opens the above-traced locking circuit for the hold relay R370. At its contacts 303, the relay R300 closes the above-mentioned priming circuit for itself, this circuit extending from ground by way of the contacts 204 and 246, C296, the contacts 303, the resistor 305, the contacts 371 and the winding of R300 to battery. The current traversing this circuit is insufficient to cause the reoperation of the relay R300, but serves to render this relay exceedingly fast-to-operate when the loop circuit is subsequently recompleted at the calling substation.

The relay R310, upon restoring in response to the release of the line relay R300, opens its contacts 311 further to interrupt its own locking circuit, and opens its contacts 312 to interrupt the operating circuit for the hold relay R370. At its contacts 313, the relay R310 completes the prepared operating circuit for the magnet 673, this circuit extending from ground by way of the contacts 204 and 246, C296, the contacts 313 and 368, C390, the contacts 547, C517, the contacts 488 and 435, C459, the contacts 504, C523, and the winding of the magnet 673 to battery. A parallel branch of this circuit extends from the conductor C517 through the lower winding of the pulse-controlled relay R420. When thus energized the relay R420 first closes its preliminary make contacts 424, thereby to short-circuit its upper winding and thus render itself slow-to-release. At its contacts 423, the relay R420 opens a point in the above-mentioned path for impressing ground potential upon the wiper 671 of the minor switch 670. At its contacts 422, the relay R420 completes the above-mentioned circuit for energizing the upper winding of the transfer relay R430 in parallel with the upper winding of the control relay R530, this circuit extending from ground by way of the contacts 366', C291, the contacts 422, and the contacts 433 to the conductor C449 where it divides, one branch extending through the upper winding of the transfer relay R430 to battery and the other branch extending through the upper winding of the relay R530 to battery. At its contacts 421, the relay R420 completes a path for short-circuiting the winding of the relay R260, thereby to exclude this winding from the calling loop circuit. This path may be traced as extending from ground by way of the resistor 419, the contacts 421, C264, and the winding of R260 back to ground.

When its upper winding is energized in the manner just explained, the relay R530 operates and opens its contacts 535 to interrupt the operating circuit for the transfer relay R430. At its contacts 534, the relay R530 prepares the operating circuit for the trunk hunting relay R520. At its contacts 533, the relay R530 prepares one of the operating circuits for the rotary magnet 507. At its contacts 532, the relay R530 opens a point in the operating circuit for the idle test relay R520. At its contacts 531, the relay R530 completes the operating circuit for the transfer relay R470, this circuit extending from the grounded release conductor C272 by way of the contacts 531, C628, the contacts 453, and the upper winding of R470 to battery.

When thus energized the relay R470 closes its contacts 472 to prepare a locking circuit for itself and the relay R460, and opens its contacts 471 to interrupt the previously traced dial tone signaling circuit. At its contacts 473, the relay R470 prepares one of the several available circuits for energizing the pulsing relay R310. At its contacts 474, the relay R470 opens a point in one of the operating circuits for the rotary magnet 607. At its contacts 475, the relay R470 further prepares the operating circuit for the trunk hunting relay R520. At its contacts 475', the relay R470 opens a point in another circuit over which the trunk hunting relay R520 may be energized. At its contacts 476 the relay R470 completes a locking circuit for the control relay R530, this circuit extending by way of the grounded release conductor C272, the contacts 476, C493 and the lower winding of R530 to battery. At its contacts 476', the relay R470 opens a point in the circuit for energizing the lower winding of the control relay R530 in parallel with the rotary magnet 607. At its contacts 477, the relay R470 opens another point in the operating circuit for the relay R540. At its contacts 477', the relay R470 prepares one of the available operating circuits for the release magnet 674. At its contacts 478, the relay R470 prepares the circuit over which current pulses may be transmitted to the rotary magnet 607 under the control of the pulsing relay R310. At its contacts 479, the relay R470 opens a point in the available alternative circuit over which current pulses may be transmitted to the operating magnet 673 of the minor switch 670.

From the above explanation it will be understood that the relays R420, R530 and R470 are caused to operate when the pulsing relay R310 releases at the beginning of the open circuit period of the first impulse. At the end of this period the line relay R300 reoperates and closes its contacts 301 to reprepare the operating circuit for the pulsing relay R310. At its contacts 303, the relay R300 opens the above-traced priming circuit for itself. At its contacts 302, the relay R300 recompletes the locking circuit for the hold relay R370.

When its winding is energized over the above-traced pulsing circuit the rotary magnet 673 attracts its associated armature and thus causes the two wipers 671 and 672 to be stepped one step from the illustrated normal positions thereof into engagement with their associated first contacts. Incident to the off-normal movement of these wipers the off-normal springs 675 are closed to energize the relay R580 over a circuit including the conductor C604. This relay, in operating, closes its contacts 581 to impress ground potential upon the link guard conductor C270 and thus maintain the busy marking of the illustrated link in the distributor switch 1020. At its contacts 582, the relay R580 opens another point in the previously described all-links-busy circuit individual to the illustrated link. At its contacts 583, the relay R580 prepares a path for impressing ground potential upon the release alarm conductor C281. At its contacts 585, the relay R580 prepares the operating circuit for the relay R540. At its contacts 586, the relay R580 prepares the operating circuits for the release magnet 674 of the minor switch 670.

In operating, the magnet 673 also closes its contacts 676 to prepare or complete an alternative operating circuit for the pulsing relay R310, this circuit extending from ground by way of the contacts 548, C597, the contacts 676, C386, the contacts 301 and the winding of R310 to battery. Assuming that the line relay R300 is reoperated before the rotary magnet 673 completes its operation, this circuit is completed at the contacts 676 incident to the operation of the magnet 673. On the other hand, if the magnet 673 completes its operation prior to the reoperation of the line relay R300, this circuit is first prepared at the contacts 676 and is completed at the contacts 301 incident to the reoperation of the relay R300. In reoperating, the relay R310 closes its contacts 311 to recomplete its locking circuit as traced above and opens its contacts 313 to interrupt the above-traced circuit for energizing the magnet 673 in parallel with the lower winding of the pulse-controlled relay R420. At its contacts 312, the relay R310 recompletes the operating circuit for the hold relay R370. Due to the slow-to-release characteristics thereof, the hold relay R370 does not restore during impulsing and the pulse-controlled relay R420 is maintained in its operated position throughout each series of impulses transmitted thereto. During each of the two succeeding impulses of the first digit the two relays R300 and R310 interact with the operating magnet 673 of the minor switch 670 in the exact manner explained above. Thus three current pulses are transmitted to the parallel-connected windings of the magnet 673 and the relay R420. It will be understood, therefore, that the wipers 671 and 672 are operated to engage their respective associated third contacts in response to the dialing of the first digit "3" at the calling substation A.

At the end of the digit and during the interdigit pause separating this digit from the second digit, the two relays R300 and R310 are held operated for a sufficient time interval to permit the release of the pulse-controlled relay R420. In releasing, this relay opens its contacts 424 to interrupt the path short-circuiting its upper winding. Thus the relay R420 is rendered fast-to-operate. At its contacts 421, the relay R420 opens the path short-circuiting the winding of the relay R260, permitting the latter relay to again be energized in series with the line relay R300 over the calling loop circuit. At its contacts 423, the relay R420 again prepares the path for impressing ground potential upon the wiper 671. At its contacts 422, the relay R420, in releasing, opens the above-traced circuit for energizing the respective upper windings of the two relays R430 and R530 in parallel. At this time the relay R430 is fully deenergized and restores. In releasing, the relay R430 opens its contacts 431 farther to interrupt the above-traced dial tone signaling circuit, and closes its contacts 432 to prepare a locking circuit for the two transfer relays R470 and R430. At its contacts 433, the relay R430 further interrupts the circuit for energizing its upper winding in parallel with the upper winding of the relay R530. At its contacts 435, the relay R430 opens the circuit over which current pulses were transmitted to the operating magnet 673 during the dialing of the first digit. At its contacts 434, the relay R430 prepares a circuit for transmitting current pulses to the vertical magnet 417 during the dialing of the second digit.

Dialing the second digit

When the second digit "4" is dialed at the calling substation A, the two relays R300 and R310 cooperate to transmit four current pulses to the winding of the vertical magnet 417 and the lower winding of the pulse-controlled relay R420 in parallel. Thus when the pulsing relay R310 first restores the lower winding of the relay R420 is energized over its operating circuit as traced above. With the transfer relay R430 in its restored position, a branch of this circuit extends from the conductor C517 by way of the contacts 488 and 434 through the winding of the vertical magnet 417 to battery. Upon reoperating at the beginning of the second digit, the relay R420 recloses its contacts 421 to again exclude the winding of the relay R260 from the calling loop circuit. At its contacts 422, the relay R420 completes the above-mentioned locking circuit for the two transfer relays R470 and R480, this circuit extending by way of the grounded hold conductor C291, the contacts 422 and 432 to the contacts 472 where it divides, one branch extending through the lower winding of R470 to battery and the second branch extending through the contacts 482 and the upper winding of R480 to battery.

Each time the vertical magnet 417 is energized in response to the release of the pulsing relay R310, it cooperates with its associated ratchet and pawl mechanism to elevate the wipers 621, 622, 623 and 627 one step, and closes its contacts 419 to reprepare or recomplete the operating circuit for the pulsing relay R310, depending upon the position of the line relay R300. This circuit, which now extends from ground by way of the contacts 419, C396, the contacts 301 and the winding of R310 to battery, is obviously completed at the contacts 419 if the line relay R300 reoperates before the magnet 417 completes its operation. On the other hand this circuit is only prepared at the contacts 419 and is recompleted at the contacts 301 in the event the vertical magnet 417 fully operates before the line relay R300 reoperates.

Incident to the first vertical step of the wipers 621, 622, 623 and 627, the vertical off-normal spring 425 are disengaged to deenergize the lower winding of the transfer relay R480; the off-normal springs 259 are moved into engagement to prepare the operating circuit for the release magnet 257; the off-normal springs 226 are disengaged to open another point in the previously traced all-links-busy circuit individual to the illustrated link; and the off-normal springs 224 are engaged to complete an obvious multiple path for impressing ground potential upon the link guard conductor C278. It will be understood that since four impulses are transmitted to the line relay R300 during the second digit, the wipers 621, 622, 623 and 627 are left standing in a position opposite the fourth level of contacts in the associated contact field at the end of the digit. During the inter-digit pause between the second and third digits the two relays R300 and R310 are held operated for an interval sufficient to cause the release of the pulse-controlled relay R420. This relay, in restoring, opens its contacts 422 to interrupt the above-traced locking circuits for the two transfer relays R470 and R480. When thus fully deenergized the relay R480 restores and closes its contacts 481 to prepare the operating circuit for the transfer relay R450. At its contacts 482, the relay R480 opens another point in its own locking circuit. At its contacts 483, the relay R480 opens the path for impressing ground potential on the minor switch wiper 671. At its contacts 484, the relay R480 prepares the operating circuit for the relay R540. At its contacts 485, the relay R480 opens another point in the operating circuit for the transfer relay R430. At its contacts 487, the relay R480 completes the prepared operating circuit for the release magnet 674, this circuit extending from ground by way of contacts 477' and 487, C518, the contacts 585, C519, and the winding of the magnet 674 to battery. When energized in this circuit the magnet 674 attracts its associated holding pawl to permit the wipers 671 and 672 to be returned to their illustrated normal positions. Incident to the release of the minor switch 670, the off-normal springs 675 thereof are disengaged to deenergize the relay R580. This relay, in restoring, opens its contacts 585 to interrupt the above-traced operating circuit for the release magnet 674. At its contacts 585, the relay R580 opens the incomplete operating circuit for the toll monitor relay R540. At its contacts 581, the relay R580 interrupts the path initially completed in the connector 20 for impressing ground potential upon the guard conductor C278. At its contacts 582, the relay R580 reprepares the all-links-busy circuit individual to the illustrated link. At its contacts 583, the relay R580 opens another point in the prepared path for impressing ground potential upon the release alarm conductor C281.

The transfer relay R480, upon restoring, also opens its contacts 488 and closes its contacts 489, whereby the impulsing circuit controlled by the pulsing relay R310 is transferred from the vertical magnet 417 to the rotary magnet 507. Following the operations just described the connector 20 is conditioned to respond to the impulses of the third digit of the directory number designating the desired substation.

Dialing the third digit

During the dialing of the third digit "5" the two relays R300 and R310 cooperate to transmit five current pulses to the lower winding of the pulse-controlled relay R420 and the rotary magnet 507 in parallel. In this case the current pulses are transmitted to the rotary magnet 507 over a circuit which extends from ground by way of the contacts 204 and 246, C296, the contacts 313 and 366, C390, the contacts 547, C517, the contacts 489 and 478, C490 and the winding of the magnet 507 to battery. Upon reoperating at the beginning of the third digit, the relay R420 again closes its contacts 422 to recomplete the previously traced locking circuit for the transfer relay R470. At the contacts 422 a circuit is also completed for energizing the transfer relay R450, this circuit extending by way of the grounded hold conductor C291, the contacts 422, 432, 472 and 451, and the lower winding of R450 to battery. At its contacts 421, the relay R420 completes the previously traced path for short-circuiting the winding of the relay R260.

The transfer relay R450, upon operating, locks to the grounded release conductor C272 over a circuit which includes its upper winding, the contacts 454, C428, and the contacts 531. At its contacts 451, the relay R450 opens another point in the previously traced dial tone signaling circuit. At its contacts 453, the relay R450 opens the previously traced operating circuit for the transfer relay R470. At its contacts 455, the relay R450 opens another point in the operating circuit for the idle test relay R620. At its contacts 456, the relay R450 prepares a test circuit over which the busy test relay R440 may be operated in the event the called line is busy. At its contacts 457, the relay R450 opens a point in the locking circuit for the busy test relay R440.

Each time the rotary magnet 507 is energized over the previously traced circuit, it functions to step the wipers 621, 622, 623, and 627 one step in the rotary direction, so that at the conclusion of the third digit these wipers are left standing in engagement with the contacts terminating the conductors of the called line 11. Each time the magnet 507 operates it also closes its contacts 508 to prepare or complete the operating circuit for the pulsing relay R310, in the exact manner previously described with reference to the operation of the vertical magnet 417 and the operating magnet 673 of the minor switch 670. In the present case, however, the rotary magnet 507 prepares or completes a slightly different circuit for energizing the pulsing relay R310, this circuit extending from the grounded release conductor C272 by way of the contacts 533, C446, the contacts 473, C456, the contacts 508, C308, the contacts 301, and the winding of R310 to battery.

Incident to the rotary movement of the wipers 621, 622, 623 and 627, over the contacts of the selected fourth level, the busy test relay R440 is operated each time the test wiper 623 encounters a contact terminating the private conductor of a busy line. The resulting operation and release of this relay which occurs during the indicated movement of the enumerated wipers, is without effect.

Busy test

In the event the called line 11 is busy at the time it is selected in the manner just explained, the private conductor 11c thereof is marked with ground potential, so that the busy test relay R440 is energized in the above-mentioned test circuit incident to the operation of the wiper 623 into engagement with the contact terminating this conductor. This circuit may now be traced as extending from ground by way of the conductor 11c, the wiper 623, C273, the contacts 456, and the winding of R440 to battery. In operating, the relay R440 closes its contacts 443 to prepare a locking circuit for itself, and closes its contacts 442 to prepare a circuit for energizing the reverting call relay R250. At its contacts 441, the relay R440 prepares a circuit for transmitting busy tone signaling current over the calling end of the connection. At its contacts 444, the relay R440 prepares one of the available circuits for energizing the trunk hunting relay R520. At its contacts 446, the relay R440 opens a point in the operating circuits for the switch-through relay R240 and the idle test relay R620.

Shortly following the operation of the busy test relay R440 to perform the functions just described, the pulse-controlled relay R420 restores and opens its contacts 422 to deenergize the transfer relay R470. The latter relay, upon restoring, opens its contacts 476 to deenergize the slow-acting relay R530. At its contacts 478, the relay R470 opens another point in the above-traced circuit for transmitting current pulses to the rotary magnet 507. At its contacts 479, the relay R470 prepares the previously mentioned alternative circuit for transmitting current pulses to the operating magnet 673 of the minor switch 670 during the dialing of the fourth digit. At its contacts 471, the relay R470 reprepares the above-described dial tone signaling circuit. The relay R530, upon restoring, opens its contacts 531 to deenergize the transfer relay R450, and closes its contacts 532 to prepare the operating circuit for the idle test relay R620. At its contacts 535, the relay R530 reprepares the operating circuit for the transfer relay R430.

The transfer relay R450, upon restoring, closes its contacts 457 to complete the prepared locking circuit for the busy test relay R440, this circuit extending by way of the grounded release conductor C272, the contacts 443 and 457, and the winding of R440 to battery. After this circuit is completed the relay R450 opens its contacts 456 to interrupt the operating circuit for the busy test relay, and closes its contacts 455 to prepare the operating circuit for the idle test relay R620. At its contacts 454, the relay R450 opens another point in its own locking circuit. At its contacts 453, the relay R450 reprepares the operating circuit for the transfer relay R470. At its contacts 451, the relay R450 completes the above-mentioned busy tone signaling circuit. This circuit may partially be traced as extending from the high potential terminal of the busy tone generator, interrupter springs of the motor-driven interrupter included in the apparatus shown in Fig. 13 of the drawings, C378, the contacts 441, the condenser 401, C426, the contacts 632, C427, and the contacts 451 to the negative link line conductor C268. From this point the interrupted busy tone current is transmitted through the windings of the repeating coil 345 and over the calling end of the connection to energize the receiver of the handset provided at the calling substation A. The resulting busy signal serves to inform the calling party that the desired connection cannot be obtained.

Idle test

In the event the called line 11 is idle at the time it is selected in the manner explained above, the private conductor 11c thereof is marked with negative battery potential so that the winding of the busy test relay R440 is short-circuited over the test circuit as traced above and does not operate. Shortly thereafter, and when the relays R420, R470, R530 and R450 sequentially restore in the order named and in the manner previously explained, the operating circuit for the idle test relay R620 is completed, this circuit extending from ground by way of the release conductor C272, the contacts 446 and 466, C524, the winding of R620, C527, the contacts 532, C429, the contacts 455, C273, the wiper 623, the private conductor 11c, and the cut-off winding of the cut-off relay provided in the line circuit 15, to battery. When energized in this circuit the relay R620 operates after a short interval and closes its contacts 621' to complete a circuit including the grounded hold conductor C291 for energizing the switching relay R630.

In operating, the relay R630 first locks to the grounded hold conductor C291 through its contacts 636. At its contacts 631 and 634, the relay R630 prepares a talking connection between the calling and called lines and prepares a circuit for transmitting ringing current over the called line 11. At its contacts 632, the relay R630 opens a point in the common portion of the previously traced dial and busy tone signaling circuits. At its contacts 633, the relay R630 prepares a circuit for transmitting ringing current over the calling end of the connection to produce the usual ring-back tone signal during the ringing operation. At its contacts 635, the relay R630 completes a circuit for short-circuiting the winding of the idle test relay R620, this path extending from ground by way of the contacts 254, C277, the contacts 635, C273, the contacts 455, C429, the contacts 532, C567, the winding of R620, C624, the contacts 466 and 446, and the release conductor C272 back to ground. At its contacts 636, the relay R630 also completes a path including the conductor C277, the contacts 254, and the wiper 623 for impressing ground potential directly upon the private conductor 11c in order to maintain the busy marking of the line 11. It will be noted from a consideration of the line circuit 14 that when ground potential is impressed upon the private conductor 11c, the cut-off and line relays of the line circuit 15 are energized and operate. The cut-off relay, in operating, functions to disconnect the windings of its associated line relay from the talking conductors of the line 11.

In operating, the switching relay R630 also closes its contacts 636 to prepare the operating circuit for the pickup relay R510. At its contacts 637, the relay R630 disconnects the tone start conductor C660 from ground in the connector 20, whereby operation of the two signal generators is arrested in the event the start conductor C660 is disconnected from ground in all of the other connectors of the exchange. At its contacts 637′, the relay R630 prepares an alternative circuit for energizing the release magnet 674 of the minor switch 670. At its contacts 638, the relay R630 opens a point in one of the available circuits for energizing the drain control relay R600. Following the operation of the switching relay R630 to perform the functions just described, the control equipment of the connector 20 is conditioned to respond to the fourth digit of the directory number designating the desired substation B.

*Dialing the fourth digit*

During the dialing of the fourth digit "3" designating the particular ringing code assigned to the substation B, the two relays R300 and R310 cooperate to transmit three current pulses to the lower winding of the pulse-controlled relay R420 and the operating magnet 673 in parallel. In this case the current pulses are transmitted to the magnet 673 over a circuit which extends from ground by way of the contacts 204 and 246, C296, the contacts 313 and 368, C390, the contacts 547, C517, the contacts 489 and 479, C523, and the winding of the magnet 673 to battery. The relay R420, upon operating at the beginning of the digit, recloses its contacts 421 to again short-circuit the winding of the relay R260. Each time the operating magnet 673 is energized over the above-traced circuit it steps the wipers 671 and 672 one step and closes its contacts 678 to prepare or complete the previously traced circuit for energizing the pulsing relay R310. It will be understood, therefore, that at the end of the digit the wipers 671 and 672 are left standing in engagement with their respective associated third contacts. Incident to the off-normal movement of these wipers the off-normal springs 675 are closed to again energize the relay R500. This relay, upon operating, closes its contacts 586 to reprepare the operating circuit for the release magnet 674, and closes its contacts 585 to reprepare the operating circuit for the relay R540.

Shortly following the end of the fourth digit, the relay R420 restores and opens its contacts 421 to remove the short circuit from the winding of the relay R260. At its contacts 423, the relay R420 completes the operating circuit for the relay R540, this circuit extending by way of the grounded hold conductor C291, the contacts 423, C492, the contacts 484 and 477, C495, the contacts 585 and the winding of R540 to battery. Upon operating, the relay R540 locks to ground over a path including its contacts 545, C495, the contacts 477 and 484, C492, the contacts 423, and the hold conductor C291. At its contacts 547, the relay R540 opens a point in the previously traced circuits for transmitting current pulses to the relay R420 and the three magnets 673, 567 and 417. At its contacts 546, the relay R540 prepares the previously mentioned circuit for energizing the reverting call relay R250. At its contacts 548, the relay R540 opens a point in the operating circuit for the ring transfer relay R640. At its contacts 549, the relay R540 prepares one of the operating circuits for the drain control relay R600. At its contacts 543, the relay R540 opens a point in the initially traced locking circuit for the pulsing relay R310. At its contacts 544, the relay R540 completes an alternative locking circuit for the relay R310, this circuit extending from ground by way of the contacts 544, C388, the resistor 304, the contacts 301, and the winding of R310 to battery. At its contacts 541, the relay R540 prepares the operating circuit for the relay R550. At its contacts 542, the relay R540 prepares the operating circuit for the pickup relay R510.

From the above explanation it will be understood that the pulse controlled relay R420 is energized and remains operated throughout each digit of each directory number transmitted to the connector 20. This relay is arranged in the manner disclosed and claimed in copending application Serial No. 374,073, filed January 11, 1941, Clarence E. Lomax, now Patent No. 2,312,427, granted March 2, 1943, to assist in the quick release of the line relay R300 each time the loop circuit extending to the connector 20 over a calling line is broken, and the fast operation of this line relay each time the calling loop circuit is recompleted. In this regard it may be pointed out that the three relays R300, R370 and R420 are of the horizontal type and are mounted close together on a suitable base above the Strowger switching mechanism with the line relay R300 disposed between the two relays R370 and R420. Although each relay has a separate heel piece, the magnetic circuits thereof are in such close proximity to each other that a certain amount of leakage flux from the core or magnetic circuit of one relay links the core or magnetic circuit of each adjacent relay. Moreover, since the line relay R300 is in the center, i. e., disposed between the other two relays, it is in a position to influence and to be influenced to the greatest extent by the leakage flux produced by energization of each of the other two relays. This influence is greatly enhanced if the line relay R300 is provided with a brass heel piece in order substantially to increase the leakage flux. The three enumerated relays are mounted with their armature ends facing in the same direction and are wound in a manner such that if the armature end of the line relay R300 is a north magnetic pole, for example, the armature end of the hold relay R370 will also be a north pole, while the armature end of the relay R420 will be a south pole.

With the three relays R300, R370 and R420 arranged in the manner just described, it will be noted that each time the line relay is energized it causes a circuit to be closed for the hold relay R370. The leakage flux produced by the energization of the hold relay will oppose the flux traversing the core or magnetic circuit of the line relay. Accordingly, when the circuit of the line relay is broken it will be deenergized more quickly than it would in the absence of the leakage flux linking therewith. On the other hand, when the circuit of the line relay R300 is again closed after the first interruption, the energization of the release relay is at a minimum, but the changeover or pulse control relay R420 is fully energized and the polarity of the latter relay is such that the leakage flux produced thereby and linking with the magnetic circuit of the line relay assists in the magnetization of the latter relay. Thus an electromagnetic priming action of the line relay R300 occurs at the end of the open circuit period of each impulse transmitted to the connector 20. Accordingly, the line relay is rendered fast to operate. It will be recalled from the preceding explanation that this priming action of the relay R420 as exerted on the line relay R300 is obtained during each of the four digits transmitted to the connector 20 in setting up a connection to a called subscriber line. Accordingly, the advantages achieved by arranging the three relays R300, R370 and R420 in the manner jurt described are retained throughout each of the four digits transmitted to the connector.

*Ringing the called substation*

Shortly following the operation of the relay R540 to perform the functions described above, the pickup springs of the interrupter included in the apparatus schematically shown in Fig. 13 of the drawings are closed to transmit a ground pulse over the first pickup lead C576, thereby to energize the pickup relay R510. More specifically, the operating circuit for this relay extends from ground by way of C576, the contacts 571, C588, the contacts 826, C588, the contacts 542, 513 and 553, and the winding of R510 to battery. This pickup pulse occurs just prior to the beginning of each of the available ten ringing codes. When energized over the pickup circuit traced above, the relay R510 operates and locks to ground over a path which includes the contacts 553, and 512, the hold conductor C578, and a set of normally closed springs in the ringing interrupter. After this locking circuit is completed the relay R510 opens its contacts 513 to interrupt its operating circuit as traced above. At its contacts 515, the relay R510 prepares the operating circuit for the ringing relay R610. In this regard, it will be recalled that the wiper 672 of the minor switch 670 is left standing in engagement with the contact terminating the third code lead C692 at the end of the fourth digit dialed at the calling substation. Accordingly, the ringing relay R610 is controlled in accordance with the ground pulses transmitted over this lead by the ringing interrupter. Thus each time this lead is connected to ground, the ringing relay R610 is energized over a circuit which extends therefrom by way of the wiper 672, the winding of R610, C596, and the contacts 515 to battery. This circuit is obviously interrupted each time the lead C596 is disconnected from ground by the ringing interrupter.

Each time the ringing relay R610 operates, it closes its contacts 616 to complete an obvious circuit for energizing the slow-acting drain control relay R600. The latter relay, upon operating, closes its contacts 605 to complete an obvious multiple locking circuit for the switching relay R630. At its contacts 601 and 603, the relay R600 disconnects the line wipers 621 and 622 from the link line conductors C268 and C375. At its contacts 602 and 604, the relay R600 prepares a low resistance path through which the charge accumulated on the line 11 during each ringing interval may be dissipated before the line wipers are again connected to the link line conductors C268 and C375.

Upon operating, the ringing relay R610 also completes a circuit for transmitting ringing current over the called line 11. As will be pointed out more fully, the path traversed by this current depends upon the setting of the ring transfer relay R640 and the character of the called line. In the present case the relay R640 occupies its restored position and it may be assumed that the line 11 is of the full metallic type. Accordingly, the ringing current traverses a circuit which may be traced as extending from the output terminal of the ringing current generator by way of the ringing current conductor C618, the winding of R660, the contacts 641, 612 and 631, the wiper 621, the negative side of the line 11, the parallel-connected ringers bridged across the conductors of this line, the positive side of the line, the wiper 622, the contacts 634, 615 and 643, and the exchange battery to the opposite terminal of the ringing current generator. This circuit is obviously interrupted at the contacts 612 and 615 each time the ringing relay R610 restores at the end of a ringing period. Each time the relay R610 restores it also completes the above-mentioned low resistance path for draining the line 11 of accumulated charges thereon. Thus, it will be noted that, with the relay R600 operated and the relay R610 released, the exchange battery is bridged across the conductors of the line 11 in series with the two resistors 647 and 648 over a path which includes the contacts 602, 604, 611, 614, 631 and 634, and the line wipers 621 and 622. Each time the ringing relay R610 restores it also opens its contacts 616 to deenergize the relay R600. Accordingly, the latter relay restores shortly after each ringing interval to again connect the link line conductors C268 and C375 to the line wipers 621 and 622. The purpose of providing the above-described arrangement for draining the line 11 of accumulated static charges at the end of each ringing period is to prevent a transient current pulse from causing the premature operation of the back-bridge relay R340 before the call is answered at the called substation.

At the end of each ringing code cycle as determined by the operation of the ringing interrupter, the hold conductor C578 is disconnected from ground by the ringing interrupter to deenergize the ring pickup relay R510. Upon restoring, the relay R510 opens its contacts 512 further to interrupt its locking circuit, and closes its contacts 513 to reprepare its operating circuit. At its contacts 515, the relay R510 opens the previously traced circuit for energizing the ringing relay R610 in accordance with the coded ground pulses transmitted over the code conductor C692. After an appropriate spacing interval as determined by the operation of the interrupter, a ground pulse is again transmitted by the ringing interrupter over the first pickup lead C576 to cause the reoperation of the pickup relay R510. From this point on the manner in which the ringing equipment continues to operate to transmit the coded ringing current over the called line 11 is exactly the same as described above. The character of the transmitted code indicates to the subscribers at the various substations served by the line 11 that only the subscriber at the substation B is being called.

The manner in which the ringing control equipment functions to transmit ringing current coded in accordance with the coded ground pulses transmitted over any one of the first five code leads C690 to C694, inclusive, over the called line 11 is exactly the same as explained above. In the event one of the sixth to tenth codes is assigned to the desired substation B, a fourth or ringing digit comprising from six to ten impulses will necessarily be dialed at the calling substation during the dialing operation. Accordingly, the wipers 671 and 672 will be operated to one of the sixth to tenth off-normal positions thereof during the dialing of the ringing digit. Incident to the release of the operating magnet 673 at the end of the sixth current pulse transmitted to this magnet, a circuit is completed for energizing the ring transfer relay R640, this circuit extending from ground by way of the contacts 548, C597, the contacts 677, the wiper 671 and the engaged sixth contacts of the associated contact sets, C498, the contacts 486', C499, the contacts 563 and 574, C595, and the lower winding of R640 to battery. When energized over this circuit the relay R640 locks to the grounded hold conductor C291 through its preliminary make contacts 645. At its contacts 641 to 644, inclusive, the relay R640 rearranges the ringing current transmission circuit so that ringing current is projected over the positive side of the line and returned over the negative side of the line. More specifically, with the relay R640 occupying its operated position, the circuit traversed by the ringing current during each ringing interval extends from one terminal of the ringing current generator by way of the ringing conductor C618, the winding of R660, the contacts 642, 615 and 634, the wiper 622, the positive conductor of the line 11, the ringers bridged across the conductors of this line, the negative side of the line, the wiper 621, the contacts 631, 612 and 644, and the exchange battery to the opposite terminal of the ringing current generator.

In the event the called line 11 is arranged for divided ringing, as many as five of the ringers associated therewith may be connected between the negative side of the line and ground, and as many as five additional ringers may be connected between the positive side of the line and ground. In such case ringing codes corresponding to the first five off-normal positions of the minor switch 670 are assigned to the substations having ringers connected between the negative side of the line and ground, and the remaining five codes, i. e., those corresponding to the sixth to tenth off-normal positions of the minor switch 670, are assigned to the substations having ringers connected between the positive side of the line and ground. With the substation ringers arranged in this manner, if a substation is called having a ringer thereat which is connected between the negative side of the line and ground, the ring transfer relay R640 occupies its restored position during the ringing operation. Accordingly, the circuit traversed by the ringing current extends from the ringing current conductor by way of the winding of R660, the contacts 641, 612 and 631, the wiper 621, the negative side of the line, the ringers connected between this side of the line and ground, and the exchange battery to the ringing current generator. On the other hand, if a substation having a ringer connected between the positive side of the line and ground is called, the ring transfer relay R640 occupies its operated position during the ringing period. Accordingly, ringing current is, during each ringing interval, transmitted over a circuit which extends from the conductor C618 by way of the winding of R660, the contacts 642, 615 and 634, the wiper 622, the positive side of the line 11, the ringers connected between this side of the line and ground, and the exchange battery to the ringing current generator. In either case the one of the five available ringing codes which is selected determines the character of the signal produced by the energized ringers, thereby selectively to signal the subscribers as to which substation is being called.

Regardless of the circuit utilized for transmitting ringing current through the ringer provided at the called substation, a portion of the ringing current is transmitted over the calling end of the connection during each ringing interval to produce the usual ring-back tone signal at the calling substation. The path traversed by this portion of the ringing current may partially be traced as extending from the ringing current conductor C618 by way of the winding of the ring cut-off relay R660, the condenser 646, the contacts 613 and 633, C427, and the contacts 451 to the negative link line conductor C268. From this point the ringing current is transmitted through the windings of the repeating coil 345 and over the calling end of the connection to energize the receiver of the handset provided at the calling substation A, whereby the usual ring-back tone signal is produced at this substation. Obviously, this circuit is opened at the contacts 613 incident to the release of the ringing relay R610 at the end of each ringing period.

The call is answered

When the call is answered at the called substation B a direct current bridge is established between the conductors of the line 11 to cause the energization and operation of the slow-acting ring cut-off relay R660. The circuit over which this relay is energized depends upon the setting of the ring transfer relay R640. In the event this relay occupies its restored position the ring cut-off relay R660 is energized over a circuit which extends from ground by way of the contacts 643, 615 and 634, the wiper 622, the positive side of the line 11, the direct current bridge across the conductors of this line, the negative side of the line, the wiper 621, the contacts 631, 612 and 641, the winding of R660 and the direct current path through the ringing current generator to the negative terminal of the exchange battery. On the other hand, if the ring transfer relay R640 occupies its operated position at the time the call is answered, the ring cut-off relay R660 is energized in a circuit which extends from ground by way of the contacts 644, 612 and 631, the wiper 621, the negative side of the line 11, the direct current bridge established between the conductors of this line at the substation B, the positive side of the line, the wiper 622, the contacts 634, 615 and 642, the winding of R660 and the direct current path through the ringing current generator to the negative terminal of the exchange battery.

When energized over either of the two circuits traced above, the relay R660 operates after an interval and closes its contacts 661 to complete the prepared operating circuit for the stop ringing relay R550, this circuit extending by way of the grounded release conductor C272, the contacts 661, C300, the contacts 541 and the winding of R550 to battery. When energized in this circuit the relay R550 locks to ground over a path including the contacts 541 and 551, and the release conductor C272. At its contacts 553, the relay R550 opens a point in the above-traced operating and locking circuits for the pickup relay R510, causing the latter relay to release, if operated. At its contacts 555, the relay R550 disconnects the ring start conductor C500 from ground, thereby to arrest the operation of the ringing apparatus in the event none of the other connectors of the exchange are in the ringing position. At its contacts 556, the relay R550 prepares an alternative locking circuit for the timing relay R200. At its contacts 557, the relay R550 opens the first prepared locking circuit for the indicated timing relay. At its contacts 554, the relay R550 completes the prepared alternative operating circuit for the release magnet 674, this circuit extending from ground by way of the contacts 365', C395, the contacts 637', C500, the contacts 554 and 566, C510, and the winding of the magnet 674 to battery. When thus energized the magnet 674 attracts its associated holding pawl to permit the release of the wipers 671 and 672. Incident to the return movement of these wipers the off-normal springs 675 are disengaged to deenergize the relay R500. In releasing, the relay R500 opens its contacts 506 to deenergize the release magnet 674, and opens its contacts 505 to interrupt the previously traced operating circuit for the relay R540.

Incident to the release of the relay R510, the contacts 615 are opened to deenergize the ringing relay R610, if operated. In restoring, the ringing relay opens its contacts 616 to deenergize the drain control relay R600, and closes its contacts 611 and 614 to complete the above-described low resistance discharge path. At its contacts 611 and 614, the relay R610 also prepares an answering loop circuit which extends from the called substation B to the repeating coil 345. At its contacts 612 and 615, the relay R610 opens two points in each of the several ringing current circuits traced above. At its contacts 613, the relay R610 opens the above-traced circuit for transmitting ringing current over the calling end of the connection, whereby the ring-back tone signal is terminated. Incident to the release of the ringing relay R610, two points are opened in either of the two above-traced circuits for energizing the ring cut-off relay R600. The latter relay, in restoring, opens its contacts 661 to interrupt the previously traced operating circuit for the stop ringing relay R550.

The drain control relay R600 restores shortly following the release of the ringing relay R610, and opens its contacts 602 and 604 to interrupt the low resistance discharge path. At its contacts 601 and 603, the relay R600 completes the answering loop circuit between the called substation B and the repeating coil 345. This circuit may be traced as extending from ground by way of the winding of the line balancing coil 350, the repeating coil winding 346, C375, the contacts 603, 614 and 634, the wiper 622, the positive side of the line 11, the bridge across the conductors of this line at the substation B, the negative side of the line, the wiper 621, the contacts 631, 611 and 601, C266, the repeating coil winding 346 and the winding of R340 to battery.

In operating, the back-bridge relay R340 closes its contacts 341 to complete a multiple holding circuit for the stop ringing relay R550, this circuit extending from the grounded release conductor C272 by way of the contacts 341, C380, the contacts 541 and the winding of R550 to battery. At its contacts 343, the relay R340 opens a point in one of the multiple operating circuits for the timing relay R200. At its contacts 342, the relay R340 prepares or completes the operating circuit for the battery reversing relay R320. In the present case, wherein the call originated on a subscriber line, the operating circuit for the battery reversing relay R320 is held open at the normal post springs 345 controlled by the Strowger switching mechanism of the finder 19 and through which the two conductors C274 and C275 may be connected together. Accordingly, the relay R320 does not operate and the direction of current flow over the calling line is not reversed incident to the operation of the back-bridge relay R340. Following the operation of this relay the desired conversational connection between the calling and called substations is fully completed. In this regard, it will be noted that talking battery is applied to the conductors of the calling line 10 through the windings of the relays R260 and R300 and the windings 346 and 347 of the repeating coil 345. Talking battery is applied to the conductors of the line 11 through the winding of the impedance element 350 and the winding of the back-bridge relay R340.

*Ringing over 20-party and grounded lines*

From the preceding explanation it will be recalled that all lines serving more than ten substations are included in the lines forming the first one hundred line group. In order to provide the code selecting facilities required for signaling over lines of this character, the first digit is utilized to effect a partial selection of the ringing code. More specifically, first digits of four and five impulses respectively designate different groups of ringing codes each including ten different codes. Thus, if a first digit of four impulses is dialed into the connector from a calling substation, the wipers 671 and 672 are positioned to engage their respective associated fourth contacts at the end of the digit. With the wiper 671 standing in this position, a circuit is completed for energizing the relay R560 incident to the release of the relay R420 at the end of the digit. This circuit extends by way of the grounded hold conductor C291, the contacts 423, C482, the contacts 483, C487, the wiper 671 and its associated engaged fourth contacts, C563, and the lower winding of R560 to battery. When energized in this circuit the relay R560 locks to the grounded hold conductor C291 through its preliminary make contacts 562, and opens its contacts 563 to prevent the ring transfer relay R640 from being energized during the dialing of the succeeding digit. At its contacts 561, the relay R560 opens a point in the circuit which is utilized to energize the trunk hunting relay R520 during a trunk hunting operation. It will be noted that with the relay R560 operated, any one of the available ten codes may be utilized to control the ringing relay R610, depending upon the position of the minor switch wipers 671 and 672 at the end of the fourth digit. It will also be apparent that the ring transfer relay R640 cannot be energized during the dialing of the fourth digit. Accordingly, regardless of the code selected, ringing current is transmitted from the conductor C618 through the winding of the ring cut-off relay R660 and over the negative side of the called line to energize the ringers provided at the substations served by this line. If the line is of the ground return type, ground is utilized as the return path for the ringing current.

In the event a first digit comprising five impulses is dialed into the connector 20 from the calling substation, the wipers 671 and 672 are positioned to engage their respective associated fifth contacts at the end of the digit. In this case the relay R570 is energized in response to the release of the relay R420 at the end of the digit, the circuit for energizing the first-mentioned relay extending from the grounded hold conductor C291 by way of the contacts 423, C492, the contacts 463, C497, the wiper 671 and its engaged fifth contacts, C592, and the lower winding of R570 to battery. In operating, the relay R570 first locks to the grounded hold conductor C291 over a path including its preliminary make contacts 573, and then opens its contacts 574 to prevent the ring transfer relay R640 from being energized during dialing of a subsequent code selecting digit comprising more than five impulses. Thus the transmission of ringing current over the negative side of the line to be selected is insured. At its contacts 571, the relay R570 opens a point in the previously traced operating circuit for the ring pickup relay R510. At its contacts 572, the relay R570 prepares an alternative circuit for energizing the ring pickup relay.

After the desired line has been selected and the ringing digit has been dialed into the minor switch 670 in the manner previously explained, the switching relay R630 is energized and operates further to prepare the operating circuit for the pickup relay R510. In this case the pickup relay is energized over a circuit which includes the second pickup conductor C577. More specifically, when the ringing interrupter functions to transmit a pickup pulse over the conductor C577, the relay R510 is energized in a circuit which includes the contacts 572, C588, the contacts 636, C589, the contacts 542, 513 and 553 and the winding of R510 to battery. Upon operating, the relay R510 locks to the grounded hold lead C578 and closes its contacts 515 to prepare the operating circuit for the ringing relay R610.

As explained in the previously cited copending application, Serial No. 414,252, Lomax and Baker, the pickup pulse transmitted over the second pickup lead C577 occurs prior to a short preliminary ringing period which is common to the available ten codes. Thus a short ringing interval, which precedes the main portion of the selected code, is introduced into the code, thereby to produce a different code. For example, with the relay R570 operated and the minor switch 670 positioned to select the sixth ringing code, the ringing relay R610 is controlled in accordance with a code which comprises a short preliminary ringing period followed by the remaining ringing periods of the sixth ringing code. On the other hand, if the relay R570 occupies its restored position such that the pickup relay R510 is controlled in accordance with the pickup pulse transmitted over the first pickup lead C576 and the sixth ringing code is selected, the preliminary ringing period is not used.

As indicated above, when either of the two relays R560 and R570 operates, ringing current may only be transmitted over the negative side of a selected called line. This arrangement precludes the possibility of attempting to ring over the grounded side of a line of the ground return type. It will be noted that the arrangement of the ring cut-off relay R660 and the stop ringing relay R550 provides an additional safeguard against this possibility. Thus, if a line of the ground return type is selected by dialing the number "265," for example, and a code selecting digit comprising more than six impulses is then dialed, it is possible to condition the ringing equipment to transmit ringing current over the positive or grounded side of the selected line. In such case, when the ringing relay R610 operates to close the ringing current transmission circuit, the ring cut-off relay is immediately energized in a circuit which extends from the grounded line terminal engaged by the wiper 622, the contacts 634, 615 and 642, the winding of R660 and the direct current path through the ringing current generator to the negative terminal of the exchange battery. When thus energized the relay R660 operates to complete the prepared operating circuit for the stop ringing relay R550. The stop ringing relay, in turn, locks to ground through its contacts 551, and opens its contacts 553 to deenergize the pickup relay R510. The pickup relay, upon restoring, opens its contacts 515 to prevent further operation of the interrupter from producing any further response of the ringing relay R610. By virtue of the various safeguards against ringing over the ground return side of a grounded line, the ringing current generator is protected against short-circuits or heavy overloads.

*Release*

The release of the connection as set up between the substations A and B is entirely under the control of the calling subscriber at the substation A. Thus, if the connection is cleared out at the called substation B prior to its release at the substation A, the only resulting operation is the deenergization and release of the back-bridge relay R340, which relay, in restoring, closes its contacts 343 to reprepare one of the multiple operating circuits for the timing relay R200. When, however, the handset provided at the substation A is restored to its supporting hook or cradle the calling loop circuit set up between this substation and the connector 20 is interrupted to cause the deenergization and release of the two relays R260 and R300. The relay R260, upon restoring, opens its contacts 261 further to interrupt the incomplete operating circuit for the battery reversing relay R320. The line relay R300, upon restoring, opens its contacts 301 to interrupt the operating and locking circuits for the pulsing relay R310. At its contacts 302, the relay R300 interrupts the locking circuit for the hold relay R370. The relay R310, upon restoring, opens its contacts 312 to interrupt the operating circuit for the hold relay R370. The latter relay, upon restoring, opens its contacts 373 to deenergize the cut-off relay R110. At its contacts 374, the relay R370 opens the operating circuit for the relay R360.

When its lower winding is deenergized in the manner just explained, the cut-off relay R110 restores. In releasing, this relay opens its contacts 112 to deenergize the upper winding of the line relay R100, and closes its contacts 111 and 113 to again connect the windings of the line relay to the conductors of the line 10. Following the release of the line relay R100, the line circuit 14 is fully restored to normal and the line 10 is marked as idle in the connectors having access thereto.

The hold slave relay R360, upon restoring, opens its contacts 361 to disconnect the release conductor C272 from ground and thus initiate the release of the finder 19 in the manner explained below. At its contacts 362, the relay R360 reprepares the all-links-busy circuit individual to the illustrated finder-connector link and extending to the distributor 21. At its contacts 363, the relay R360 reprepares one of the available circuits provided in the connector 20 for impressing ground potential upon the release alarm conductor C281. At its contacts 363', the relay R360 disconnects the restricted service start lead from ground in the connector 20. At its contacts 365, the relay R360 opens the prepared operating circuit for the timing relay R200. At its contacts 366, the relay R360 reprepares the operating circuit for the pulsing relay R310. At its contacts 366', the relay R360 disconnects the hold conductor C291 from ground. At its contacts 367, the relay R360 opens another point in the above-traced locking circuit for the hold relay R370. At its contacts 368, the relay R360 opens a point in the common portion of the previously traced circuits for transmitting current pulses to the pulse-controlled relay R420 and the three magnets 873, 417 and 507. At its contacts 369, the relay R360 prepares an alternative circuit for energizing the release magnet 674 of the minor switch 670. At its contacts 364', the relay R360 completes the prepared operating circuit for the release magnet 287, this circuit extending from ground by way of the contacts 461, C384, the contacts 364', C286, the off-normal springs 250, and the winding of the magnet 287 to battery. When thus energized the release magnet 287 closes its contacts 258 to impress ground potential upon the release alarm conductor C281 and attracts its associated holding pawl to permit the wiper carriage structure of the Strowger switching mechanism to be returned to rotary and vertical normal. Incident to the release of the Strowger switching mechanism, the off-normal springs 250 are disengaged to deenergize the release magnet 287, whereby the contacts 258 are opened to disconnect the release alarm conductor C281 from ground. Also incident to the release of the Strowger switching mechanism, the off-normal springs 225 are closed to recomplete the all-links-busy circuit individual to the illustrated finder-connector link and extending to the distributor 21; the off-normal springs 224 are opened to disconnect the guard conductor C278 from ground, whereby the illustrated link is marked as idle in the distributor 21; and the off-normal springs 426 are engaged to reprepare the operating circuit for the transfer relay R400.

When the hold slave relay R360 restores to disconnect the release conductor C272 from ground in the manner explained above, the busy test relay R440 or the stop-ringing relay R550, if operated, is deenergized and restores. In this regard it will be noted that the locking circuits for the transfer relays R450, R470, R480, R430 and R530 commonly extend to ground over the release conductor C272. Accordingly, if a call routed to the connector 20 is abandoned before the dialing operation is completed, the operated ones of the enumerated relays are all deenergized and restore when the release conductor C272 is disconnected from ground. If the minor switch 670 is off-normal at the time the call is abandoned, the release magnet 674 thereof is energized incident to the release of the relay R360. In this case the magnet 674 is energized over a circuit which extends from ground by way of the contacts 369, C518, the contacts 586, C519 and the winding of the magnet 674 to battery. Incident to the resulting release of the minor switch wipers, the relay R580 is deenergized and opens its contacts 586 to deenergize the magnet 674. When the hold conductor C291 is disconnected from ground the operated ones of the relays R540, R560, R570, R630 and R640 are all deenergized and restore. Thus, it will be apparent that when ground potential is removed from the two conductors C272 and C291, all of the operated relays in the connector are deenergized and restore. Following the release of the Strowger switching mechanism and the operated relays, the connector 20 is fully restored to normal and may be allotted for use in handling another call.

When the hold conductor C272 is disconnected from ground by the hold relay R300, the relay R800 of the finder is deenergized and restores. In releasing, this relay closes its contacts 807 to complete the prepared operating circuit for the release magnet 839, this circuit extending from ground by way of the contacts 814, the off-normal springs 842, the contacts 807 and the winding of the magnet 839 to battery. In operating, the magnet 839 causes the Strowger switching mechanism of the finder to be released, and closes its contacts 840 to impress ground potential upon the release alarm conductor C281. Incident to the release of the Strowger switching mechanism, the off-normal springs 842 are disengaged to deenergize the release magnet 839; and the off-normal springs 843 are engaged to recomplete the all-links-busy circuit individual to the illustrated link. If operated, the cam springs 844 and the normal post springs 845 and 846 are also returned to normal incident to the release of the Strowger switching mechanism. The magnet 839, in releasing, opens its contacts 840 to disconnect the release alarm conductor C281 from ground. Following the release of the relay R800 and the Strowger switching mechanism, the finder 19 is fully restored to normal.

CALL INTERCEPTION

Referring now more particularly to the operation of the call intercepting circuit 45 to intercept a call routed through the illustrated link to the line 11, it may be assumed, for example, that a substation normally designated by the first code, i. e., that defined by the ground pulses impressed upon the code lead C090, and including a ringer bridged between the two conductors of the line 11, has been disconnected from service. In order to intercept calls intended for this substation the intercepting circuit 45 is connected to the three conductors of the line 11 in the manner illustrated in the drawings. Further, the operating circuits for the switching and intercept relays R1430 and R1450 are connected to be controlled over the first pickup lead C576; the code relay R1420 is connected to be controlled over the code lead C090; the intercept relay R1450 is connected to impress ground potential upon the tone start lead C080; the hold relay R1410 is connected to be controlled over the ring hold lead C078; and the dial tone lead C077 is connected to transmit dial tone current to the negative side of the line II through the condenser 1458 and the make contacts 1451 of the intercept relay R1450.

With the circuit arranged in this manner, if ringing current coded in accordance with the ground pulses impressed upon the code lead C690 is projected over the line II in the manner explained above, a portion of the current is transmitted through the condenser 1404 and the winding of the relay R1400. The relay R1400 will thus operate at the beginning of the first ringing interval which follows the operation of the ring pickup relay R510. In operating, the relay R1400 closes its contacts 1401 to complete a circuit including the grounded private conductor 11c of the line II for energizing the hold relay R1410. At its contacts 1402, the relay R1400 prepares the operating circuit for the cutoff relay R1440. The relay R1410, upon operating, locks up in a circuit which includes the grounded private conductor 11c, and the contacts 1411 and 1455. At its contacts 1412, the relay R1410 prepares an alternative locking circuit for itself. At its contacts 1413, the relay R1410 prepares locking circuits for the two relays R1430 and R1440. At its contacts 1414, the relay R1410 prepares the operating circuit for the switching relay R1430. During each period when ringing current is passed through the winding of the relay R1400 this relay operates, but throughout the remainder of the first code cycle the intermittent operation thereof is without effect. At the end of the code cycle and during the initial portion of the next succeeding cycle of operation of the ringing interrupter, a ground pulse is transmitted over the pickup lead C576 and through the contacts 1414 and 1435 to energize the switching relay R1430. This relay is of the well-known two-step type, such that when its lower winding is energized it partially operates to close only the contacts 1433. At these contacts a path including the grounded pickup lead C576 and the contacts 1413, 1414 and 1435 is completed for short-circuiting the upper winding of the relay R1430. Thereafter, and when the pickup pulse ends, the lead C576 is disconnected from ground in the interrupter to open the short-circuiting path. At this time the two windings of the relay R1430 are energized in series over a circuit which includes the contacts 1413 and 1433. The relay R1430 now completes its operation, and in so doing closes its contacts 1431 to prepare a path for bridging the resistor 1457 across the talking conductors of the line II. At its contacts 1432, the relay R1430 further prepares the operating circuit for the cut-off relay R1440. At its contacts 1435, the relay R1430 opens another point in its own operating circuit. At its contacts 1434, the relay R1430 further prepares the operating circuit for the intercept relay R1450. At its contacts 1436, the relay R1430 prepares the operating circuit for the code relay R1420.

The two relays R1400 and R1420 are concurrently energized during each ringing period of the second code cycle utilized in signaling over the line II. Thus each time the interrupter functions to impress ground potential upon the code lead C690, the ringing relay R610 of the connector 20 operates to transmit ringing current over the talking conductors of the line II, whereby the relay R1400 is energized. The code relay R1420 is concurrently energized in a circuit which includes the contacts 1436 and 1444 and the grounded code lead C690. It will be noted that the code relay R1420 is provided with a lower winding which is short-circuited through its contacts 1423. The purpose of this arrangement is to render the code relay R1420 slightly slow to operate, in order to insure exact synchronism between the operation of this relay and the operation of the relay R1400. With the two relays R1400 and R1420 operating in synchronism, the operating circuit for the cut-off relay R1440 is not completed. Thus it will be noted that each time the two relays operate this circuit is prepared at the contacts 1402 and opened at the contacts 1421. Conversely, each time these relays restore this circuit is prepared at the contacts 1403 and opened at the contacts 1422. In order further to compensate for a slight non-coincidence in the operation and release of these two relays, a slow-to-operate cut-off relay R1440 is used. It will be understood from the above explanation that during the second code cycle no further operation of the intercepting circuit 45 occurs. After this cycle is ended, however, and during the interval just preceding the next succeeding cycle, another ground pulse is transmitted over the pickup lead C576 and through the contacts 1414, 1434 and 1443 to energize the intercepting relay R1450. In operating, this relay locks up in a circuit which includes its upper winding, the grounded private conductor 11c and the contacts 1453. At its contacts 1456, the relay R1450 connects the tone start lead C680 to ground, thereby to initiate the operation of the tone generating apparatus, not shown. At its contacts 1454, the relay R1450 completes an alternative locking circuit for the hold relay R1410, this circuit extending by way of the normally grounded ring hold conductor C578, the contacts 1412 and 1454, and the winding of R1410 to battery. After this circuit is completed the relay R1450 opens its contacts 1455 to interrupt the initially completed locking circuit for the relay R1410. At its contacts 1452, the relay R1450 bridges the resistor 1457 across the talking conductors of the line II, in an obvious manner. In response to this operation the connector 20 is caused to assume its call answered setting in a manner which will be clearly apparent from the preceding explanation with reference to the relay operations which occur in this connector when a call is answered at a called substation. Incident to these operations a communication circuit is set up through the connector between the calling line and the talking conductors of the line II.

The intercept relay R1450, in operating, also closes its contacts 1451 to complete a circuit for transmitting dial tone signal current over the calling end of the connection. This circuit may partially be traced as extending from the dial tone lead C377 by way of the condenser 1458, the contacts 1451, the negative side of the line II and the wiper 621 to the negative link line conductor C263. From this point, the alternating dial tone current is transmitted through the repeating coil 345 and over the calling end of the connection to energize the receiver provided at the calling substation. The resulting dial tone signal produced at the calling substation following the ring-back tone signal, serves to indicate to the calling subscriber that the call has been intercepted and hence that a connection to the desired substation can not be obtained.

At the end of the third code cycle, i. e., that during which the relay R1450 is first energized, the ringing interrupter functions in the manner previously described to disconnect the ring hold lead C578 from ground and thus cause the deenergization and release of the hold relay R1410.

This relay, in restoring, opens its contacts 1413 to deenergize the two relays R1430 and R1440. At its contacts 1414, the relay R1410 opens a point in the operating circuits for the two relays R1430 and R1450. The switching relay R1430, upon restoring, opens its contacts 1431 to interrupt the answering loop circuit and thus cause the deenergization and release of the back-bridge relay R340 in the connector 20. At its contacts 1436, the relay R1430 opens the prepared operating circuit for the code relay R1420. Following the operations just described, only the intercept relay R1450 is operated in the intercepting circuit 45 and the answering loop circuit is held open at the contacts 1431. The purpose of closing this loop circuit for only a short time interval, which is measured by the operation of the ringing interrupter, is to insure the operation of the connector 20 to its call answered setting and to prevent the operation of the line circuit 15 to its line lockout setting incident to the release of the connector 20. In this regard it will be understood that when the call is abandoned at the calling substation the connector 20 and the line circuit 15 are released in the manner previously described. During the release of this equipment the private conductor 11c is disconnected from ground to deenergize the intercept relay R1450. Following the release of the last-mentioned relay the intercepting circuit 45 is fully restored to normal.

In the event the above-described call routed to the line 11 is not intended for a substation arranged for call interception, the call intercepting circuit 45 will be prevented from operating to transmit dial tone current over the calling end of the connection. In such case the called substation will necessarily be designated by a ringing code other than the code 1. Accordingly, when ringing current is transmitted over the line to energize the ringer provided at a called substation and, incidental thereto, the relay R1400, this relay will be non-concurrently operated with the code relay R1420 during one or more intervals of the first and second code cycles. During the first code cycle the hold relay R1410 is energized and locked up in the manner described above. In the course of the second code cycle, and more specifically during an interval thereof when the relay R1400 is operated and the relay R1420 is restored, or vice versa, one of the two available operating circuits for the cut-off relay R1440 is completed. This circuit may extend from ground by way of the contacts 1402, 1421, 1432 and 1442 and the winding of R1440 to battery, or alternatively from ground by way of the contacts 1403, 1422, 1432 and 1442 and the winding of R1440 to battery. When energized over either of the two circuits just traced the relay R1440 operates after an interval and locks to ground over a path including the contacts 1433 and 1413. After this circuit is completed the relay R1440 opens its contacts 1441 to interrupt its operating circuit. At its contacts 1444, the relay R1440 opens the operating circuit for the code relay R1420. At its contacts 1443, the relay R1440 opens the prepared operating circuit for the intercept relay R1450. It will be noted that with the relay R1440 operated, further operation of the code relay R1420 is prevented, and that the operation of the intercept relay R1450 at the end of the second code cycle is also prevented. Accordingly, the call is not intercepted. In this case the operated relays R1410, R1430 and R1440 of the intercept circuit are released in an obvious manner when ground potential is removed from the private conductor 11c during the release of the connector 20 and the line circuit 15.

PRIVATE BRANCH EXCHANGE CALLS

The manner in which calls may be routed through the illustrated finder-connector link to the ring-down trunks extending to the private branch exchange 8, for example, is substantially similar to the mode of subscriber line selection as effected through this link in the manner explained above. In considering this type of service it may be assumed that the above-described call originating at the substation A and routed to the connector 20 is intended for a substation connected to a line which terminates at the switchboard of the private branch exchange 8. It may be assumed further that the group of four trunks extending to this branch exchange is designated by the directory number "2911."

When the two impulses of the first digit are dialed into the connector 20 from the substation A, the wipers 671 and 672 of the minor switch 670 are positioned to engage their respective associated second contacts in the manner explained above. At the end of the digit, and when the pulse-controlled relay R420 restores, the transfer relay R430 is deenergized and releases to transfer the pulsing circuit from the operating magnet 673 of the minor switch 670 to the vertical magnet 417 in the exact manner previously explained.

When the second digit of nine impulses is dialed into the connector 20, nine current pulses are transmitted to the parallel-connected windings of the relay R420 and the vertical magnet 417, whereby the wipers 621, 622, 623 and 627 are elevated to a position opposite the ninth level of contacts in the associated contact field, i. e., the level in which the conductors of the four trunks extending to the branch exchange 8 are terminated. Incident to the off-normal movement of the wiper carriage structure, the off-normal springs 224 are engaged; the off-normal springs 225 are disengaged; the off-normal springs 250 are moved into engagement and the off-normal springs 425 are disengaged to perform the functions previously described. Shortly following the end of the second digit, the relay R420 restores to cause the deenergization and release of the transfer relay R480. This transfer relay, in restoring, closes its contacts 487 to complete the previously traced operating circuit for the release magnet 674, whereby the wipers of the minor switch 670 are restored to normal. Incident to the release of these wipers the off-normal springs 675 are disengaged to deenergize the relay R580, causing this relay to restore. In releasing, the transfer relay R480 also opens its contacts 488 to prevent further current pulses from being delivered to the vertical magnet 417, and closes its contacts 489 to prepare the previously traced circuit for transmitting current pulses to the rotary magnet 507.

When the third digit of one impulse is dialed into the connector 20 from the calling substation, a single current pulse is transmitted to the parallel-connected windings of the pulse-controlled relay R420 and the rotary magnet 507. When thus energized the relay R420 closes its contacts 422 to complete the previously traced locking circuit for the transfer relay R470 and the previously traced operating circuit for the transfer relay R450. The relay R450, upon operating, closes its contacts 456 to prepare the previously traced busy test circuit. The rotary magnet 507, upon operating, functions to rotate the wiper carriage structure so that the wiper 627 is operated to engage the contact point 91 and the wipers 621, 622 and 623 are moved into engagement with the contacts terminating the conductors of the first trunk 12 extending to the branch exchange 8. In the event this trunk is idle at the time it is thus selected, the private conductor thereof is marked with negative battery potential so that the prepared busy test circuit is not completed. Accordingly, the busy test relay R440 remains in its restored position.

Shortly following the end of the third digit of one impulse the relay R420 restores and opens its contacts 422 to cause the deenergization and release of the three relays R470, R450 and R530, in the manner previously explained. The two relays R450 and R530, upon restoring, complete the previously traced circuit for energizing the slow-to-operate idle test relay R620 in series with one winding of the cut-off relay embodied in the line circuit individual to the selected trunk, extending to the branch exchange 8. When thus energized the relay R620 closes its contacts 621' to complete the operating circuit for the line switching relay R630. The latter relay, upon operating, locks to the grounded hold conductor C291 through its contacts 638, and prepares the ringing equipment for ringing current transmission in the manner previously explained.

When the fourth digit of one impulse is dialed into the connector 20, a single current pulse is transmitted to the parallel-connected windings of the relay R420 and the operating magnet 673, whereby the wipers 671 and 672 are positioned to engage their respective associated first contacts and the off-normal springs 675 are engaged to recomplete the operating circuit for the relay R580. From this point on, the manner in which ringing current is transmitted over the selected trunk to energize the drop or other signal device individual to this trunk and provided at the branch exchange switchboard, is exactly the same as described above with reference to the signaling of the called substation B served by the line 11.

In the event the first trunk is busy at the time it is selected in the manner explained above, the private conductor thereof is marked with ground potential so that the busy test relay R440 is energized immediately the trunk is selected. In this case the relay R440, upon operating, closes its contacts 444 to prepare the operating circuit for the trunk hunting relay R520. During the inter-digit pause between the third and fourth digits and shortly after the first trunk of the group is selected and the busy test relay R440 operates, the two relays R420 and R470 are caused sequentially to restore in the manner previously explained. In releasing, the relay R470 closes its contacts 475' to complete the prepared operating circuit for the trunk hunting relay R520, this circuit extending from ground by way of the conductive P. B. X arc 628 and the contact 91 carried thereby, the wiper 627, C591, the contacts 561, C469, the contacts 444 and 475', C468, the contacts 534 and 599, and the winding of R520 to battery. In operating, the relay R520 locks to the grounded release conductor C272 through its contacts 522, and closes its contacts 521 to complete an alternative circuit for energizing the rotary magnet 507 and the slow-acting control relay R530 in parallel. This circuit extends by way of the grounded release conductor C272, the contacts 533, C448, the contacts 474, C447, and the contacts 521 to the conductor C490 where it divides, one branch extending through the winding of the magnet 507 to battery and the other branch extending by way of the contacts 476', C493, and the lower winding of R530 to battery. When thus energized the magnet 507 steps the wipers 621, 622, 623 and 627 into engagement with the contacts forming the second set of the selected level, thereby to select the second trunk of the group extending to the branch exchange 8. In operating, the magnet 507 also opens its contacts 509 to deenergize the trunk hunting relay R520. The relay R520 now restores and opens its contacts 522 to interrupt its locking circuit as traced above.

In the event the second trunk of the group is also busy, the private conductor thereof is marked with ground potential so that the busy test relay R440 is again energized. In reoperating, this relay again closes its contacts 444 to recomplete the operating circuit for the trunk hunting relay R520, the circuit in this case extending from the grounded P. B. X arc 628 through the second contact 92 to the wiper 627, and from this wiper through the winding of the relay R520. The relay R520, upon reoperating, again locks to the grounded conductor C272, and recloses the circuit for energizing the rotary magnet 507 and the control relay R530 in parallel. Thus the wipers 621, 622, 623 and 627 are again stepped to select the third trunk of the selected group.

The above-described operations are repeated until an idle trunk in the selected group is found, or until all of the trunks have been tested and found to be in a busy condition. During the trunk hunting operation the relay R530, due to its slow-to-release characteristic, remains operated to hold the transfer relay R450 energized. If any one of the tested trunks is found to be idle, the busy test relay R440 remains in its deenergized or restored position upon the selection of the idle trunk. Incident to the selection of an idle trunk, the trunk hunting operation is arrested and the call is extended over the idle trunk to the branch exchange 8 in the exact manner pointed out above.

From the above explanation, it will be understood that the starting of the trunk hunting operation occurs in response to the sequential release of the transfer relays R420 and R470 at the end of the third digit dialed into the connector. It will also be recalled that the two relays R450 and R530 are held operated during the trunk hunting operation. Following the release of the relay R470, the pulse-controlled relay R420 is rendered ineffective to control any of the transfer relays R450, R460, R470 and R480, or the control relay R530. Moreover, neither of the two operated relays R450 and R530, utilized in effecting the trunk hunting operation, are used to control the above-traced pulsing circuit over which the impulses of the fourth or code selecting digit are repeated to the operating magnet 673 of the minor switch 670. Accordingly, it will be understood that the fourth or code selecting digit may be dialed into the connector 20 to set the minor switch in the position corresponding to the desired ringing code, concurrently with the operation of the trunk hunting facilities to select an idle trunk in the selected trunk group.

In the arrangement illustrated, wherein it is assumed that four trunks to the branch exchange 8 are provided, the P. B. X arc 628 is only equipped with trunk hunting contacts in the first, second and third rotary positions of the ninth level, i. e., the contacts 91, 92 and 93. Accordingly, after the wipers 621, 622, 623 and 627 have been operated four steps in the rotary direction, no further circuit is available for energizing the trunk hunting relay R520 and the trunk hunting operation is arrested. Assuming that the fourth trunk of the group is tested and found busy, the busy test relay is energized over test circuit which includes the private conductor of this trunk. Shortly after the selection of the trunk is effected, the slow-acting control relay R530 and the transfer relay R450 are deenergized and restore in sequence. In releasing, the relay R450 completes the previously traced locking circuit for the busy test relay R440, and closes the previously described busy signaling circuit. Thus a busy signal is produced at the calling substation which informs the calling party that the desired connection cannot be obtained.

Night Service

As indicated previously, provisions are made in the link circuit for disabling the trunk hunting facilities when predetermined branch exchange directory numbers are dialed into the connectors. This permits different directory numbers to be utilized for day and night service respectively, and permits the operator in the branch exchange 8 to connect a predetermined one of the trunks, such, for example, as the trunk 12, to a night telephone so that all calls incoming to the branch exchange will automatically be routed to this night telephone when the operator is off duty. For example, in the case assumed above, the night directory number designating the branch exchange 8 may be "4921." In such case, if a first digit of four impulses is dialed into the connector 20 from a calling substation, the relay R560 is energized and locks up at the end of the digit. In response to the dialing of the second, third and fourth digits the call is routed to the night service trunk extending to the branch exchange 8 in the exact number described above with reference to the call routed over the line 11 to the substation B. With the relay R560 operated, the previously traced circuit for energizing the trunk hunting relay R520 is held open at the contacts 561 for the duration of the call. Accordingly, trunk hunting on the part of the connector 20 is positively precluded, the single trunk extending to the branch exchange 8 and designated for night service being directly selected and tested in the same manner as a subscriber line.

Incoming Trunk Calls

The manner in which a call routed to the illustrated community exchange switching equipment from a distant central office may be extended through the finder 19 and connector 20 to a subscriber line terminating at the community exchange is substantially similar to the mode of operation of this equipment to set up a connection between two local subscriber lines, in the manner explained above. Thus a connection may be routed from a toll operator position in a distant manual exchange, not shown, over a trunk connecting the two exchanges and through a repeater and line circuit to the illustrated link, in the exact manner explained above.

Assuming that the finder 19 is utilized in handling the inter-office call under consideration, the wipers of this switch are positioned on the contacts terminating the conductors of the link line extending to the repeater which terminates the trunk, in response to the application of ground potential to the distributor start lead 121 and the resulting operation of the common equipment included in this distributor. Incident to the vertical movement of the finder switch wipers the normal post springs 845 provided in the Strowger switching mechanism of the finder are actuated to connect the two conductors C274 and C275 together. The normal post springs 846 of the Strowger switching mechanism also operate to connect the two conductors C238 and C239 together, incident to the vertical movement of the finder wipers, to a position opposite the contact level in which the calling trunk is terminated.

The connection between the two conductors C274 and C275 as established through the normal post springs 845 serves to provide an operating circuit for the battery reversing relay R320, which circuit is completed incident to the operation of the back-bridge relay R340 when the call is answered. In this regard it will be understood that after the connection is extended to the connector 20 it may be routed therethrough to the desired substation in the exact manner described above with reference to the connection set up between the substations A and B. When the inter-office trunk call is answered at the called substation to cause the operation of the back-bridge relay R340, this relay closes its contacts 342 to complete the prepared operating circuit for the battery reversing relay R320. This circuit extends from ground by way of the contacts 361 and 342, C276, the contacts 261, C275, the operated normal post springs 845, C274, and the winding of R320 to battery. When energized over this circuit the relay R320 locks to the grounded lead C276 through its contacts 325. At its contacts 321 to 324, inclusive, the relay R320 reverses the direction of current flow over the loop circuit extending between the connector and the repeater associated with the inter-office trunk in use, whereby the usual off-hook supervisory signal is transmitted from the repeater over the trunk to produce an off-hook supervisory signal at the position of the operator handling the call in the distant manual office. It will be noted that the circuit for energizing the relay R320 is directly controlled by the back-bridge relay R340. Accordingly, the relay R320 is rendered controllable by the switchhook provided at the called substation to reverse the direction of current flow over the loop extending from the connector 20 to the inter-office repeater in use each time the switchhook contacts are opened or closed. Thus supervisory signals may be transmitted by the called subscriber to the position of the operator handling the call. In this regard it will be noted that when the call is released at the called substation the two relays R340 and R320 are sequentially deenergized and restore. The latter relay, in reversing the direction of current flow over the loop extending from the connector 20 to the repeater in use, causes the transmission of an on-hook supervisory signal to the distant operator position.

Outgoing Inter-Office Trunk Calls

Referring now more particularly to the mode of operation of the connector 20 to switch a calling loop circuit through to a repeater associated with an inter-office trunk extending to the automatic exchange 9, for example, it may be assumed that the above-described call originating at the substation A is intended for a subscriber served by the exchange 9. It may be assumed further that the directory number "0" is assigned to the group of inter-office trunks connecting the illustrated community exchange with the automatic exchange 9. After the call is extended to the connector 20, and when the single digit "0" is dialed into the connector from the calling substation A, ten current pulses are transmittted to the pulse-controlled relay R420 under the control of the line and pulsing relays R300 and R310. The first six current pulses are also transmitted to the operating magnet 673 of the minor switch 670, so that during the sixth impulse of the digit the wipers 671 and 672 are stepped to engage their respective associated sixth contacts. Incident to this operation a circuit through the wiper 671 is prepared for energizing the first digit pulse transfer relay R500. Shortly thereafter, and when the magnet 673 restores at the end of the sixth current pulse transmitted thereto, it closes its contacts 677 to complete the prepared operating circuit for the relay R500. This circuit extends from ground by way of the contacts 548, C597, the contacts 677, the wiper 671 and its engaged sixth contacts C498, the contacts 486, C494, and the lower winding of R500 to battery. A branch of this circuit extends through the contacts 475, C468, the contacts 534 and 509 and the winding of the trunk hunting relay R520 to battery. Thus the two relays R500 and R520 both operate at the end of the sixth impulse of the digit. In operating, the trunk hunting relay R520 locks to the grounded release conductor C273 through the contacts 509 and 522. At its contacts 521, the relay R520 prepares the previously described circuit over which the rotary magnet 507 is operated during a trunk hunting operation. The relay R500, upon operating, locks to the grounded hold conductor C291 through its preliminary make contacts 506, and opens its contacts 504 to prevent the remaining current pulses of the first digit from being transmitted to the operating magnet 673 of the minor switch 670. At its contacts 503, the relay R500 prepares the operating circuit for the relay R460. At its contacts 502, the relay R500 completes an alternative locking circuit for the two transfer relays R470 and R480, this circuit extending from the grounded hold conductor C291 by way of the engaged contacts 422 of the operated pulse-controlled relay R420, C439, the contacts 502, C438, the contacts 472, and the parallel-connected windings of the two transfer relays R470 and R480 to battery. At its contacts 501 and 502, the relay R500 completes a circuit for energizing the transfer relay R450, this circuit extending from the grounded hold conductor C291 by way of the contacts 422, C439, the contacts 502, C438, the contacts 472, C436, the contacts 501, C437, and the lower winding of R450 to battery. The relay R450, upon operating, locks to the grounded release conductor C272 through the contacts 454 and 531; opens the operating circuit for the transfer relay R470; opens the incomplete operating circuit for the idle test relay R520; and closes its contacts 456 to prepare the operating circuit for the busy test relay R440. At its contacts 451, the relay R450 opens a point in the previously traced busy signaling circuit.

In operating, the relay R500 also closes its contacts 505 to complete a circuit over which the remaining four current pulses of the digit are repeated by the two relays R300 and R310 to the vertical magnet 417. More specifically, this circuit, which is completed at the contacts 313 each time the pulsing relay R310 restores, extends from ground by way of the contacts 204 and 246, C296, the contacts 313 and 368, C390, the contacts 547, C511, the contacts 488 and 435, C459, the contacts 505, C467, and the winding of the magnet 417 to battery. Each time the vertical magnet 417 is energized in this circuit it closes its contacts 418 to reprepare or recomplete the operating circuit for the pulsing relay R310 and steps the wiper carriage structure of the Strowger switching mechanism one step in the vertical direction. It will be understood, therefore, that after the remaining four impulses of the digit have been transmitted to this magnet, the wiper 627 is positioned opposite the contact point 41, and the wipers 621, 622 and 623 are positioned opposite the fourth level of the associated contact field, i. e., the level in which the trunks extending to the automatic exchange 9 are terminated. Incident to the off-normal movement of these wipers, the vertical off-normal springs 425 are disengaged to open the operating circuit for the transfer relay R460, and the other off-normal springs 224, 225 and 259 are operated to perform the functions previously described.

Shortly following the end of the digit the relay R420 restores and opens its contacts 422 to interrupt the locking circuits for the transfer relays R470 and R480. At these contacts the operating circuit for the transfer relay R450 is also opened but the latter relay is held energized over its locking circuit as traced above. In releasing, the relay R480 opens its contacts 486 to interrupt the above-traced circuit for energizing the relays R500 and R520 in parallel. At its contacts 486', the relay R480 completes a circuit for energizing the ring transfer relay R640, this circuit extending from ground by way of the contacts 548, C597, the contacts 677, the wiper 671 and its engaged sixth contacts, C498, the contacts 486', C499, the contacts 563 and 574, C595 and the lower winding of R640 to battery. In operating, the relay R640 locks to the grounded hold conductor C291. The remaining switching operations performed by this relay are without effect in the present instance. At its contacts 488, the relay R480 opens another point in the common portion of the previously traced circuits for transmitting current pulses to the vertical magnet 417 and the operating magnet 673. The remaining switching operations performed incident to the release of the transfer relay R450 are without effect at this time.

The relay R470, upon restoring, opens its contacts 472 further to interrupt the above-traced locking circuit for itself and the transfer relay R480 and the operating circuit for the transfer relay R450. At its contacts 475, the relay R470 opens another point in the operating circuit for the trunk hunting relay R520. At its contacts 475', the relay R470 prepares an alternative circuit for energizing the trunk hunting relay R520. At its contacts 476, the relay R470 opens the locking circuit for the slow-acting control relay R530. At its contacts 476', the relay R470 prepares a circuit for energizing the relay R530 in parallel with the rotary magnet 507 during the trunk hunting operation. At its contacts 477, the relay R470 completes the previously traced operating circuit for the relay R540. At its contacts 477', the relay R470 opens a point in one of the available operating circuits for the release magnet 674. The relay R540, upon operating, locks to the grounded hold conductor C291 through its contacts 545, and opens its contacts 547 further to interrupt the common portion of he pulsing circuits over which current pulses are delivered to the magnets 673, 507 and 417, and to the relay R420. At its contacts 546, the relay R540 prepares a path for impressing ground potential upon the test conductor C273. At its contacts 548, the relay R540 opens a point in the common portion of the above-traced operating circuits for the relays R520, R500 and R540. At its contacts 549, the relay R540 prepares an alternative operating circuit for the drain control relay R500. At its contacts 543 and 544, the relay R540 opens the initially established locking circuit for the relay R510, and completes an obvious alternative locking circuit for this relay. At its contacts 542, the relay R540 prepares the operating circuit for the pick-up relay R510. At its contacts 541, the relay R540 prepares the operating circuit for the stop ringing relay R550.

At its contacts 474, the relay R470, in releasing, completes an automatic cut-in circuit over which the rotary magnet 507 is energized to rotate the wiper 627 into engagement with the contact terminal 41 and to rotate the wipers 621, 622 and 623 into engagement with the contacts terminating the conductors of the first trunk in the selected trunk group. This circuit extends from the grounded release conductor C272 by way of the contacts 593, C449, the contacts 474, C447, the contacts 521 and the winding of the magnet 507 to battery. A branch of this circuit extends from the contacts 521 by way of C490, the contacts 476' and C483 to energize the lower winding of the control relay R530. It will be understood that a current pulse is transmitted over this branch circuit each time the rotary magnet 507 is energized. Due to its slow-to-release characteristic the relay R530 remains operated during the trunk hunting operation. A second branch of the automatic cut-in circuit extends from the conductor C447 by way of the contacts 503, C294 and the winding of R460 to battery. In operating, the relay R460 closes its contacts 463 to connect the release conductor C272 to the control conductor C270 and thus prepare a circuit for holding the cut-off relay R110 operated after the switching through operation to an idle repeater is effected. At its contacts 461, the relay R460 opens a point in the operating circuit for the release magnet 257. At its contacts 462, the relay R460 opens a point in the prepared path for impressing ground potential upon the test conductor C273. At its contacts 464, the relay R460 opens a point in one of the initially completed paths connecting the two conductors C270 and C272. At its contacts 466, the relay R460 opens a point in the incomplete operating circuit for the idle test relay R520. At its contacts 465, the relay R460 short-circuits the switch-through relay R240 and in so doing prepares a circuit for energizing its own winding in series with the winding of the switch-through relay R240.

As indicated above, when the rotary magnet 507 is energized in the above-traced automatic cut-in circuit, it functions to step the wipers 621, 622 and 623 into engagement with the contacts terminating the conductors of the first trunk in the selected group. In operating, the magnet 507 also opens its contacts 509 to interrupt the locking circuit for the trunk hunting relay R520. The latter relay, upon restoring, opens its contacts 522 further to interrupt its locking circuit, and opens its contacts 521 to deenergize the parallel-connected windings of the magnet 507 and the control relay R530. The magnet 507 now restores and closes its contacts 509 to reprepare the operating and locking circuits for the trunk hunting relay R520.

Further operation of the trunk hunting facilities depends upon whether the first trunk of the group, as selected in the manner just explained, is idle or busy. In the event this trunk is occupied with a call, the test or private conductor thereof is marked with ground potential so that the operating circuit for the busy test relay R440 is completed incident to the selection of the trunk. In operating, the relay R440 closes its contacts 444 to complete a circuit through the P. B. X arc 628 for energizing the trunk hunting relay R520. More specifically, this circuit extends from ground through the plate 628 and the contact point 41 carried thereby, the wiper 627, C591, the contacts 561, C460, the contacts 444 and 475', C468, the contacts 534 and 509, and the winding of R520 to battery. At its contacts 446, the relay R440 opens the path short-circuiting the winding of the switch-through relay R240. At its contacts 445, the relay R440 prepares the above-mentioned path for impressing ground potential upon the test conductor C273.

In reoperating, the relay R520 recloses the circuit for energizing the parallel-connected windings of the magnet 507 and the relay R530. The magnet 507 now reoperates to step the wiper 627 into engagement with the contact point 42 and to step the wipers 621, 622 and 623 into engagement with the contacts terminating the second trunk of the selected level. At its contacts 509, the magnet 507 deenergizes the trunk hunting relay R520. The relay R520, upon restoring, opens its contacts 521 to deenergize the rotary magnet 507.

If the second trunk of the selected group is also busy, the busy test relay R440 is again energized and reoperates to recomplete the operating circuit for the trunk hunting relay R520, this circuit now extending to ground through the wiper 627, the second contact 42 in the fourth level of contacts carried by the arc 628, and through this arc to ground. In reoperating, the trunk hunting relay R520 again closes the operating circuit for the rotary magnet 507, whereby the wiper 627 is stepped to engage the contact point 43 and the wipers 621, 622 and 623 are stepped to engage the contacts terminating the conductors of the third trunk in the selected group. The trunk hunting operation of the connector 20 continues until all the trunks of the selected group are tested and found to be busy or until an idle trunk in the group is located.

Assuming that all four of the trunks in the group are busy, the wipers 621, 622, 623 and 627 are operated to the fourth rotary position wherein the first three thereof engage the contacts terminating the conductors of the last trunk in the group. With the wipers in this position it will be observed that the wiper 627 is disconnected from ground through the P. B. X arc 628 and, accordingly, no further circuit is available for energizing the trunk hunting relay R520. Since the fourth trunk of the group is assumed to be busy, it will be understood that the busy test relay R440 reoperates upon the selection of this trunk, and since the trunk hunting relay R520 remains in its restored position upon the selection of the last trunk in the group, no further current pulses are transmitted to the control relay R530. The latter relay accordingly restores shortly after the last trunk of the group is selected. In releasing, the relay R530 opens its contacts 531 to deenergize the transfer relay R450. At its contacts 532, the relay R530 opens the operating circuit for the relay R460 and a point in the operating circuit for the rotary magnet 507. At its contacts 534, the relay R530 opens a point in the operating circuit for the trunk hunting relay R520. The remaining circuit switching operations performed incident to the release of the relay R530 are without effect at this time. The relay R460, upon restoring, closes its contacts 461 to reprepare the operating circuit for the release magnet 257. The remaining circuit switching operations performed incident to the release of the relay R460 are without effect at this time. The transfer relay R450, upon restoring, closes its contacts 457 to complete the locking circuit for the busy test relay R440 and closes its contacts 451 to complete the previously traced busy signaling circuit. When this circuit is completed, busy tone current is transmitted over the calling end of the connection to signal the calling subscriber that the desired connection cannot be obtained. After receiving the busy signal the calling subscriber may release the connection in a manner clearly apparent from the preceding explanation.

Assuming now that the trunk 13 is the first idle trunk in the selected group, the trunk hunting operation of the connector 20 is arrested when the wipers 621, 622 and 623 are operated to engage the contacts terminating the conductors of the link line extending through the line circuit 17 to the repeater 18. With the trunk 13 idle the test conductor 13c is marked with negative battery potential, so that the busy test relay is not reoperated. With the busy test relay in its restored position, the trunk hunting operation of the connector is arrested. When the relays R530 and R450 sequentially restore shortly after the trunk is selected, the path short-circuiting the winding of the switch-through relay R240 is opened at the contacts 532, permitting the two relays R240 and R450 to be energized in series over a circuit which extends from the grounded release conductor C272 by way of the contacts 446 and 465, C227, the winding of R240, C284, and the winding of R460 to battery. The current traversing this circuit is sufficient to maintain the relay R460 in its operated position and to cause the operation of the switch-through relay R240.

In operating, the relay R240 closes its contacts 245 to complete a path including the grounded release conductor C272, the test conductor C273, and the wiper 623 for impressing ground potential upon the conductor 13c, thereby to mark the selected trunk 13 as busy. At its contacts 245', the relay R240 completes an obvious multiple path for impressing ground potential upon the start lead C389. At its contacts 246, the relay R240 opens the previously traced operating and locking circuits for the hold relay R370. At its contacts 242 and 244, the relay R240 switches the calling loop circuit through to the repeater 18. At its contacts 241 and 243, the relay R240 opens the loop circuit as initially extended to the connector 20, thereby to cause the deenergization and release of the three relays R300, R260 and R310.

When the calling loop circuit is extended over the conductors C263 and C266 to the repeater 18 in the manner just explained, certain of the relays embodied therein operate to connect the test conductor 13c and the connected conductors C273 and C272 to ground, thereby to provide locking circuits for the relays R240 and R460. In operating, these relays of the repeater also condition the repeater to repeat impulses transmitted thereto from the calling substation over the trunk 13 to the automatic switching equipment provided in the exchange 9, and close a path for impressing ground potential upon the control conductor C270 for the purpose of maintaining the cut-off relay R110 operated and the line 10 marked as busy in the bank contacts of the connectors after the hold slave relay R360 releases. This ground path may partially be traced as extending by way of the grounded test conductor 13c, the wiper 623, C273, the contacts 245, C272, the contacts 463, C299, and the contacts 223 to the control conductor C270.

Shortly following the operation of the repeater 18 to perform the functions just described, the hold relay R370 restores and opens its contacts 373 and 374 to deenergize the hold slave relay R360. The relay R360, upon restoring, opens its contacts 365 to interrupt the operating circuit for the timing relay R200 and thus render the timing facilities of the connector 20 inactive. At its contacts 361, the relay R360 opens the only remaining path in the connector 20 over which ground potential is impressed upon the release conductor C272 and the connected conductors C270 and C273. At its contacts 363, the relay R360 completes the previously described path for impressing ground potential upon the release alarm conductor C281. At its contacts 364', the relay R360 prepares the operating circuit for the release magnet 257. At its contacts 366', the relay R360 disconnects the hold conductor C291 from ground, thereby to cause the deenergization and release of any operated ones of the relays R200, R500, R540 and R640. At its contacts 369, the relay R360 recompletes one of the above-traced operating circuits for the release magnet 674, whereby the minor switch 670 is restored to normal. Incident to the release of this switch the off-normal springs 675 are disengaged to deenergize the relay R580. In restoring, the relay R580 opens ts contacts 583 to disconnect the release alarm conductor C281 from ground. Following the release of the last-mentioned relay, no further operation of the control equipment embodied in the connector 20 occurs until the connection is released. In this regard it will be noted that after the switch-through operation is effected the calling loop circuit as extended to the repeater 18 is cleared of all impedances which might interfere with the transmission of switch directing impulses to this repeater. It will also be noted that only the two relays R240 and R460 are operated in the connector 20 after the switch-through operation is completed. The dial pulses as transmitted to the repeater 18 are, through operation of this repeater, transmitted to the automatic switching equipment assigned for use in the exchange 9 and serve to control this equipment so that the call is extended to the desired substation in a manner well understood in the art. The manner in which the called substation is signaled and the desired talking circuit is set up, all under the control of the assigned automatic switching equipment in the exchange 9, may be entirely conventional.

Preferably, the circuit arrangement of the repeater 18 is such that the release of the connection as extended through the connector 20 and the automatic switching equipment of the exchange 9 to the called line is entirely under the control of the calling subscriber at the substation A. With this arrangement, when the calling subscriber hangs up to interrupt the loop circuit extending to the repeater 18 the operated control relays of this repeater are deenergized and restore. Incident to the release of these relays the loop circuit extending to the automatic exchange 9 and including the conductors of the trunk 13 is interrupted to initiate the release of the automatic switching equipment occupied with the call in the exchange 9. Also incident to the release of the operated relays in the repeater 18, the connected conductors 13c, C273, C272 and C270 are disconnected from ground. When the conductor 13c is disconnected from ground the line circuit 17 is released in a manner clearly apparent from the above explanation with reference to the line circuit 14. When the control conductor C270 is disconnected from ground the line circuit 14 is also released in a manner clearly apparent from the preceding explanation. When the release conductor C272 is disconnected from ground the finder 19 is caused to release and the two operated relays R240 and R460 of the connector 20 are deenergized and restore. In releasing, the relay R460 closes its contacts 461 to complete the prepared operating circuit for the release magnet 357. This magnet, upon operating, closes its contacts 258 to impress ground potential upon the release alarm conductor C281 and attracts its associated holding pawl to cause the release of the wiper carriage structure embodied in the Strowger switching mechanism of the connector 20. When this structure is restored to its rotary and vertical normal position, the off-normal springs 423, 224, 225 and 259 are respectively operated to their normal positions. Incident to the disengagement of the off-normal springs 259, the release magnet 357 is deenergized. In releasing, this magnet opens its contacts 258 to disconnect the release alarm conductor C281 from ground. Following the release operations just described, all of the equipment utilized in handling the call is fully restored to normal and rendered available for further use.

RESTRICTED SERVICE

As pointed out previously, provisions are made in the system for imposing as many as three different restrictions on the service rendered any particular subscriber line. More specifically, any subscriber line may be prevented from obtaining access to the trunks of three different trunk groups. These different trunk groups are identified by the settings of the normal post springs 205, 206 and 217, 218 and 219 at the end of the vertical movement of the connector wipers 621, 622, 623 and 627. For example, if a trunk selecting digit is dialed into the connector which designates the first group of restricted trunks, the normal post springs 205 are opened and the normal post springs 206 are closed. If a trunk selecting digit designating the second group of restricted trunks is dialed into the connector 20, the normal post springs 217 and 218 are respectively operated into engagement and the normal post springs 219 are disengaged. Finally, if a trunk selecting digit designating the third group of restricted trunks is dialed into the connector the normal post springs 205 are opened, the normal post springs 206 are closed, the normal post springs 217 and 218 are respectively engaged, and the springs 219 are disengaged. Thus it will be understood that the setting of the indicated normal post springs after a trunk selecting digit has been dialed into the connector, serves to indicate the particular trunk group which has been selected. These springs serve directly to control the circuits over which the two service restricting relays R210 and R215 may be energized from the network 40 illustrated in Figs. 11 and 12 of the drawings.

The purpose of this network is to provide three different types of current pulses which respectively designate the different restrictions. In considering the operation of this network it may be assumed that the illustrated finder-connector link is seized over a calling line and that a connection is extended from that line to the connector 20 to cause the operation of the hold-slave relay R360 in the manner previously explained. As previously noted, this relay, in operating, closes its contacts 363 to impress ground potential upon the start conductor C380 and thus energize the start relay R1100. In operating, the relay R1100 closes its contacts 1101 to prepare operating, release and locking circuits for the relays R1140, R1150, R1160 and R1170. At its contacts 1102, the relay R1100 completes an obvious circuit for energizing the slow-to-operate relay R1110. In operating, the relay R1110 opens its contacts 1111 to remove the short-circuit from the winding of the slow-to-operate relay R1120, permitting the latter relay to be energized in an obvious circuit. The relay R1120, upon operating, closes its contacts 1121 to energize the slow-acting relay R1130. The relay R1130 now operates and closes its contacts 1132 to short-circuit the relay R1110. The relay R1110 releases after an interval and closes its contacts 1111 to short-circuit the relay R1120. When the relay R1120 restores it opens its contacts 1121 to deenergize the relay R1130. The relay R1130 now restores and opens its contacts 1132 to interrupt the path short-circuiting the winding of the relay R1110. From this point on the three relays R1110, R1120 and R1130 continue to operate in a cyclic manner until ground potential is removed from the start conductor C380 to cause the deenergization and release of the start relay R1100. It will be understood from the foregoing explanation that the relay R1130 alternately operates and restores to open and close its contacts 1131 at spaced intervals.

Upon first operating to close its contacts 1131, the relay R1130 completes circuits commonly extending to ground through the contacts 1101 and respectively including the contacts 1142 and 1152 for energizing the lower winding of the relay R1140 and the two windings of the relay R1150 in parallel. As indicated by the legends appended thereto, the four relays R1140, R1150, R1160 and R1170 are all of the differentially wound type. Accordingly, the relay R1150 does not operate when its two windings are concurrently energized. The relay R1140, upon operating, first closes its contacts 1141 to complete an obvious alternative circuit for energizing the lower winding in parallel with the lower winding of the relay R1150. After this circuit is completed the relay R1140 opens its contacts 1142 to interrupt the initially completed circuit for energizing its lower winding and the lower winding of the relay R1150 in parallel.

When the relay R1130 first restores, it opens its contacts 1131 to deenergize the upper winding of the relay R1150, permitting the latter relay to operate due to the continued energization of its lower winding. In operating, the relay R1150 opens its contacts 1152 further to interrupt the circuit for energizing its upper winding, and closes its contacts 1153 to prepare the circuit for energizing the upper winding of the relay R1140. At its contacts 1151, the relay R1150 completes a circuit including the contacts 1162, 1171 and 1101 for energizing in parallel the lower winding of R1160 and the two windings of R1170. When this circuit is completed only the relay R1160 operates. In operating, the relay R1160 closes its contacts 1161 to complete an obvious alternative circuit for energizing its lower winding in parallel with the lower winding of R1170. After this circuit is completed the relay R1160 opens its contacts 1162 to interrupt the initially completed circuit for energizing its lower winding in parallel with the lower winding of R1170.

The second time the relay R1130 operates to close its contacts 1131, it completes a circuit through the contacts 1153 for energizing the upper winding of the relay R1140. When its two windings are thus concurrently energized, the relay R1140 restores to again include the contacts 1131 in the circuit for energizing its own lower winding in parallel with the lower winding of R1150.

The second time the relay R1130 restores, it opens its contacts 1131 to deenergize the lower winding of the relay R1150. The relay R1150 now restores and opens its contacts 1151 to interrupt the circuit for energizing the upper winding of R1170. At this time only the lower winding of the relay R1170 is energized. Accordingly, this relay operates and closes its contacts 1172 to prepare the circuit for energizing the upper winding of the relay R1160. At its contacts 1171, the relay R1170 opens another point in the circuit for energizing its own upper winding.

The third time the relay R1130 operates to close its contacts 1131, the relay R1140 reoperates and both windings of the relay R1150 are again energized. The third time the relay R1130 restores to open its contacts 1131, the upper winding of the relay R1150 is deenergized and this relay reoperates. In reoperating, the relay R1150 closes its contacts 1151 to complete a circuit through the contacts 1172 for energizing the upper winding of the relay R1160. The relay R1160 now restores and closes a circuit through the contacts 1162, 1172 and 1151 for energizing its two windings in parallel with the lower winding of the relay R1170.

The fourth time the relay R1130 recloses its contacts 1131, it completes the circuit for energizing the upper winding of the relay R1140. The relay R1140 now restores to include the contacts 1131 in the circuit for energizing its two windings in parallel with the lower winding of the relay R1150. The fourth time the relay R1130 releases, it opens its contacts 1131 to deenergize the parallel-connected windings of the two relays R1140 and R1150. The relay R1150 now restores and opens its contacts 1151 to deenergize the parallel-connected windings of the relays R1160 and R1170, causing the relay R1170 to restore. From this point on the manner in which the four relays R1140, R1150, R1160 and R1170 continue to interact under the control of the pulsing relay R1130 is exactly the same as explained above. It will be understood from this explanation that these four relays follow a definite cycle in operating and releasing.

During the period of each operating cycle of the four differentially wound relays when the relay R1140 is alone operated, a circuit is completed for energizing the pulsing relay R1210, this circuit extending from ground by way of the contacts 1143, 1154 and 1174, C1177 and the winding of R1210 to battery. During the period of each operating cycle of the four differentially wound relays when the two relays R1150 and R1160 are operated and the relays R1140 and R1170 are restored, a circuit is completed for energizing the pulsing relay R1220, this circuit extending from ground by way of the contacts 1144, 1155 and 1163, C1178 and the winding of R1220 to battery. During the period of each operating cycle of the four differentially wound relays when the relays R1140, R1160 and R1170 are operated and the relay R1150 is restored, a circuit is completed for energizing the pulsing relay R1200, this circuit extending from ground by way of the contacts 1143, 1154 and 1173, C1176, and the winding of R1200 to battery. From a careful consideration of the pattern of the operating cycle of the four differentially wound relays, it will be observed that the three relays R1210, R1220 and R1200 are sequentially operated at spaced and non-concurrent intervals of equal duration during each operating cycle of the four differentially wound relays. In operating, the relay R1210 closes its contacts 1211 to energize the connect relay R1240 in an obvious circuit. The relay R1240, upon operating, closes its associated make contacts to connect the marking terminals 1265, 1266, 1267, etc., of the cross-connecting frame 1260 to ground. The relay R1220, upon operating, closes its contacts 1221 to energize the connect relay R1250 in an obvious circuit. Each time the relay R1250 operates it closes its associated make contacts to connect the marking terminals 1263, 1268, etc., of the cross-connecting frame 1260 through the resistor 1255 to the negative terminal of the exchange battery. During each period when the relay R1200 is operated an obvious circuit is completed at the contacts 1201 for energizing the connect relay R1230. With the latter relay operated, the marking terminals 1261, 1269, etc., are connected to the ringing current conductor C618 through the condenser 1271, 1272, etc., and the operated make contacts of the relay R1230.

With the wiring arrangement illustrated, the line 10 can not obtain access to the trunks of the first and second groups but can obtain access to the trunks of the third group; whereas the line 6 is arranged to have access to the trunks of the second group but is denied access to the trunks of the first and third groups. Thus it will be noted that the EC conductor 10e individual to the line 10 is strapped at the cross-connecting frame 1260 to the two terminals 1261 and 1266. The EC lead 6e individual to the line 6, on the other hand, is strapped at this frame to the terminals 1263 and 1267. If, with the line circuit of the line 10 wired to the restricted service network 40 in the manner indicated, a call intended for the first group of trunks is initiated on the line 10 and is routed through the illustrated finder-connector link to this group of trunks, the selection of the trunk group and of an idle trunk of this group proceeds in the exact manner explained above. During the vertical movement of the connector switch wipers to effect the selection of the trunk group, and more particularly when these wipers are positioned opposite the level of contacts in which the trunks of this group are terminated, the normal post springs 205 are disengaged and the normal post springs 206 are engaged. Incident to the selection of the idle trunk the switch-through relay R240 functions in the manner previously explained to extend the calling loop circuit through to the repeater terminating this trunk in the community exchange, and initiates the release of all of the relays in the connector 20 with the exception of the relay R460. In operating, the switch-through relay R240 also closes its contacts 245' to complete an obvious path for impressing ground potential upon the restricted service start conductor C309, thereby to maintain the operation of the cyclically operating relays illustrated in Fig. 11 of the drawings. At its contacts 244', the relay R240 prepares a circuit for energizing the lower winding of the restricted service relay R215. Thereafter, and when the pulsing relay R1240 operates in the manner explained above, the lower winding of the relay R215 is energized in a circuit which extends from ground by way of the contacts 1243, the strapped terminals 1266 and 1262, the EC lead 10e individual to the line 10, the wiper 834, the contacts 804, C269, the contacts 244', the normal post springs 206 and 219 and the lower winding of R215 to battery. In operating, the relay R215 closes its contacts 216 to complete an obvious path for short-circuiting the winding of the switch-through relay R240. When thus short-circuited the relay R240 releases after an interval and opens its contacts 245 to disconnect the hold conductor C272 from the grounded test wiper 823, whereby the relay R460 is deenergized and restores and the switch-through relay R800 of the finder 19 is deenergized and restores. At its contacts 242 and 244, the relay R240 opens the loop circuit to the repeater associated with the seized trunk, permitting this repeater and its associated line circuit to release. At its contacts 244', the relay R240 opens the above-traced circuit for energizing the lower winding of the restricted service relay R215, causing the latter relay to restore after an interval. The relay R800, upon restoring, initiates the release of the finder 19 in the manner previously explained, and opens its contacts 801 and 802 further to interrupt the loop circuit as initially extended to the connector 20. At its contacts 804, the relay R800 opens another point in the above-traced circuit for energizing the lower winding of the restricted service relay R215. The relay R460, upon restoring, closes its contacts 461 to complete the previously traced operating circuit for the release magnet 257, whereby the Strowger switching mechanism of the connector 20 is restored to normal. Following the operations just described the illustrated finder-connector link is fully restored to normal.

Incident to the release of the link in the manner just explained, the line circuit 10 associated with the calling line is operated to its line lockout setting. Thus, when ground potential is removed from the control conductor C270, the cutoff relay R110 of the line circuit 14 is deenergized and restores. In releasing, this relay first closes its contacts 111 and 113 to again bridge the windings of the line relay R100 across the conductors of the line 10, so that the latter relay is held energized over the loop circuit extending to the substation A. After the calling loop circuit is thus re-established, the relay R110 opens its contacts 112 to interrupt the locking circuit for the line relay R100, and closes its contacts 114 to complete a path through the contacts 101 for maintaining guarding ground potential upon the private conductor 10c. At its contacts 115 and 116, the relay R110 opens additional points in its operating and locking circuits as traced above. At its contacts 117, the relay R110 reprepares the path through the contacts 104 and 105 for impressing ground potential upon the start lead C121, this path now being open at the contacts 105 of the line relay R100. The line relay R100 is held in its operated position until the loop circuit extending to the substation A is broken at this substation. When the calling party at the substation A restores the handset provided at this substation to its supporting hook or cradle, the loop circuit is interrupted to cause the deenergization and release of the relay R100. At this time the line circuit 14 is fully restored to normal.

In the event a subscriber served by the line 10 attempts to obtain access to the trunks of the second group and the illustrated finder-connector link is utilized in extending the connection to the repeater associated with an idle trunk of this group, the normal post springs 217 and 218 are respectively engaged and the normal post springs 219 are disengaged incident to the operation of the connector wipers 621, 622 and 623 to a position opposite the level of contacts in which the trunks of the second group are terminated. In this case, the normal post springs 205 and 206 occupy their illustrated positions at the end of the trunk selecting operation. In operating at the end of the trunk selecting operation, the switch-through relay R240 closes its contacts 244' to prepare a circuit for energizing the upper winding of the relay R210. Thereafter, and when the pulsing relay R1230 operates, this circuit is completed at the contacts 1234. More specifically, this circuit extends from the ringing current conductor C618 by way of the contacts 1234, the condenser 1271, the strapped terminals 1261 and 1262, the EC lead 10e, the wiper 834, the contacts 804, C269, the contacts 244', the normal post springs 205 and 217, the upper winding of R210, the condenser 213 and the exchange battery to the opposite terminal of the ringing current generator. When energized in this circuit the relay R210 first locks to the grounded hold conductor C272 through its preliminary make contacts 211, and then closes its contacts 212 to short-circuit the switch-through relay R240. Upon restoring, the relay R240 initiates the release of the illustrated finder-connector link and the repeater associated with the seized trunk, in the exact manner described above.

If a subscriber served by the line 10 attempts to obtain access to the trunks of the third group, the call is allowed to proceed in the normal manner without interference due to the operation of the service restricting facilities. Assuming that the illustrated link is utilized in handling the call, both sets of normal post springs are operated incident to the vertical movement of the wipers 621, 622 and 623 to a position opposite the level of contacts in which the trunks of the desired group are terminated. It will be understood, therefore, that the normal post springs 206 and 218 are closed at the end of the trunk selecting operation to prepare the available circuit for energizing the upper winding of the restricted service relay R215. This circuit is further prepared at the contacts 244' when the switch-through relay R240 subsequently operates in response to the selection of an idle trunk in the desired group. It will be noted that following the operation of the relay R240, ground pulses and pulses of ringing current are intermittently transmitted through the upper winding of the relay R215. The ground pulses only serve to short-circuit this winding. The ringing current pulses, due to the alternating character thereof, are ineffective to produce operation of the relay R215. Accordingly, this relay remains in its restored position for the duration of the call and the call is permitted to proceed in the normal manner.

The manner in which service restrictions are imposed upon the other lines of the system will be clearly apparent from the above explanation. In this regard it is pointed out above that the line 6 is restricted against the selection of trunks in the third group due to the strapping of the terminals 1263 and 1264 at the cross-connecting frame 1260. With this arrangement, if a call is initiated on the line 6, which is intended for a trunk of the third group and is routed through the illustrated finder-connector link to an idle trunk of this group, both sets of normal post springs are operated incident to the selection of the trunk group, in the manner pointed out above. Accordingly, the circuit for energizing the upper winding of the restricted relay R215 is prepared at the contacts 244' and the normal post springs 206 and 218, immediately the repeater associated with an idle trunk in the third group is seized. Shortly thereafter, and when the pulsing relay R1250 operates, the relay R215 is energized in a circuit which extends from the grounded hold conductor C272 by way of the upper winding of R215, the normal post springs 218 and 206, the contacts 244', C269, the contacts 804, the wiper 834, the EC lead 6e, the strapped terminals 1264 and 1263, the contacts 1251 and the resistor 1255 to battery. In operating, the relay R215 initiates the release of the operated link and the repeater associated with the seized trunk, in the exact manner explained above.

REVERTING CALLS

The arrangement of the illustrated automatic switching equipment provided in the community exchange is such that reverting call connections, i. e., connections between substations served by the same line, are set up by the directory number dialing method. In considering this type of call it may be assumed that a call intended for the substation C is initiated at the substation B and that the illustrated finder-connector link is utilized in handling the call. After the connection is extended through the line circuit 15 and the finder 19 to the connector 20 and the dial tone signal is transmitted to the calling subscriber at the substation B, this subscriber may dial the directory number designating the desired substation C. The first three digits of this number correspond to the first three digits of the directory number designating the substation B, only the fourth or code selecting digits of the two numbers being different to distinguish between the two substations. At the end of the third digit the wipers 621, 622 and 623 of the connector are positioned to engage the contacts terminating the conductors of the line 11. Obviously, this line is marked as busy through the application of ground potential to the private conductor 11c thereof. Accordingly, the previously traced operating circuit for the busy test relay R440 is completed immediately the line is selected by the connector 20. Shortly after the third digit is completed, the transfer relay R450 restores to complete the locking circuit for the busy test relay R440 and to close the previously traced busy signaling circuit. Accordingly, after the dialing operation is completed, i. e., after the fourth digit is dialed into the minor switch 670 to select the ringing code assigned to the substation C, a busy signal is received by the calling subscriber. Upon receiving this signal the calling subscriber restores the receiver provided at the substation B to its supporting hook or cradle, whereby the hook or cradle switch springs are operated to interrupt the loop circuit extending through the finder 19 to the connector 20. When this loop circuit is broken, the three relays R260, R300 and R310 are deenergized and restore. When the two relays R300 and R310 restore the operating and locking circuits for the hold relay R370 are opened at the contacts 312 and 302, respectively. At its contacts 313, the relay R310 prepares the previously mentioned operating circuit for the reverting call relay R250 and completes a locking circuit for the operated cut-off relay in the line circuit 15. More specifically, the relay R310, upon closing its contacts 313, completes a path for impressing ground potential upon the connected conductors C273, 11c and C270. This path extends from ground by way of the contacts 204 and 246, C296, the contacts 313 and 368, C390, the contacts 546, C516, the contacts 462 and 445, C273, the test wiper 623, the private conductor 11c, the test wiper of the finder 19 and the contacts 803 to the conductor C270. This ground path serves to maintain the line 11 marked as busy and to prevent the release of the operated line and cut-off relays in the line circuit 15. When ground potential is applied to the conductor C270 over the above-traced path, a locking circuit is established for the hold slave relay R360, this circuit extending from the grounded conductor C270 by way of the contacts 223, C299, the contacts 464, C226, the contacts 364 and the winding of R360 to battery.

When the hold relay R370 restores it opens its contacts 374 to interrupt the operating circuit for the hold relay R360, and opens its contacts 373 to disconnect the control conductor C270 from ground in the connector 20. At its contacts 372, the relay R370 completes the prepared operating circuit for the reverting call relay R250, this circuit extending from the grounded control conductor C270 by way of the contacts 372, C379, the contacts 442, C271 and the winding of R250 to battery. In operating, the relay R250 opens its contacts 251 and 252 to disconnect the repeating coil windings 346 and 347 from the conductors of the line 11, and thus interrupt two additional points in the circuit for energizing the two relays R260 and R300 in series. At its contacts 253, the relay R250 prepares the operating circuit for the relay R230. At its contacts 253', the relay R250 prepares an alternative path for connecting the test conductor C273 to ground. At its contacts 254, the relay R250 opens a point in one of the previously traced paths for impressing ground potential upon the test conductor C273. At its contacts 256, the relay R250 completes the previously mentioned alternative operating circuit for the drain control relay R600, this circuit extending from ground by way of the contacts 366', C291, the contacts 256, C228, the contacts 549, C598, the contacts 639, and the winding of R600 to battery.

In operating, the relay R600 closes its contacts 605 to complete a circuit including the grounded hold conductor C291 for energizing the switching relay R630. The relay R630, upon operating, locks through its contacts 638 to the grounded hold conductor C291, and opens its contacts 639 to deenergize the drain control relay R600. At its contacts 635, the relay R630 completes the above-mentioned alternative path for impressing ground potential upon the connected conductors C273, 11c and C270, thereby to provide locking circuits for the relays R250 and R360 and the operated cut-off relay of the line circuit 15. This path extends from ground by way of the contacts 204 and 253', C277 and the contacts 635 to the conductor C273. At its contacts 632, the relay R630 opens the previously traced busy signaling circuit to prevent the continued transmission of busy tone signaling current over the line 11. In operating, the relay R630 also closes its contacts 636, thereby to render the pickup relay R510 responsive to the pickup pulse next transmitted over the selected one of the two pickup leads C576 and C577. From this point on the manner in which ringing current of the selected code is transmitted over the line 11, to energize the ringer provided at the called substation C, is exactly the same as described above with reference to the call originating at the substation A and routed to the substation B.

When the answering loop circuit is completed, the ring cut-off relay R660 is energized thereover in the manner previously explained. In operating, this relay closes its contacts 661 to complete the prepared operating circuit for the stop ringing relay R550. The relay R550 now operates and locks to the grounded conductor C272 through its contacts 551. At its contacts 553, the relay R550 deenergizes the pickup relay R510, if operated. At its contacts 554, the relay R550 completes one of the previously traced operating circuits for the release magnet 674, whereby the minor switch 670 is restored to normal in the manner previously described. Incident to the release of this switch the off-normal springs 675 are disengaged to deenergize the relay R500 which now restores. The relay R510, upon restoring, opens its contacts 515 to deenergize the relay R610, if operated. The relay R610, in releasing, opens its contacts 616 to deenergize the drain control relay R600, if operated. When the relay operations just described are concluded, the transmission of ringing current over the line 11 is arrested. When both of the relays R600 and R610 are deenergized, the answering loop circuit is extended through the repeating coil windings 348 and 349 to include the winding of the back-bridge relay R340. The relay R340, upon operating, closes its contacts 341 to complete the previously traced locking circuit for the stop ringing relay R550, and opens its contacts 343 to interrupt the operating circuit for the timing relay R200. At its contacts 342, the relay R340 completes the prepared operating circuit for the relay R230, this circuit extending from ground by way of the contacts 361 and 342, C276, the contacts 253, and the upper winding of R230 to battery. In operating, the relay R230 locks to the grounded control conductor C270 in a circuit which includes its lower winding, the contacts 234, C271, the contacts 442, C279, and the contacts 372. At its contacts 235' the relay R230 connects the ringing apparatus start conductor C532 to ground. At its contacts 235, the relay R230 prepares the operating circuit for the reverting call timing relay R220. At its contacts 231, the relay R230 completes a circuit for transmitting a distinctive signal tone current over the established connection to the answering substation. This current is derived from the ringing current generator and the circuit traversed thereby may be traced as extending from the generator lead C619 by way of springs controlled by the ringing interrupter, the reverting call tone lead C267, the condenser 223, and the contacts 231 to the negative link line conductor C268. From this point, the current is transmitted over the line 11 to energize the receiver provided at the answering substation. This current, as reproduced in the form of a distinctive interrupted signal, serves to inform the answering party that the answered call is of the revertive type. The purpose of transmitting this signal is to prevent the answering party from believing that the answered call has been abandoned. Assuming that the line 11 is arranged for bridged ringing, the ringer provided at this substation is energized concurrently with that provided at the substation C during the ringing interval. Accordingly, when the call is answered at the called substation, to terminate the ringing operation in the manner just explained, the calling subscriber is informed that the call has been answered. Accordingly, this subscriber may, by again lifting the receiver provided at the substation B from its supporting hook or cradle, establish the desired talking circuit between the two substations B and C. In the event the line 11 is arranged for divided ringing and the ringers at the calling and called substations are connected to different sides of the line 11, the calling subscriber at the substation B is expected to wait a reasonable time interval after hanging up to initiate the ringing operation, before again removing the receiver at this substation from its supporting hook or cradle. This permits a ringing period of reasonable length to elapse during which the called substation may be signaled before the ringing operation is arrested. In this regard it will be noted that, regardless of the substation at which the answering loop circuit including the line 11 is established, the ringing operation is automatically terminated when such a loop circuit is completed.

A short interval after the operation of the start timing relay R230 to perform the functions just described, the timing portion of the interrupter included in the apparatus shown in Fig. 13 of the drawings functions to transmit a ground pulse over the lead C298, thereby to energize the timing relay R220 in an obvious circuit. In operating, the relay R220 locks through its contacts 221 to the grounded hold conductor C291. At its contacts 222 and 223, the relay R220 transfers the holding circuit for the relay R360 from the grounded control conductor C270 to the grounded cut-off lead C298, the latter lead normally being connected to ground through contact springs controlled by the timing portion of the interrupter. A short time interval after the timing relay R220 operates, the interrupter disconnects the lead C298 from ground, thereby to deenergize the hold slave relay R360. The relay R360 now restores and opens its contacts 361 to disconnect the release conductor C272 from ground. At its contacts 364, the relay R360 further interrupts its own locking circuit. At its contacts 366', the relay R360 disconnects the hold conductor C291 from ground to cause the deenergization and release of the relays R220, R540 and R630, and any operated ones of the relays R560, R570 and R640. At its contacts 368, the relay R360 opens the previously traced path for impressing ground potential upon the connected conductors C272, 11c and C270. When ground potential is removed from the release conductor C272 the operated finder 19 is released in the manner previously described and the busy test relay R450 is deenergized and restores. When ground potential is removed from the conductor 11c, the operated cut-off relay of the line circuit 15 is deenergized and restores to reconnect the windings of its associated line relay across the conductors of the line 11. Thus the line circuit 15 is operated to its line lockout setting wherein the line relay thereof is operated and the cut-off relay thereof is released. With the circuit in this condition ground potential is restored to the private conductor 11c to maintain the line 11 marked as busy in the connectors having access thereto, and talking battery is supplied to the transmitters provided at the calling and called substations through the windings of the line relay.

When ground potential is removed from the control conductor C270, the two relays R250 and R230 are deenergized and restore. Incident to the release of the hold slave relay R360, the contacts 364' are closed to complete the prepared operating circuit for the release magnet 257, whereby the Strowger switching mechanism of the connector 20 is restored to normal in the manner previously described. Incident to the release of this mechanism, the off-normal springs 259 are disengaged to deenergize the release magnet 257. Following the deenergization of this magnet all of the equipment utilized in signaling the desired substation C, with the exception of the line circuit 15, is restored to normal in readiness for further use. When the calling and called parties at the substations B and C, respectively, both hang up to open the established loop circuit extending to the line circuit 15, the operated line relay of this line circuit is deenergized and restores. Thus the line circuit 15 is released.

*Forced release*

As previously indicated, the relay R200 is controlled by the timing portion of the interrupter forcibly to release the illustrated link comprising the finder 19 and the connector 20 when this link is held over a line having a permanent calling condition thereon. The permanent condition of the line may be due to a fault on the line or to carelessness on the part of a party using the line. In considering the manner in which the forced release of the link is accomplished it may be assumed that the link is held over the line 10. In this regard it will be recalled from the preceding explanation that, when a loop circuit is extended from the line 10 to the connector 20, the hold slave relay R360 operates and closes its contacts 365 to prepare the operating circuit for the timing relay R200. A short time interval after this circuit is prepared the interrupter functions to transmit a ground pulse over the lead C290 and thus energize the upper winding of the timing relay R200, in a circuit which includes the contacts 202, C392, the contacts 365 and 343, and the conductor C287. In operating, this relay locks up in a circuit which includes its lower winding, the preliminary make contacts 203, C292, the contacts 557, C482, the contacts 423, and the grounded hold conductor C291. At its contacts 201 and 202, the relay prepares an alternative locking circuit for itself and then interrupts its operating circuit. At its contacts 203 and 204, the relay R200 extends the operating and locking circuits for the hold relay R370 to the normally grounded cut-off lead C288 and then opens these circuits as initially completed. Assuming that the call was initiated at the substation A, and that the dialing of the directory number designating the desired substation is performed at the calling substation within a reasonable time interval, the operation of the timing equipment forcibly to release the link is prevented. In this regard it will be noted that the locking circuit for the timing relay R200 is opened at the contacts 423 each time a digit is dialed into the connector 20 to cause the operation of the pulse-controlled relay R420. In the event the dialing operation is started but not completed the timing relay R200 will obviously be reoperated shortly after the dialing operation is discontinued. On the other hand, if no switch directing impulses are transmitted to the connector 20, the timing relay R200 will remain in its operated position after it is initially energized. Assuming that this relay is held operated, the interrupter functions to disconnect the cut-off lead C288 from ground at the end of a measured time interval, thereby to deenergize the hold relay R370.

The relay R370, upon restoring, opens its contacts 374 to deenergize the hold slave relay R360. The latter relay, upon restoring, disconnects the conductors C270, C272 and C291 from ground to deenergize the timing relay R200 and to initiate the release of the link in the manner previously explained. In releasing, the relay R200 opens its contacts 203 and closes its contacts 204 to transfer the operating and locking circuits for the hold relay R200 from the conductor C288 back to ground through the contacts 204. It is noted, however, that the relay R300 releases to cause the release of the line relay R300 before the timing relay R200 can restore and the hold relay R370 can reoperate. Accordingly, the release of the link can proceed in the exact manner explained above.

When ground potential is removed from the control conductor C270, the cut-off relay R110 is deenergized and restores. In releasing, this relay bridges the windings of the line relay R100 across the conductors of the line 10 to maintain the latter relay energized. Thus it will be noted that the line circuit 14 is operated to its line lockout setting incident to the removal of ground potential from the control conductor C270. This setting is maintained until the calling condition present on the line 10 is removed, at which time the line relay R100 is deenergized and restores.

In the event a timing operation is in progress at the time a call routed through the link is answered, the relay R200 is rendered inoperative forcibly to release the link. In this regard, it will be recalled that when a call routed through the link to a called substation is answered, the relays R550 and R340 sequentially operate. In operating, the relay R550 opens its contacts 557 to interrupt the initially completed locking circuit for the relay R200 and closes its contacts 556 to complete an alternative locking circuit therefor. The latter circuit extends from the grounded hold conductor C291 by way of the contacts 423, C492, the contacts 556, C293, the contacts 201, C382, the contacts 365 and 343, C287 and the upper winding of R200 to battery. Immediately after its completion, this locking circuit and the operating circuit for the relay R200 are opened at the contacts 343 by the back-bridge relay R340. When thus deenergized, the relay R200 restores to recomplete the initially traced operating and locking circuits for the hold relay R370 and to condition its associated circuits for another timing operation.

In the event a connection set up through the link is released at the called substation and the calling party neglects to release the connection, the relay R200 is again conditioned to release the link. Thus, it will be noted that when the called party hangs up to deenergize the back-bridge relay R340, the operating and last-traced locking circuits for the relay R200 are reprepared at the contacts 343. Accordingly, this relay is rendered operative to forcibly release the link in the exact manner explained above.

OPERATION OF THE ALARM EQUIPMENT

As indicated previously, the sustained application of ground potential to any one of the various alarm leads C912, C949 and C281 indicates different types of faults in the switching equipment of the community exchange, which should be brought to the attention of the maintenance staff. More specifically, the application of ground potential to the conductor C281 indicates that the illustrated link has failed to release properly, the application of ground potential to the conductor C949 indicates that the link fuse 824 has blown; and the sustained application of ground potential to the conductor C912 indicates that the distributor is being held in its call handling setting. In regard to the release alarm circuit, it will be recalled from the preceding explanation that when the Strowger switching mechanism of the connector 20 is conditioned for release, the release magnet 287 is operated to impress ground potential upon the release alarm conductor C281 through its contacts 258. Similarly, if the hold slave relay R300 of the connector is released to complete the operating circuit for the release magnet 874 of the minor switch 870, and this minor switch fails to release, the relay R500 remains in its operated position to hold ground potential upon the release alarm conductor C281 over a path which includes the contacts 363, C385 and the contacts 583. In a similar manner, when the finder 10 is conditioned for release, the release alarm conductor C281 is connected to ground through the contacts 840. Normally the release operations, both in the finder and the connector, are effected in a short time interval. If, however, a release operation should not be performed within a reasonable time interval, the alarm sending relays operate to transmit an alarm signal to the distant central office and the supervisory signaling circuits are set to transmit a signal indicating the character of the trouble. The alarm sending relays also function to transmit an alarm signal to the distant central office when ground potential is impressed upon either of the alarm conductors C912 or C949. Also, the alarm relays controlled over these leads are controlled to impart predetermined settings to the supervisory signaling circuits which respectively indicate the faults designated by the grounding of the associated leads. The manner in which these functions are performed is more fully described in the copending application Serial No. 414,252, filed October 9, 1941, Lomax and Bakker, referred to above.

While one embodiment of the invention has been disclosed, it will be understood that various modifications may be made therein which are within the true spirit and scope of the invention.

What is claimed is:

1. In a telephone system including lines arranged for different classes of service, a service restricting network including means for producing recurring groups of signal pulses, each group comprising a plurality of time spaced signal pulses of different character which respectively designate different service restrictions, and automatic switching apparatus for setting up connections between said lines and including means controlled by said pulses of any one of said groups for making the service rendered said lines conform to the service classifications thereof.

2. In a telephone system including lines arranged for different classes of service, a service restricting network including means for producing a group of signal pulses, each pulse being produced at a different time interval in said group and each pulse being of different character which respectively designate different service restrictions, and automatic switching apparatus for setting up connections between said lines and including means controlled by said pulses over control paths which are individual to said lines for making the service rendered said lines conform to the service classifications thereof.

3. In a telephone system including lines arranged for different classes of service, a service restricting network including control paths individual to said lines and means for transmitting over each of said paths one or more non-interfering and different signals which respectively designate different service restrictions that are to be imposed on certain of said lines, each different signal being transmitted at a different predetermined timed interval with respect to the other signals, and automatic switching apparatus for setting up connections between said lines and including means controlled by the signals transmitted over said paths for making the service rendered said lines conform to the service classifications thereof.

4. In a telephone system including lines arranged for different classes of service, a service restricting network including control paths individual to said lines and means for recurrently transmitting over each of said paths one or more non-interfering and differently timed signal pulses of different character which respectively designate different service restrictions that, either singly or in different combinations, are to be imposed on certain of said lines, and automatic switching apparatus for setting up connections between said lines and including means selectively controlled by said signal pulses for making the service rendered said lines conform to the service classifications thereof.

5. In a telephone system including a plurality of lines, a plurality of sources of signals of different character which respectively designate different service restrictions that are to be imposed on certain of said lines, control paths individual to the lines upon which said service restrictions are to be imposed, timing means for connecting any one or more of said signal sources at different timed intervals to each of said paths, and automatic switching apparatus for setting up connections between said lines and including means controlled by the signals transmitted over said paths for selectively imposing said restrictions on said lines.

6. In a telephone system, a plurality of lines including at least one line upon which service restrictions are to be imposed, a service restricting network common to said lines, a control path individual to said one line and extending to said network, and automatic switching apparatus operative to set up and complete talking connections between said lines and including means controlled over said path from said common network for imposing two or more different service restrictions on the service rendered said one line.

7. In a telephone system, a plurality of lines including at least one line upon which service restrictions are to be imposed, a control path individual to said one line, a service restricting network terminating said control path and including means for transmitting over said path differently timed non-interfering signals which respectively designate different service restrictions, and automatic switching apparatus operative to set up connections between said lines and including means controlled by the signals transmitted over said path for imposing two or more of said service restrictions on the service rendered said one line.

8. In a telephone system, a plurality of lines including at least one line upon which service restrictions are to be imposed, a control path individual to said one line, a service restricting network terminating said control path and including means for transmitting over said path successive signal pulses at different timed intervals of different character which respectively designate different service restrictions, and automatic switching apparatus operative to set up connections between said lines and including means controlled by at least a portion of the signal pulses transmitted over said path for imposing two or more of said service restrictions on the service rendered said one line.

9. In a telephone system, a plurality of groups of trunks, a plurality of lines including at least one line upon which service restrictions are to be imposed, a selector having wipers for selecting said trunks and including switching means excluding said wipers operative to different settings in response to operation of said selector wipers to select different groups of said trunks, means for extending a connection from said one line to said selector, service restricting means, and means jointly controlled by the settings of said switching means and said service restricting means for preventing said one line from obtaining access to the trunks in two or more of said groups through said selector.

10. In a telephone system, a plurality of groups of trunks, a plurality of lines including at least one line upon which service restrictions are to be imposed, a control path individual to said one line, a selector having access to said trunks and including switching means operative to different settings in response to operation of said selector to select different groups of said trunks, means for extending connections from said one line through said selector to the trunks of said different groups and for extending said control path through the contacts of said switching means, service restricting means operative to transmit noninterfering signals over said control path which respectively designate said different groups of trunks, and means in said selector controlled over said path by said signals for preventing said one line from obtaining access to the trunks in two or more of said trunk groups.

11. In a telephone system, a plurality of groups of trunks, a plurality of lines including at least one line upon which service restrictions are to be imposed, a control path individual to said one line, a selector having access to said trunks and including switching means operative to different settings in response to operation of said selector to select different groups of said trunks, means for extending connections from said one line through said selector to the trunks of said different groups and for extending said control path through the contacts of said switching means, service restricting means operative to transmit over said path successive signal pulses of different character which respectively designate said different groups of trunks, and means selectively responsive to said signal pulses of different character for preventing said one line from obtaining access to the trunks in two or more of said trunk groups.

12. In a telephone system including lines arranged for different classes of service, a plurality of groups of trunks, a selector having access to said trunks and including switching means operative to different settings in response to operation of said selector to select different groups of said trunks, means for non-concurrently extending connections from said lines to said selector, service restricting means, and means jointly controlled by said service restricting means and said switching means for preventing connections from being extended over the trunks in two or more of said groups from each of at least a portion of said lines.

13. In a telephone system including lines arranged for different classes of service, control paths individual to said lines, a plurality of groups of trunks, a selector having access to said trunks and including switching means operative to different settings in response to operation of said selector to select different groups of said trunks, means for non-concurrently extending connections from said lines through said selector to the trunks of said different groups and for extending the corresponding control paths through the contacts of said switching means, service restricting means operative to transmit non-interfering signals over each of said control paths which respectively designate said different groups of trunks, and means in said selector controlled over said paths by said signals for preventing connections from being extended over the trunks in two or more of said groups from each of at least a portion of said lines.

14. In a telephone system, a plurality of lines including at least one line upon which service restrictions are to be imposed, a control path individual to said one line, and automatic switching apparatus operative to set up and complete talking connections between said lines and including means controlled over said path for imposing two or more of said service restrictions on the service rendered said one line.

15. In a telephone system, a plurality of lines including at least one line upon which service restrictions are to be imposed, a control path individual to said one line, two groups of trunks, and automatic switching apparatus operative to set up and complete talking connections between said lines and said trunks and including means controlled over said path for preventing connections from being extended from said one line over the trunks in either of said two groups.

16. In a telephone system, a plurality of lines including at least one line upon which a service restriction is to be imposed, a source of alternating ringing current utilized in signaling over called lines of the system, and automatic switching apparatus for setting up connections between said lines and including means controlled from said source for imposing said service restriction on the service rendered said line.

17. In a telephone system, a plurality of lines including at least one line upon which a service restriction is to be imposed, a source of alternating ringing current utilized in signaling over called lines of the system, a link including a finder having access to said lines, a control circuit individual to said one line and extending from said source through contacts controlled by said finder, and means controlled over said circuit for imposing said service restriction on the service rendered said one line.

18. In a telephone system, a plurality of lines including at least one line upon which service restrictions are to be imposed, a source of alternating ringing current utilized in signaling over called lines of the system, a source of direct current, and automatic switching apparatus operative to set up connections between said lines and including means controlled from one of said current sources for imposing one restriction on the service rendered said one line and means controlled from the other of said current sources for imposing another restriction on the service rendered said one line.

19. In a telephone system, a plurality of lines including at least one line upon which service restrictions are to be imposed, a source of ringing current utilized in signaling over called lines of the system, a source of direct current, a control path individual to said one line, means for transmitting over said path non-interfering signal pulses which are respectively derived from said two sources of current, and automatic switching apparatus operative to set up connections between said lines and including means controlled over said path by said signal pulses for imposing two different restrictions on the service rendered said one line.

20. In a telephone system including a plurality of lines certain of which are to have service restrictions imposed thereon, automatic switching apparatus adapted to be seized over calling ones of said lines and operative to set up and complete talking connections between said lines, and means responsive to the attempted operation of the switching apparatus seized over a calling one of said lines to render said one line a service which is restricted thereto for automatically releasing said seized switching apparatus.

21. In a telephone system including a plurality of lines certain of which are to have service restrictions imposed thereon, automatic switching apparatus adapted to be seized over calling ones of said lines and operative to set up connections between said lines, means responsive to the attempted operation of the switching apparatus seized over a calling one of said lines to render said one line a service which is restricted thereto for automatically releasing said seized switching apparatus, and means responsive to the automatic release of said seized switching apparatus for locking said one line out of service until the call present thereon is abandoned.

22. In a telephone system including lines arranged for restricted service, a trunk, automatic switching apparatus controllable over any one of said lines to select said trunk, and means responsive to the operation of said switching apparatus to select said trunk for use in extending a call from a calling one of said restricted lines for automatically releasing said switching apparatus.

23. In a telephone system including lines arranged for restricted service, a trunk, automatic switching apparatus controllable over any one of said lines to select said trunk, means responsive to the operation of said switching apparatus to select said trunk for use in extending a call from a calling one of said restricted lines for automatically releasing said switching apparatus, and means responsive to the automatic release of said switching apparatus for locking said calling restricted line out of service until the call present thereon is abandoned.

24. In a telephone system including lines arranged for restricted service and lines arranged for non-restricted service, control paths individual to said restricted lines, a trunk, automatic switching apparatus controllable over any one of said lines to select said trunk, and means controlled over the control path individual to a calling one of said restricted lines and operative in response to the operation of said switching apparatus to select said trunk for automatically releasing said switching apparatus.

25. In a link including a connector which is controllable over calling lines arranged for both restricted and non-restricted service, to select an idle trunk to which it has access, a switching relay operative to seize the selected trunk, and restricted service means controlled in accordance with the restricted or non-restricted character of the calling line over which said link is seized for initiating the automatic release of said link in response to operation of said switching relay only in the event said link is seized over a restricted calling line.

PIER BAKKER.

---

CERTIFICATE OF CORRECTION.

Patent No. 2,375,514.　　　　　　　　　　　May 8, 1945.

PIER BAKKER.

It is hereby certified that error appears in the printed specification of the above numbered patent requiring correction as follows: Page 35, first column, line 19, claim 8, for the syllable and word "vals of" read --vals and of--; and that the said Letters Patent should be read with this correction therein that the same may conform to the record of the case in the Patent Office.

Signed and sealed this 14th day of August, A. D. 1945.

(Seal)　　　　　　　　　　　　　　　Leslie Frazer
　　　　　　　　　　　　First Assistant Commissioner of Patents.

and means controlled over said circuit for imposing said service restriction on the service rendered said one line.

18. In a telephone system, a plurality of lines including at least one line upon which service restrictions are to be imposed, a source of alternating ringing current utilized in signaling over called lines of the system, a source of direct current, and automatic switching apparatus operative to set up connections between said lines and including means controlled from one of said current sources for imposing one restriction on the service rendered said one line and means controlled from the other of said current sources for imposing another restriction on the service rendered said one line.

19. In a telephone system, a plurality of lines including at least one line upon which service restrictions are to be imposed, a source of ringing current utilized in signaling over called lines of the system, a source of direct current, a control path individual to said one line, means for transmitting over said path non-interfering signal pulses which are respectively derived from said two sources of current, and automatic switching apparatus operative to set up connections between said lines and including means controlled over said path by said signal pulses for imposing two different restrictions on the service rendered said one line.

20. In a telephone system including a plurality of lines certain of which are to have service restrictions imposed thereon, automatic switching apparatus adapted to be seized over calling ones of said lines and operative to set up and complete talking connections between said lines, and means responsive to the attempted operation of the switching apparatus seized over a calling one of said lines to render said one line a service which is restricted thereto for automatically releasing said seized switching apparatus.

21. In a telephone system including a plurality of lines certain of which are to have service restrictions imposed thereon, automatic switching apparatus adapted to be seized over calling ones of said lines and operative to set up connections between said lines, means responsive to the attempted operation of the switching apparatus seized over a calling one of said lines to render said one line a service which is restricted thereto for automatically releasing said seized switching apparatus, and means responsive to the automatic release of said seized switching apparatus for locking said one line out of service until the call present thereon is abandoned.

22. In a telephone system including lines arranged for restricted service, a trunk, automatic switching apparatus controllable over any one of said lines to select said trunk, and means responsive to the operation of said switching apparatus to select said trunk for use in extending a call from a calling one of said restricted lines for automatically releasing said switching apparatus.

23. In a telephone system including lines arranged for restricted service, a trunk, automatic switching apparatus controllable over any one of said lines to select said trunk, means responsive to the operation of said switching apparatus to select said trunk for use in extending a call from a calling one of said restricted lines for automatically releasing said switching apparatus, and means responsive to the automatic release of said switching apparatus for locking said calling restricted line out of service until the call present thereon is abandoned.

24. In a telephone system including lines arranged for restricted service and lines arranged for non-restricted service, control paths individual to said restricted lines, a trunk, automatic switching apparatus controllable over any one of said lines to select said trunk, and means controlled over the control path individual to a calling one of said restricted lines and operative in response to the operation of said switching apparatus to select said trunk for automatically releasing said switching apparatus.

25. In a link including a connector which is controllable over calling lines arranged for both restricted and non-restricted service, to select an idle trunk to which it has access, a switching relay operative to seize the selected trunk, and restricted service means controlled in accordance with the restricted or non-restricted character of the calling line over which said link is seized for initiating the automatic release of said link in response to operation of said switching relay only in the event said link is seized over a restricted calling line.

PIER BAKKER.

---

CERTIFICATE OF CORRECTION.

Patent No. 2,375,514. May 8, 1945.

PIER BAKKER.

It is hereby certified that error appears in the printed specification of the above numbered patent requiring correction as follows: Page 35, first column, line 19, claim 8, for the syllable and word "vals of" read --vals and of--; and that the said Letters Patent should be read with this correction therein that the same may conform to the record of the case in the Patent Office.

Signed and sealed this 14th day of August, A. D. 1945.

Leslie Frazer
(Seal) First Assistant Commissioner of Patents.